United States Patent
Cole et al.

(10) Patent No.: US 11,336,881 B2
(45) Date of Patent: *May 17, 2022

(54) METHODS AND APPARATUS FOR PROCESSING CONTENT BASED ON VIEWING INFORMATION AND/OR COMMUNICATING CONTENT

(71) Applicant: Nevermind Capital LLC, Wilmington, DE (US)

(72) Inventors: David Cole, Laguna Beach, CA (US); Alan McKay Moss, Laguna Beach, CA (US); Hector M Medina, Laguna Beach, CA (US)

(73) Assignee: Nevermind Capital LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 16/897,010

(22) Filed: Jun. 9, 2020

(65) Prior Publication Data

US 2021/0067759 A1 Mar. 4, 2021

Related U.S. Application Data

(63) Continuation of application No. 16/520,066, filed on Jul. 23, 2019, now Pat. No. 10,721,454, which is a
(Continued)

(51) Int. Cl.
*H04N 13/189* (2018.01)
*H04N 5/232* (2006.01)
(Continued)

(52) U.S. Cl.
CPC ............ *H04N 13/189* (2018.05); *G06T 3/40* (2013.01); *G06T 15/04* (2013.01); *G06T 17/20* (2013.01);
(Continued)

(58) Field of Classification Search
CPC .................................................. H04N 13/189
(Continued)

(56) References Cited

U.S. PATENT DOCUMENTS 6,044,168 A 3/2000 Tuceryan
6,208,347 B1 3/2001 Migdal
(Continued)

FOREIGN PATENT DOCUMENTS

AU 2008275873 A1 1/2009
CN 1816829 A 8/2006
(Continued)

OTHER PUBLICATIONS

D'Angio, Paul C., "Adaptive and Passive Non-Visual Driver Assistance Technologies for the Blind Driver Challenge," May 30, 2012.
(Continued)

*Primary Examiner* — Daniel T Tekle
(74) *Attorney, Agent, or Firm* — Blank Rome LLP

(57) ABSTRACT

Methods and apparatus for collecting user feedback information from viewers of content are described. Feedback information is received from viewers of content. The feedback indicates, based on head tracking information in some embodiments, where users are looking in a simulated environment during different times of a content presentation, e.g., different frame times. The feedback information is used to prioritize different portions of an environment represented by the captured image content. Resolution allocation is performed based on the feedback information and the content re-encoded based on the resolution allocation. The resolution allocation may and normally does change as the priority of different portions of the environment change.

20 Claims, 51 Drawing Sheets

Related U.S. Application Data continuation of application No. 15/239,748, filed on Aug. 17, 2016, now Pat. No. 10,362,290, which is a continuation-in-part of application No. 15/046,311, filed on Feb. 17, 2016, now Pat. No. 9,832,450.

(60) Provisional application No. 62/296,065, filed on Feb. 16, 2016, provisional application No. 62/262,374, filed on Dec. 2, 2015, provisional application No. 62/117,427, filed on Feb. 17, 2015.

(51) Int. Cl.

| | | |
|---|---|---|
| H04N 13/106 | (2018.01) | |
| H04N 13/161 | (2018.01) | |
| H04N 13/194 | (2018.01) | |
| H04N 13/344 | (2018.01) | |
| H04N 13/383 | (2018.01) | |
| G06T 15/04 | (2011.01) | |
| G06T 17/20 | (2006.01) | |
| H04N 21/2343 | (2011.01) | |
| H04N 21/44 | (2011.01) | |
| H04N 21/81 | (2011.01) | |
| H04N 19/597 | (2014.01) | |
| H04N 21/442 | (2011.01) | |
| H04N 21/4728 | (2011.01) | |
| H04N 21/6587 | (2011.01) | |
| H04N 21/845 | (2011.01) | |
| G06T 3/40 | (2006.01) | |
| H04N 19/37 | (2014.01) | |
| H04N 19/59 | (2014.01) | |
| H04N 13/243 | (2018.01) | |
| H04N 13/275 | (2018.01) | |
| H04N 13/239 | (2018.01) | |
| H04N 13/139 | (2018.01) | |
| H04N 13/00 | (2018.01) | |

(52) U.S. Cl.
CPC ....... *H04N 5/23238* (2013.01); *H04N 13/106* (2018.05); *H04N 13/139* (2018.05); *H04N 13/161* (2018.05); *H04N 13/194* (2018.05); *H04N 13/239* (2018.05); *H04N 13/243* (2018.05); *H04N 13/275* (2018.05); *H04N 13/344* (2018.05); *H04N 13/383* (2018.05); *H04N 19/37* (2014.11); *H04N 19/59* (2014.11); *H04N 19/597* (2014.11); *H04N 21/23439* (2013.01); *H04N 21/234345* (2013.01); *H04N 21/234363* (2013.01); *H04N 21/234381* (2013.01); *H04N 21/44016* (2013.01); *H04N 21/44218* (2013.01); *H04N 21/4728* (2013.01); *H04N 21/6587* (2013.01); *H04N 21/816* (2013.01); *H04N 21/8456* (2013.01); *G06T 2215/12* (2013.01); *H04N 2013/0088* (2013.01)

(58) Field of Classification Search
USPC .......................................................... 386/223
See application file for complete search history.

(56) References Cited

U.S. PATENT DOCUMENTS

| | | | |
|---|---|---|---|
| 6,400,370 B1 | 6/2002 | Lee | |
| 8,351,761 B2 | 1/2013 | Harris | |
| 8,405,680 B1 | 3/2013 | Cardoso Lopes | |
| 8,451,320 B1 | 5/2013 | Cole | |
| 8,610,757 B2 | 12/2013 | Cole | |
| 9,204,127 B1 | 12/2015 | Cole | |
| 9,313,474 B1 | 4/2016 | Cole | |
| 9,407,902 B1 | 8/2016 | Cole | |
| 9,485,494 B1 | 11/2016 | Cole | |
| 9,538,160 B1 | 1/2017 | Cole | |
| 9,699,437 B2 | 7/2017 | Cole | |
| 9,729,850 B2 | 8/2017 | Cole | |
| 9,821,920 B2 | 11/2017 | Cole | |
| 9,832,449 B2 | 11/2017 | Cole | |
| 9,832,450 B2 | 11/2017 | Cole | |
| 9,836,845 B2 | 12/2017 | Cole | |
| 9,865,055 B2 | 1/2018 | Cole | |
| 9,894,350 B2 | 2/2018 | Cole | |
| 9,912,965 B2 | 3/2018 | Cole | |
| 9,918,136 B2 | 3/2018 | Cole | |
| 9,930,318 B2 | 3/2018 | Cole | |
| 9,955,147 B2 | 4/2018 | Cole | |
| 10,027,944 B2 | 7/2018 | Cole | |
| 10,027,948 B2 | 7/2018 | Cole | |
| 10,033,995 B2 | 7/2018 | Cole | |
| 10,038,889 B2 | 7/2018 | Cole | |
| 10,075,701 B2 | 9/2018 | Cole | |
| 10,279,925 B2 | 5/2019 | Cole | |
| 10,397,538 B2 | 8/2019 | Cole | |
| 10,397,543 B2 | 8/2019 | Cole | |
| 10,412,382 B2 | 9/2019 | Cole | |
| 10,432,910 B2 | 10/2019 | Cole | |
| 10,438,369 B2 | 10/2019 | Cole | |
| 10,477,186 B2 | 11/2019 | Sheridan | |
| 10,484,697 B2 | 11/2019 | Grasmug | |
| 10,523,920 B2 | 12/2019 | Cole | |
| 10,531,071 B2 | 1/2020 | Cole | |
| 10,567,733 B2 | 2/2020 | Cole | |
| 2002/0080094 A1 | 6/2002 | Biocca | |
| 2004/0151365 A1 | 8/2004 | An Chang | |
| 2004/0233274 A1 | 11/2004 | Uyttendaele | |
| 2004/0249617 A1 | 12/2004 | Lau | |
| 2008/0031325 A1 | 2/2008 | Qi | |
| 2008/0206720 A1 | 8/2008 | Nelson | |
| 2009/0021522 A1 | 1/2009 | Burley | |
| 2009/0256904 A1 | 10/2009 | Krill | |
| 2010/0056274 A1 | 3/2010 | Uusitalo | |
| 2010/0329358 A1 | 12/2010 | Zhang | |
| 2011/0025690 A1 | 2/2011 | Tzur | |
| 2011/0280316 A1 | 11/2011 | Chen | |
| 2013/0125155 A1 | 5/2013 | Bhagavathy | |
| 2013/0278631 A1 | 10/2013 | Border | |
| 2013/0300740 A1 | 11/2013 | Snyder | |
| 2014/0028797 A1 | 1/2014 | Hattori | |
| 2014/0098186 A1 | 4/2014 | Seidl | |
| 2014/0135072 A1 | 5/2014 | Sawada | |
| 2014/0314147 A1 | 10/2014 | Rusanovskyy | |
| 2014/0327736 A1 | 11/2014 | Dejohn | |
| 2015/0054913 A1 | 2/2015 | Annau | |
| 2015/0055937 A1 | 2/2015 | Van Hoff | |
| 2015/0082181 A1 | 3/2015 | Ames | |
| 2015/0138314 A1 | 5/2015 | Vincent | |
| 2015/0221129 A1 | 8/2015 | Buron | |
| 2015/0245063 A1 | 8/2015 | Rusanovskyy | |
| 2015/0264299 A1* | 9/2015 | Leech | H04N 19/17 348/78 |
| 2015/0312547 A1 | 10/2015 | Cucca | |
| 2015/0341617 A1 | 11/2015 | Cole | |
| 2015/0346812 A1 | 12/2015 | Cole | |
| 2015/0346832 A1 | 12/2015 | Cole | |
| 2016/0065946 A1 | 3/2016 | Cole | |
| 2016/0065947 A1 | 3/2016 | Cole | |
| 2016/0080728 A1 | 3/2016 | Cole | |
| 2016/0104510 A1 | 4/2016 | Tamir | |
| 2016/0127681 A1 | 5/2016 | Turbell | |
| 2016/0212403 A1 | 7/2016 | Cole | |
| 2016/0212409 A1 | 7/2016 | Cole | |
| 2016/0219262 A1 | 7/2016 | Cole | |
| 2016/0219305 A1 | 7/2016 | Cole | |
| 2016/0227190 A1 | 8/2016 | Cole | |
| 2016/0239978 A1 | 8/2016 | Cole | |
| 2016/0241836 A1 | 8/2016 | Cole | |
| 2016/0241837 A1 | 8/2016 | Cole | |
| 2016/0241838 A1 | 8/2016 | Cole | |
| 2016/0241892 A1 | 8/2016 | Cole | |
| 2016/0253795 A1 | 9/2016 | Cole | |

(56) References Cited

U.S. PATENT DOCUMENTS

| | | |
|---|---|---|
| 2016/0253809 A1 | 9/2016 | Cole |
| 2016/0253810 A1 | 9/2016 | Cole |
| 2016/0253839 A1 | 9/2016 | Cole |
| 2016/0255326 A1 | 9/2016 | Cole |
| 2016/0255327 A1 | 9/2016 | Cole |
| 2016/0269716 A1 | 9/2016 | Cole |
| 2016/0309173 A1 | 10/2016 | Lee |
| 2016/0337706 A1 | 11/2016 | Hwang |
| 2016/0360180 A1 | 12/2016 | Cole |
| 2016/0373734 A1 | 12/2016 | Cole |
| 2017/0050743 A1 | 2/2017 | Cole |
| 2017/0061600 A1 | 3/2017 | Cole |
| 2017/0094247 A1 | 3/2017 | Cole |
| 2017/0150122 A1 | 5/2017 | Cole |
| 2017/0324945 A1 | 11/2017 | Cole |
| 2017/0359564 A1 | 12/2017 | Cole |
| 2018/0020206 A1 | 1/2018 | Sheridan |
| 2018/0024419 A1 | 1/2018 | Sheridan |
| 2018/0027152 A1 | 1/2018 | Sheridan |
| 2018/0054607 A1 | 2/2018 | Cole |
| 2018/0186466 A1 | 7/2018 | Cole |
| 2018/0189973 A1 | 7/2018 | Cole |
| 2018/0192025 A1 | 7/2018 | Cole |
| 2018/0197309 A1 | 7/2018 | Cole |
| 2018/0220121 A1 | 8/2018 | Cole |
| 2018/0225537 A1 | 8/2018 | Cole |
| 2018/0234676 A1 | 8/2018 | Cole |
| 2018/0249189 A1 | 8/2018 | Cole |
| 2018/0255288 A1 | 9/2018 | Cole |
| 2018/0262745 A1 | 9/2018 | Cole |
| 2018/0279006 A1 | 9/2018 | Cole |
| 2018/0280656 A1 | 10/2018 | Cole |
| 2018/0288403 A1 | 10/2018 | Cole |

FOREIGN PATENT DOCUMENTS

| | | |
|---|---|---|
| CN | 101006472 A | 7/2007 |
| CN | 101295206 A | 10/2008 |
| CN | 105141970 A | 12/2015 |
| WO | 0013088 A1 | 3/2000 |
| WO | 2012063031 A1 | 5/2012 |

OTHER PUBLICATIONS

Heymann, et al., "Representation, Coding and Interactive Rendering of High-Resolution Panoramic Images and Video Using MPEG-4," Panoramic Photography Workshop, Feb. 28, 2005.

Magli, et al., "Network Coding Meets Multimedia: A Review," IEEE Trasactions on Multimedia, Aug. 2013, vol. 15, Issue 5.

Tie, et al., "Virtual Scene Optimization Algorithm Based on VisibiliySensor Node," Software Guide, vol. 9, No. 8, Aug. 31, 2010.

Yang, et al., "3D geometry-dependent texture map compression with a hybrid ROI coding," Science China Information Sciences, Feb. 2014, vol. 57.

* cited by examiner

3200

3201

| | T2 | | | | 3202 | |
|---|---|---|---|---|---|---|
| SKY | 0 2 | 0 2 | 0 2 | 1 1 | PRP₁ | $PRP_1 = (2 \times 1) + 7 = 9$ |
| UPPER PORTION | 0 2 | 3 38 | 1 6 | 0 1 | PRP₂ | $PRP_2 = (2 \times 4) + 47 = 55$ |
| MIDDLE PORTION | 1 10 | 10 112 | 2 11 | 0 1 | PRP₃ | $PRP_3 = (2 \times 13) + 134 = 160$ |
| LOWER PORTION | 0 1 | 0 2 | 1 2 | 0 2 | PRP₄ | $PRP_4 = (2 \times 1) + 7 = 9$ |
| GROUND | 0 2 | 0 1 | 1 1 | 0 1 | PRP₅ | $PRP_5 = (2 \times 1) + 5 = 7$ |
| | LEFT | FRONT | RIGHT | BACK | | |
| 3204 → | PCP₁ | PCP₂ | PCP₃ | PCP₄ | | |

3203

$$PCP_1 = (2 \times 1) + 17 = 19$$
$$PCP_2 = (2 \times 13) + 155 = 181$$
3205
$$PCP_3 = (2 \times 5) + 22 = 32$$
$$PCP_4 = (2 \times 1) + 6 = 8$$

| | LEFT | FRONT | RIGHT | BACK | | |
|---|---|---|---|---|---|---|
| SKY | 1<br>2 | 0<br>2 | 0<br>2 | 1<br>1 | $PRP_1$ | $PRP_1 = (2 \times 2) + 7 = 11$ |
| UPPER PORTION | 2<br>36 | 1<br>7 | 1<br>5 | 0<br>1 | $PRP_2$ | $PRP_2 = (2 \times 4) + 49 = 57$ |
| MIDDLE PORTION | 10<br>110 | 2<br>15 | 1<br>6 | 0<br>1 | $PRP_3$ | $PRP_3 = (2 \times 13) + 132 = 158$ |
| LOWER PORTION | 0<br>3 | 0<br>2 | 1<br>1 | 0<br>1 | $PRP_4$ | $PRP_4 = (2 \times 1) + 7 = 9$ |
| GROUND | 0<br>2 | 0<br>1 | 0<br>1 | 0<br>1 | $PRP_5$ | $PRP_5 = (2 \times 0) + 5 = 5$ |

3302 → , 3303

3304 →  $PCP_1$   $PCP_2$   $PCP_3$   $PCP_4$

3305
- $PCP_1 = (2 \times 13) + 153 = 179$
- $PCP_2 = (2 \times 3) + 27 = 33$
- $PCP_3 = (2 \times 3) + 15 = 21$
- $PCP_4 = (2 \times 1) + 5 = 7$

| | LEFT<br>PCP₁ | FRONT<br>PCP₂ | RIGHT<br>PCP₃ | BACK<br>PCP₄ | | |
|---|---|---|---|---|---|---|
| SKY | 1<br>2 | 1<br>2 | 0<br>2 | 0<br>1 | PRP₁ | $PRP_1 = (2 \times 2) + 7 = 11$ |
| UPPER<br>PORTION | 0<br>3 | 1<br>5 | 4<br>40 | 0<br>1 | PRP₂ | $PRP_2 = (2 \times 5) + 49 = 59$ |
| MIDDLE<br>PORTION | 1<br>11 | 9<br>111 | 1<br>9 | 1<br>1 | PRP₃ | $PRP_3 = (2 \times 12) + 132 = 156$ |
| LOWER<br>PORTION | 0<br>1 | 0<br>2 | 1<br>3 | 0<br>1 | PRP₄ | $PRP_4 = (2 \times 1) + 7 = 9$ |
| GROUND | 0<br>1 | 0<br>1 | 0<br>2 | 0<br>1 | PRP₅ | $PRP_5 = (2 \times 0) + 5 = 5$ |

3502 → 3503

3504 →

3505
$PCP_1 = (2 \times 2) + 18 = 22$
$PCP_2 = (2 \times 11) + 121 = 143$
$PCP_3 = (2 \times 6) + 56 = 68$
$PCP_4 = (2 \times 1) + 5 = 7$

METHODS AND APPARATUS FOR PROCESSING CONTENT BASED ON VIEWING INFORMATION AND/OR COMMUNICATING CONTENT

RELATED APPLICATIONS

The present application is a continuation of U.S. patent application Ser. No. 16/520,066 filed Jul. 23, 2019, which published as U.S. patent publication US-2020-0053341-A1 on Feb. 13, 2020, which is a continuation of U.S. patent application Ser. No. 15/239,748 filed Aug. 17, 2016, which published as U.S. patent publication US-2016-0360180-A1 on Dec. 8, 2016, said patent applications and patent publications of the applications being hereby expressly incorporated by reference their entirety.

FIELD

The present invention relates to methods and apparatus for capturing, streaming and/or playback of content, e.g., content which can be used to simulate an environment.

BACKGROUND

In order to simulate being present in an environment, images of the environment are often captured, encoded and then used as textures by a playback device to give the user a sense of being present in the environment where the images are captured. The images of the environment may be stereoscopic images with left and right eye images being captured to allow a user to observe the environment in 3D and/or can be non-stereoscopic images.

Given transmission constraints, e.g., network data constraints, associated with content being streamed, it may not be possible to encode and transmit the images of the environment at the full resolution at which they are captured.

While a full 360 degree view of an environment may be captured, in reality some portions of the environment may be less important then others to a viewer. For example in the case of a basketball game or soccer match portions of the environment where the ball is maybe more important to a viewer than the ground.

Some portions of an environment are often generally less important than others, for example the ground beneath a user's location at the event which may correspond to a seat in a section of the stands or a back portion of the environment tends to be less important than a forward view of a playing field during a sporting event. However, sometimes a particular portion may change in importance due to action at that portion of the environment. Furthermore within a large portion of the environment such as a forward viewing portion, different portions may have different importance.

Given that it is often not possible to transmit image content at the full resolution it is captured, it would be desirable if methods and/or apparatus where developed which allow for portions of an environment to be prioritized and the content encoded taking into consideration the priority of particular portions of the environment at a given time, e.g., frame time to which an image being coded corresponds.

SUMMARY

Methods and apparatus for prioritizing portions of an environment for different time periods, e.g., frame times, and using the priority information to control resolution allocation are described.

Feedback from users viewing content indicating which portions they are looking at during different frame times of content playback is received. The environment portions which can be encoded and transmitted are prioritized based on the feedback information. Resolution allocations to be used for a data rate are selected based on the environmental priority information and the input image or images are downsampled in accordance with the resolution allocation selected to be used for a frame time. Thus over time images corresponding to different frame times are subject to different resolution allocations and downsampled differently based on the user feedback providing information about which portions of an environment are viewed during different frame times. The downsampled images, e.g., frames are then encoded, stored and made available for transmission. A content server then transmits the encoded content to devices which request the content to playback devices which subscribe to a program channel on which the content is to be broadcast or streamed.

The feedback information may be obtained from users of playback devices who receive content corresponding to a sporting event or other event in real time while the event is ongoing. Based on the feedback information the original content may be and sometimes is recoded for a variety of data rates for later transmission.

While the feedback information is from users viewing content in real or near real time while the event is ongoing in some embodiments, in other embodiments the feedback is from viewers who observe the content after the event to which the content corresponds is over.

The methods and apparatus are particularly well suited for application such as sporting events where the content may be captured and transmitted and then made available for retransmission at a later time or for individuals wanting to see the even on demand after the event is over. For example a basketball game may be captured, streamed in real time and then feedback information used to control resolution allocation used for later transmissions such as into another time zone or country after the initial transmission. One such application would be for retransmission to china or another country where a basketball game may be transmitted 8 or 10 hours after the initial transmission in the United States.

By prioritizing environmental portions based on feedback from a large number of users, resolution allocations can be performed in a manner which takes into consideration user feedback and the quality of the re-encoded content may be of higher perceived quality than would be possible without the feedback used to identify high priority portions of the environment where resolution should be preserved to the extent possible for a given data rate.

Numerous additional methods and embodiments are described in the detailed description which follows.

BRIEF DESCRIPTION OF THE FIGURES

FIG. 6 illustrates the combination of FIGS. 6A and 6B.

FIG. 9 illustrates the combination of FIGS. 9A and 9B.

FIG. 25 illustrates the combination of FIGS. 25A and 25B.

FIGS. 31-36 show viewing statistics priority determinations made for each of the portions of the environment shown in the example of FIG. 30 for each of the frame times shown in FIG. 30.

FIG. 37 illustrates an exemplary resolution allocation, e.g., a first resolution allocation, used in some embodiments which results in downsampling of certain portions of an image frame.

FIG. 40 comprises the combination of FIGS. 40A through 40G illustrating the exemplary method of processing and/or delivering content, in accordance with an exemplary embodiment.

DETAILED DESCRIPTION

Figure 1:
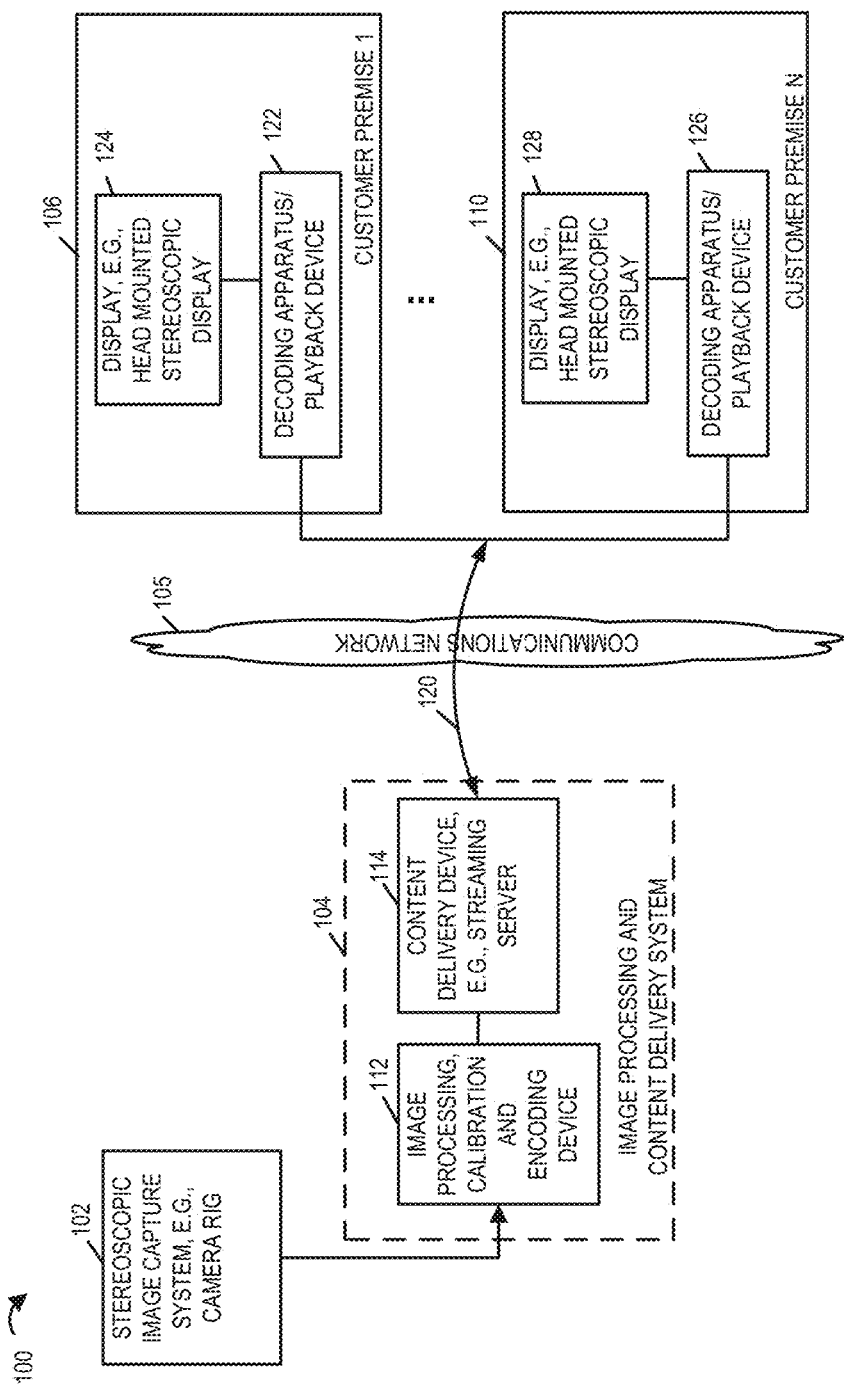
FIG. 1 illustrates an exemplary system implemented in accordance with some embodiments of the invention which can be used to capture content, stream content, and output content to one or more users playback devices in accordance with any of the embodiments described herein.

FIG. 1 illustrates an exemplary system 100 implemented in accordance with some embodiments of the invention. The system 100 supports content delivery, e.g., imaging content delivery, to one or more customer devices, e.g., playback devices/content players, located at customer premises. The system 100 includes the exemplary image capturing device 102, a content delivery system 104, a communications network 105, and a plurality of customer premises 106, . . . , 110. The image capturing device 102 supports capturing of stereoscopic imagery. The image capturing device 102 captures and processes imaging content in accordance with the features of the invention. The communications network 105 may be, e.g., a hybrid fiber-coaxial (HFC) network, satellite network, and/or internet.

The content delivery system 104 includes an image processing, calibration and encoding apparatus 112 and a content delivery device, e.g. a streaming server 114. The image processing, calibration and encoding apparatus 112 is responsible for performing a variety of functions including camera calibration based on one or more target images and/or grid patterns captured during a camera calibration process. Content delivery device 114 may be implemented as a server with, as will be discussed below, the delivery device responding to requests for content with image calibration information, optional environment information, and one or more images captured by the camera rig 102 which can be used in simulating a 3D environment. Streaming of images and/or content may be and sometimes is a function of feedback information such as viewer head position and/or user selection of a position at the event corresponding to a camera 102 which is to be the source of the images. For example, a user may select or switch between images from a camera rig positioned at center line to a camera rig positioned at the field goal with the simulated 3D environment and streamed images being changed to those corresponding to the user selected camera rig. Thus it should be appreciated that while a single camera rig 102 is shown in FIG. 1 multiple camera rigs may be present in the system and located at different physical locations at a sporting or other event with the user being able to switch between the different positions and with the user selections being communicated from the playback device 122 to the content server 114. While separate devices 112, 114 are shown in the image processing and content delivery system 104, it should be appreciated that the system may be implemented as a single device including separate hardware for performing the various functions or with different functions being controlled by different software or hardware modules but being implemented in or on a single processor.

Encoding apparatus 112 may, and in some embodiments does, include one or a plurality of encoders for encoding image data in accordance with the invention. The encoders may be used in parallel to encode different portions of a scene and/or to encode a given portion of a scene to generate encoded versions which have different data rates. Using multiple encoders in parallel can be particularly useful when real time or near real time streaming is to be supported.

The content streaming device 114 is configured to stream, e.g., transmit, encoded content for delivering the encoded image content to one or more customer devices, e.g., over the communications network 105. Via the network 105, the content delivery system 104 can send and/or exchange information with the devices located at the customer premises 106, 110 as represented in the figure by the link 120 traversing the communications network 105.

While the encoding apparatus 112 and content delivery server are shown as separate physical devices in the FIG. 1 example, in some embodiments they are implemented as a single device which encodes and streams content. The encoding process may be a 3D, e.g., stereoscopic, image encoding process where information corresponding to left and right eye views of a scene portion are encoded and included in the encoded image data so that 3D image viewing can be supported. The particular encoding method used is not critical to the present application and a wide range of encoders may be used as or to implement the encoding apparatus 112.

Each customer premise 106, 110 may include a plurality of devices/players, e.g., decoding apparatus to decode and playback/display the image content streamed by the content streaming device 114. Customer premise 1 106 includes a decoding apparatus/playback device 122 coupled to a display device 124 while customer premise N 110 includes a decoding apparatus/playback device 126 coupled to a display device 128. In some embodiments the display devices 124, 128 are head mounted stereoscopic display devices.

In various embodiments decoding apparatus 122, 126 present the imaging content on the corresponding display devices 124, 128. The decoding apparatus/players 122, 126 may be devices which are capable of decoding the imaging content received from the content delivery system 104, generate imaging content using the decoded content and rendering the imaging content, e.g., 3D image content, on the display devices 124, 128. Any of the decoding apparatus/playback devices 122, 126 may be used as the decoding apparatus/playback device 800 shown in FIG. 8. A system/playback device such as the one illustrated in FIG. 8 can be used as any of the decoding apparatus/playback devices 122, 126.

Figure 2:
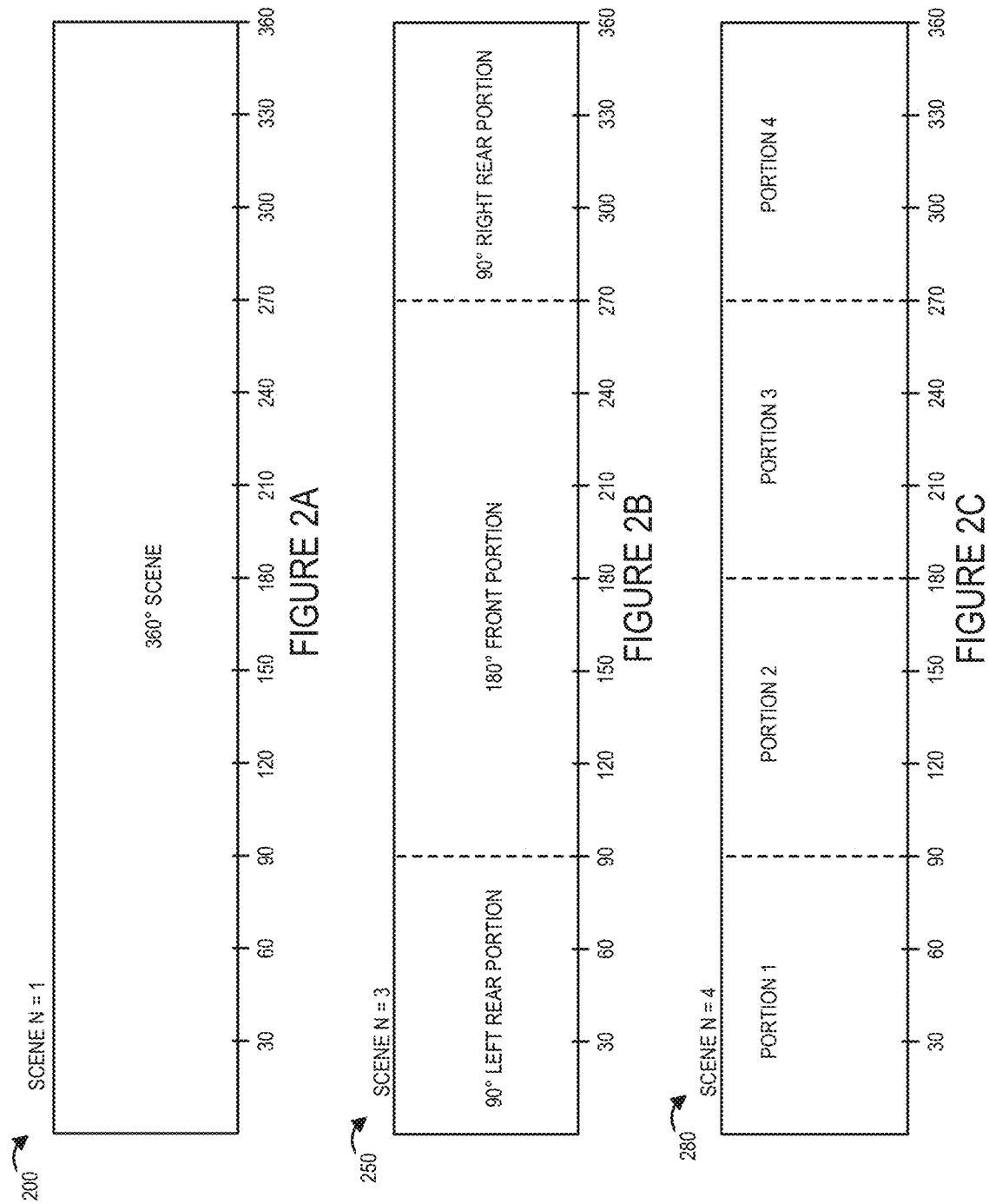
FIG. 2A illustrates an exemplary stereoscopic scene, e.g., a full 360 degree stereoscopic scene which has not been partitioned.
FIG. 2B illustrates an exemplary stereoscopic scene which has been partitioned into 3 exemplary scenes in accordance with one exemplary embodiment.
FIG. 2C illustrates an exemplary stereoscopic scene which has been partitioned into 4 scenes in accordance with one exemplary embodiment.

FIG. 2A illustrates an exemplary stereoscopic scene 200, e.g., a full 360 degree stereoscopic scene which has not been partitioned. The stereoscopic scene may be and normally is the result of combining image data captured from multiple cameras, e.g., video cameras, often mounted on a single video capture platform or camera mount.

FIG. 2B illustrates a partitioned version 250 of the exemplary stereoscopic scene 200 where the scene has been partitioned into 3 (N=3) exemplary portions, e.g., a front 180 degree portion, a left rear 90 degree portion and a right rear 90 degree portion in accordance with one exemplary embodiment.

FIG. 2C illustrates another portioned version 280 of the exemplary stereoscopic scene 200 which has been partitioned into 4 (N=4) portions in accordance with one exemplary embodiment.

While FIGS. 2B and 2C show two exemplary partitions, it should be appreciated that other partitions are possible. For example the scene 200 may be partitioned into twelve (n=12) 30 degree portions. In one such embodiment, rather than individually encoding each partition, multiple partitions are grouped together and encoded as a group. Different groups of partitions may be encoded and streamed to the user with the size of each group being the same in terms of total degrees of scene but corresponding to a different portion of an image which may be streamed depending on the user's head position, e.g., viewing angle as measured on the scale of 0 to 360 degrees.

Figure 3:
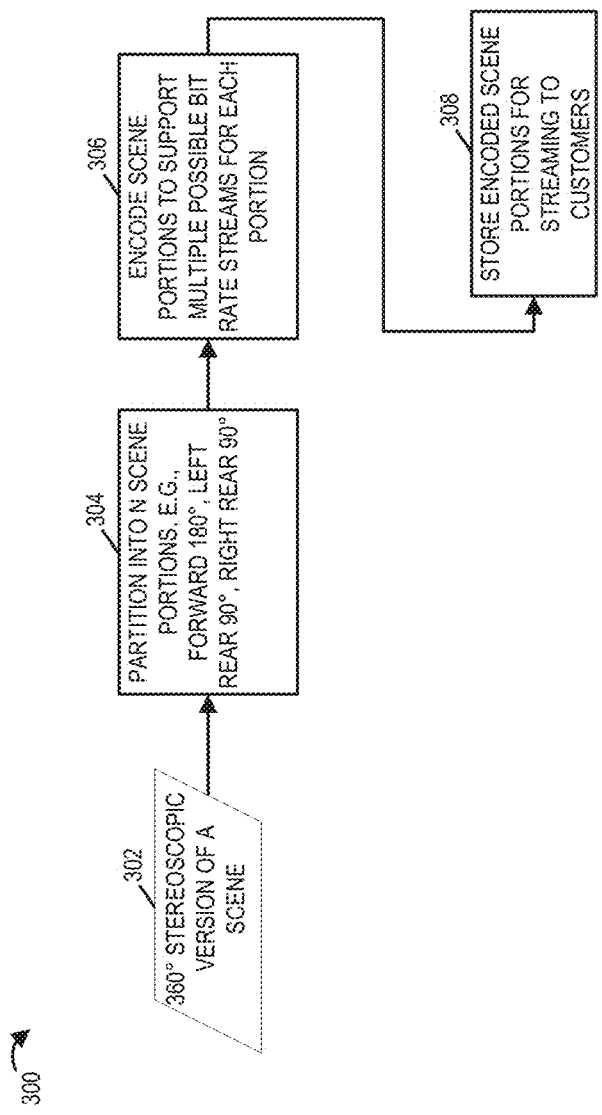
FIG. 3 illustrates an exemplary process of encoding an exemplary 360 degree stereoscopic scene in accordance with one exemplary embodiment.

FIG. 3 illustrates an exemplary process of encoding an exemplary 360 degree stereoscopic scene in accordance with one exemplary embodiment. The input to the method 300 shown in FIG. 3 includes 360 degree stereoscopic image data 302 captured by, e.g., a plurality of cameras arranged to capture a 360 degree view of a scene. The stereoscopic image data 302, e.g., stereoscopic video, may be in any of a variety of known formats and includes, in most embodiments, left and right eye image data used to allow for a 3D experience. While the methods are particularly well suited for stereoscopic video, the techniques and methods described herein can also be applied to 2D images, e.g., of a 360 degree or small scene area.

In step 304 the scene data 302 is partitioned into data corresponding to different scene areas, e.g., N scene areas corresponding to different viewing directions. For example, in one embodiment such as the one shown in FIG. 2B the 360 degree scene area is portioned into three partitions a left rear portion corresponding to a 90 degree portion, a front 180 degree portion and a right rear 90 degree portion. The different portions may have been captured by different cameras but this is not necessary and in fact the 360 degree scene may be constructed from data captured from multiple cameras before being dividing into the N scene areas as shown in FIGS. 2B and 2C.

In step 306 the data corresponding to the different scene portions is encoded in accordance with the invention. In some embodiments each scene portion is independently encoded by multiple encoders to support multiple possible bit rate streams for each portion. In step 308 the encoded scene portions are stored, e.g., in the content delivery system 104, for streaming to the customer playback devices.

Figure 4:
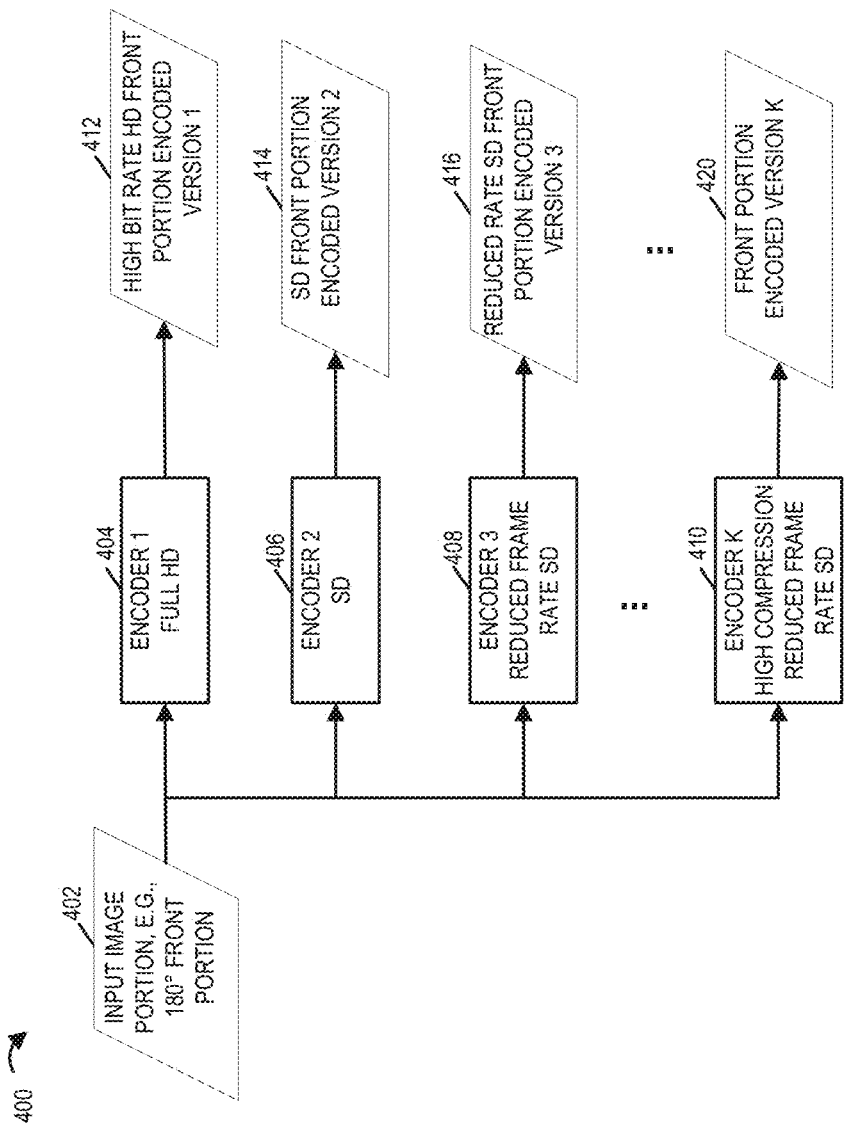
FIG. 4 illustrates an example showing how an input image portion is encoded using a variety of encoders to generate different encoded versions of the same input image portion.

FIG. 4 is a drawing 400 illustrating an example showing how an input image portion, e.g., a 180 degree front portion of a scene, is encoded using a variety of encoders to generate different encoded versions of the same input image portion.

As shown in drawing 400, an input scene portion 402 e.g., a 180 degree front portion of a scene, is supplied to a plurality of encoders for encoding. In the example there are K different encoders which encode input data with different resolutions and using different encoding techniques to generate encoded data to support different data rate streams of image content. The plurality of K encoders include a high definition (HD) encoder 1 404, a standard definition (SD) encoder 2 406, a reduced frame rate SD encoder 3 408, . . . , and a high compression reduced frame rate SD encoder K 410.

The HD encoder 1 404 is configured to perform full high definition (HD) encoding to produce high bit rate HD encoded image 412. The SD encoder 2 406 is configured to perform low resolution standard definition encoding to produce a SD encoded version 2 414 of the input image. The reduced frame rate SD encoder 3 408 is configured to perform reduced frame rate low resolution SD encoding to produce a reduced rate SD encoded version 3 416 of the input image. The reduced frame rate may be, e.g., half of the frame rate used by the SD encoder 2 406 for encoding. The high compression reduced frame rate SD encoder K 410 is configured to perform reduced frame rate low resolution SD encoding with high compression to produce a highly compressed reduced rate SD encoded version K 420 of the input image.

Thus it should be appreciated that control of spatial and/or temporal resolution can be used to produce data streams of different data rates and control of other encoder settings such as the level of data compression may also be used alone or in addition to control of spatial and/or temporal resolution to produce data streams corresponding to a scene portion with one or more desired data rates.

Figure 5:
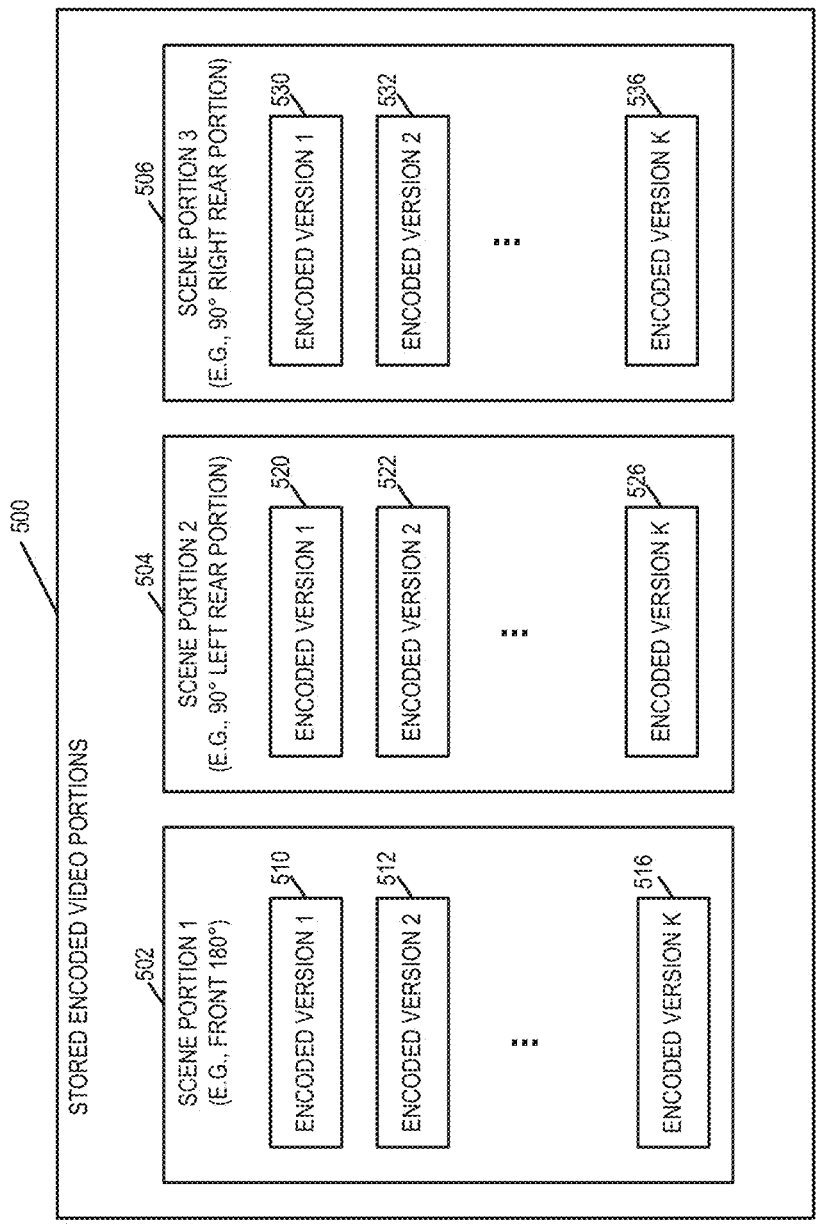
FIG. 5 illustrates stored encoded portions of an input stereoscopic scene that has been partitioned into 3 portions.

FIG. 5 illustrates stored encoded portions 500 of an input stereoscopic scene that has been partitioned into 3 exemplary portions. The stored encoded portions may be stored in the content delivery system 104, e.g., as data/information in the memory. The stored encoded portions 500 of the stereoscopic scene includes 3 different sets of encoded portions, with each portion corresponding to a different scene area and each set including a plurality of different encoded versions of the corresponding scene portion. Each encoded version is a version of encoded video data and thus represents multiple frames which have been coded. It should be appreciated that each encoded version 510, 512, 516 is video that corresponds to multiple periods of time and that when streaming, the portion, e.g., frames, corresponding to the period of time being played back will be used for transmission purposes.

As illustrated and discussed above with regard to FIG. 4, each scene portion, e.g., front, rear scene portions, may be encoded using a plurality of different encoders to produce K different versions of the same scene portion. The outputs of each encoder corresponding to a given input scene are grouped together as a set and stored. The first set of encoded scene portions 502 corresponds to the front 180 degree scene portion, and includes encoded version 1 510 of the front 180 degree scene, encoded version 2 512, ..., and encoded version K 516. The second set of encoded scene portions 504 corresponds to the scene portion 2, e.g., 90 degree left rear scene portion, and includes encoded version 1 520 of the 90 degree left rear scene portion, encoded version 2 522, ..., and encoded version K 526 of the 90 degree left rear scene portion. Similarly the third set of encoded scene portions 506 corresponds to the scene portion 3, e.g., 90 degree right rear scene portion, and includes encoded version 1 530 of the 90 degree right rear scene portion, encoded version 2 532, ..., and encoded version K 536 of the 90 degree right rear scene portion.

The various different stored encoded portions of the 360 degree scene can be used to generate various different bit rate streams for sending to the customer playback devices.

The content delivery system 104 can support a large number of concurrent users since, the encoding process allows the N portions of a scene to be transmitted and processed differently to different users without having to encode the content separately for each individual user. Thus, while a number of parallel encoders may be used to support real time encoding to allow for real or near real time streaming of sports or other events, the number of encoders used tends to be far less than the number of playback devices to which the content is streamed.

While the portions of content are described as portions corresponding to a 360 degree view it should be appreciated that the scenes may, and in some embodiments do, represent a flattened version of a space which also has a vertical dimension. The playback device is able to map the scene portions using a model of the 3D environment, e.g., space, and adjust for vertical viewing positions. Thus, the 360 degrees which are discussed in the present application refer to the head position relative to the horizontal as if a user changed his viewing angle left or right while holding his gaze level.

Figure 6A:
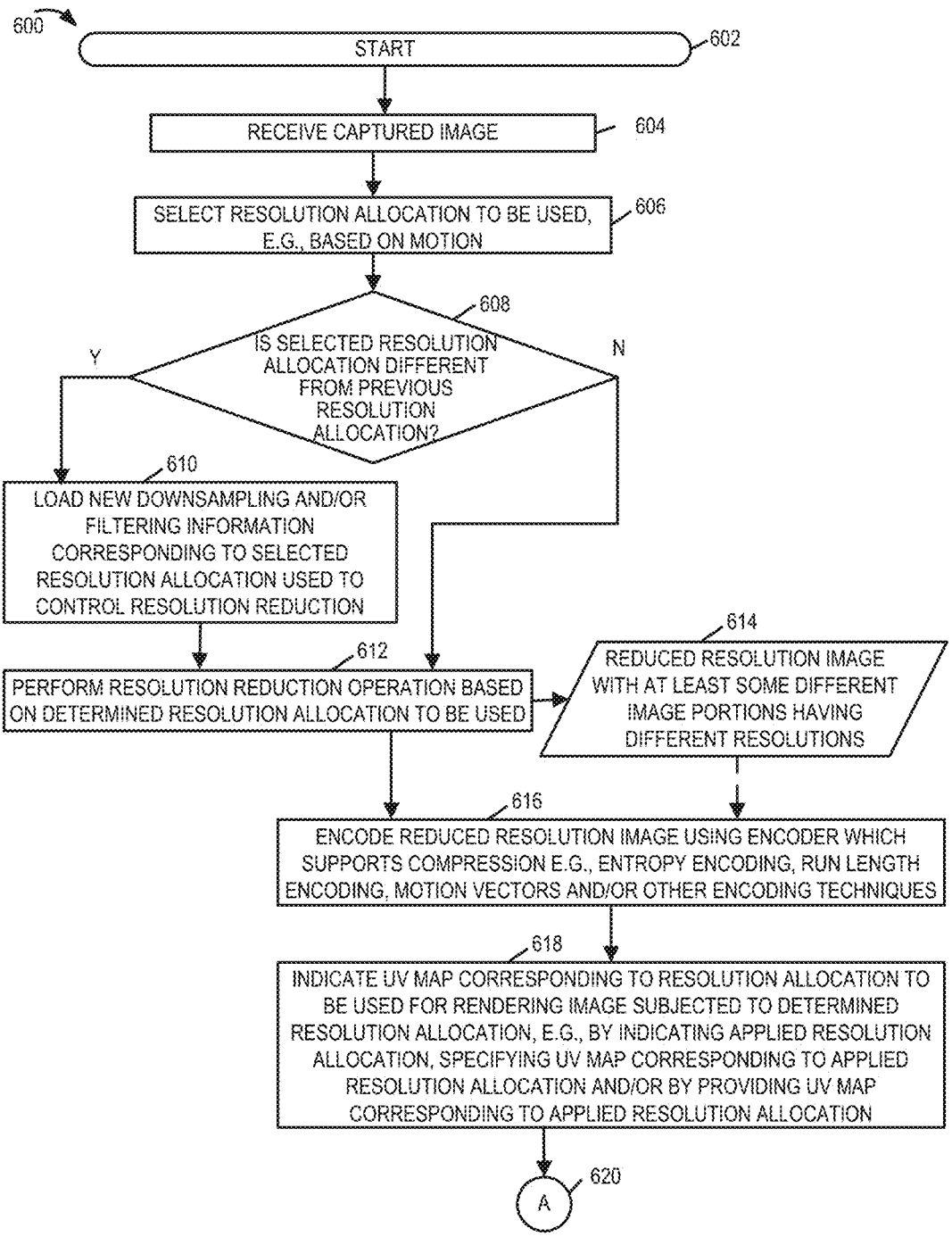
FIG. 6A illustrates a first part of a flowchart illustrating the steps of an exemplary method of streaming content in accordance with an exemplary embodiment implemented using the system of FIG. 1 in which selective resolution allocation and different UV maps are used at different times.
Figure 6B:
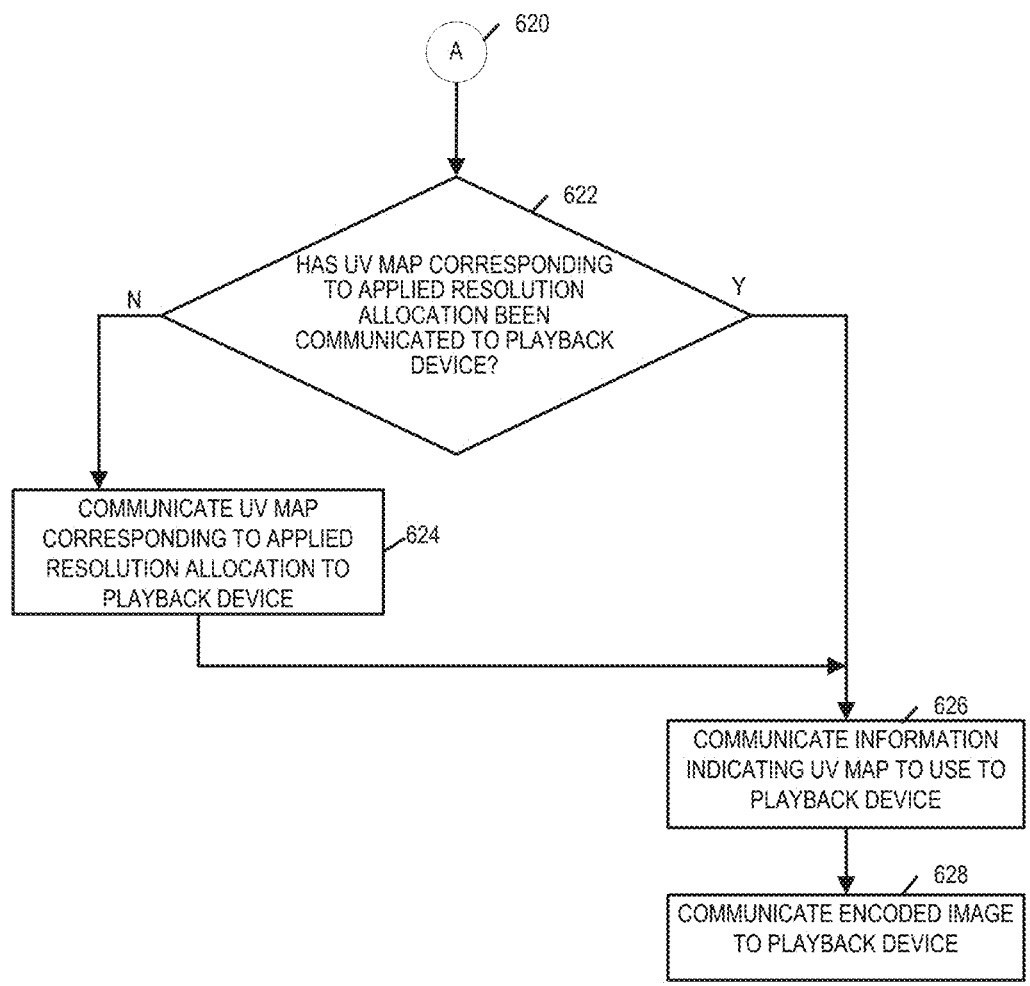
FIG. 6B illustrates a second part of a flowchart illustrating the steps of an exemplary method of streaming content in accordance with an exemplary embodiment implemented using the system of FIG. 1 in which selective resolution allocation and different UV maps are used at different times.

FIG. 6 which comprises FIGS. 6A and 6B is a flowchart 600 illustrating the steps of an exemplary method of providing image content, in accordance with an exemplary embodiment. FIG. 6A illustrates the first part of the flowchart 600. FIG. 6B illustrates the second part of flowchart 600. The method of flowchart 600 is implemented in some embodiments using the capturing system shown in FIG. 1.

The method 600 commences in start step 602 shown in FIG. 6A. Operation proceeds from step 602 to step 604. In step 604, a captured image is received. Operation proceeds from step 604 to step 606.

In step 606, the resolution allocation to be used is selected. The selection may be made for example based on motion. Operation proceeds from step 606 to decision step 608. In decision step 608, if a determination is made that the selected resolution is different from the previous resolution allocation then operation proceeds to step 610. Otherwise operation proceeds to step 612.

In step 610 new downsampling and/or filtering information corresponding to the selected resolution allocation used to control resolution reduction is loaded. Operation proceeds from step 610 to step 612.

In step 612, a resolution reduction operation is performed on the received captured image based on the determined resolution allocation to be used. The resolution reduction operation outputs a reduced resolution image 614 with at least some different image portions having different resolutions. Operation proceeds to step 616.

In step 616, the reduced resolution image is encoded using an encoder which supports compression, e.g., entropy encoding, run length encoding, motion vectors and/or other encoding techniques. Operation proceeds from step 616 to step 618.

In step 618, a UV map corresponding to the resolution allocation to be used for rendering the image subjected to determined resolution allocation, e.g., down sampling, is indicated. By specifying the UV map corresponding to the applied resolution allocation and/or by providing a UV map corresponding to the applied resolution allocation the playback device is provided with information which allows the communicated image to be applied to the 3D model of the environment taking into consideration which portions of the transmitted image were downsampled prior to being communicated to the playback device. Operation proceeds from step 618 to decision step 622 shown on FIG. 6B via connection node A 620.

In decision step 622 a determination is made as to whether the UV map corresponding to the applied resolution allocation has been communicated to the playback device. If the determination is that the UV map corresponding to the applied resolution allocation has not been communicated to the playback device then operation proceeds to step 624. If the determination is that the UV map corresponding to the applied resolution allocation has been communicated to the playback device then operation proceeds to step 626.

In step 624, the UV map corresponding to the applied resolution allocation is communicated to the playback device. Operation proceeds from step 624 to step 626.

In step 626, information indicating the UV map to use is communicated to the playback device. Operation proceeds from step 626 to step 628. In step 628, the encoded image is communicated to the playback device. This method may be executed with respect to each received captured image.

Figure 7:
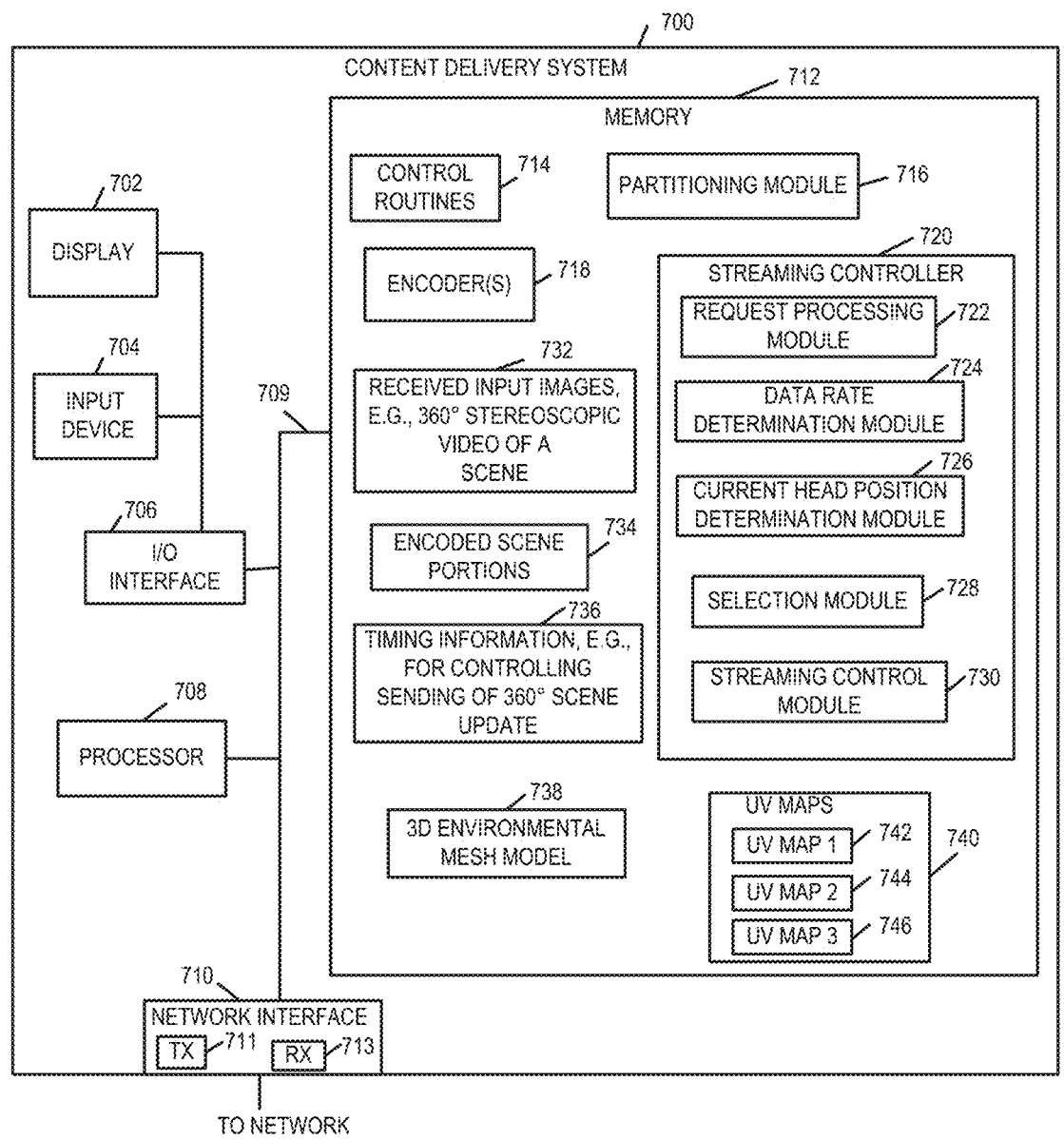
FIG. 7 illustrates an exemplary content delivery system with resolution allocation selection, resolution reduction and encoding capability that can be used to encode and stream content, along with corresponding UV maps, in accordance with the features of the invention.

FIG. 7 illustrates an exemplary content delivery system 700 with encoding capability that can be used to encode and stream content in accordance with the features of the invention.

The system may be used to perform encoding, storage, and transmission and/or content output in accordance with the features of the invention. In some embodiments the system 700 or the elements therein perform the operation corresponding to the process illustrated in FIG. 6. The content delivery system 700 may be used as the system 104 of FIG. 1. While the system shown in FIG. 7 is used for encoding, processing and streaming of content, it should be appreciated that the system 700 may also include the ability to decode and display processed and/or encoded image data, e.g., to an operator.

The system 700 includes a display 702, input device 704, input/output (I/O) interface 706, a processor 708, network interface 710 and a memory 712. The various components of the system 700 are coupled together via bus 709 which allows for data to be communicated between the components of the system 700.

The memory 712 includes various modules, e.g., routines, which when executed by the processor 708 control the system 700 to implement the partitioning, encoding, storage, and streaming/transmission and/or output operations in accordance with the invention.

The memory 712 includes various modules, e.g., routines, which when executed by the processor 707 control the computer system 700 to implement the immersive stereoscopic video acquisition, encoding, storage, and transmission and/or output methods in accordance with the invention. The memory 712 includes control routines 714, a partitioning module 716, encoder(s) 718, a streaming controller 720, received input images 732, e.g., 360 degree stereoscopic video of a scene, encoded scene portions 734, and timing information 736. In some embodiments the modules are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

The control routines 714 include device control routines and communications routines to control the operation of the system 700. The partitioning module 716 is configured to partition a received stereoscopic 360 degree version of a scene into N scene portions in accordance with the features of the invention.

The encoder(s) 718 may, and in some embodiments do, include a plurality of encoders configured to encode received image content, e.g., 360 degree version of a scene and/or one or more scene portions in accordance with the features of the invention. In some embodiments encoder(s) include multiple encoders with each encoder being configured to encode a stereoscopic scene and/or partitioned scene portions to support a given bit rate stream. Thus in some embodiments each scene portion can be encoded using multiple encoders to support multiple different bit rate streams for each scene. An output of the encoder(s) 718 is the encoded scene portions 734 which are stored in the memory for streaming to customer devices, e.g., playback devices. The encoded content can be streamed to one or multiple different devices via the network interface 710.

UV maps 740 are stored in memory 712 of the content delivery system 700. The UV maps 740 correspond to different resolution allocations and/or areas of the environment. For example, the first UV map 1 742 corresponds to a first resolution allocation, the second UV map 2 744 corresponds to a second resolution allocation, and the third UV map 746 corresponds to a third resolution allocation. UV maps with different resolution allocations can correspond to the same area of an environment. Different UV maps corresponding to other areas of the environment can be stored in the memory 712. Multiple UV maps may correspond to the environmental model. The mesh model of the environment where the received images were captured is stored in memory 712 of the content delivery system 700, e.g., 3D environmental mesh model 738. Multiple mesh models may be stored in the memory 712.

The streaming controller 720 is configured to control streaming of encoded content for delivering the encoded image content to one or more customer devices, e.g., over the communications network 105. In various embodiments various steps of the flowchart 600 are implemented by the elements of the streaming controller 720. The streaming controller 720 includes a request processing module 722, a data rate determination module 724, a current head position determination module 726, a selection module 728 and a streaming control module 730. The request processing module 722 is configured to process a received request for imaging content from a customer playback device. The request for content is received in various embodiments via a receiver 713 in the network interface 710. In some embodiments the request for content includes information indicating the identity of requesting playback device. In some embodiments the request for content may include data rates supported by the customer playback device, a current head position of the user, e.g., position of the head mounted display. The request processing module 722 processes the received request and provides retrieved information to other elements of the streaming controller 720 to take further actions. While the request for content may include data rate information and current head position information, in various embodiments the data rate supported by the playback device can be determined from network tests and other network information exchange between the system 700 and the playback device.

The data rate determination module 724 is configured to determine the available data rates that can be used to stream imaging content to customer devices, e.g., since multiple encoded scene portions are supported the content delivery system 700 can support streaming content at multiple data rates to the customer device. The data rate determination module 724 is further configured to determine the data rate supported by a playback device requesting content from system 700. In some embodiments the data rate determination module 724 is configured to determine data rates for delivery of image content based on network measurements.

The current head position determination module 726 is configured to determine a current viewing angle and/or a current head position of the user, e.g., position of the head mounted display, from information received from the playback device. In some embodiments the playback device periodically sends current head position information to the system 700 where the current head position determination module 726 receives and processes the information to determine the current viewing angle and/or a current head position.

The selection module 728 is configured to determine which portions of a 360 degree scene to stream to a playback device based on the current viewing angle/head position information of the user. The selection module 728 is further configured to select the encoded versions of the determined scene portions based on the available data rates to support streaming of content.

The streaming control module 730 is configured to control streaming of image content, e.g., multiple portions of a 360 degree stereoscopic scene, at various supported data rates in accordance with the features of the invention. In some embodiments the streaming control module 730 is configured to control the streaming of N portions of a 360 degree stereoscopic scene to the playback device requesting content to initialize scene memory in the playback device. In various embodiments the streaming control module 730 is configured to send the selected encoded versions of the determined scene portions periodically, e.g., at a determined rate. In some embodiments the streaming control module 730 is further configured to send 360 degree scene updates to the playback device in accordance with a time interval, e.g., once every minute. In some embodiments sending 360 degree scene update includes sending N scene portions or N-X scene portions of the full 360 degree stereoscopic scene, where N is the total number of portions into which the full 360 degree stereoscopic scene has been partitioned and X represents the selected scene portions recently sent to the playback device. In some embodiments the streaming control module 730 waits for a predetermined time after initially sending N scene portions for initialization before sending the 360 degree scene update. In some embodiments the timing information to control sending of the 360 degree scene update is included in the timing information 736. In some embodiments the streaming control module 730 is further configured identify scene portions which have not been transmitted to the playback device during a refresh interval; and transmit an updated version of the identified scene portions which were not transmitted to the playback device during the refresh interval.

In various embodiments the streaming control module 730 is configured to communicate at least a sufficient number of the N portions to the playback device on a periodic basis to allow the playback device to fully refresh a 360 degree version of said scene at least once during each refresh period.

Figure 8:
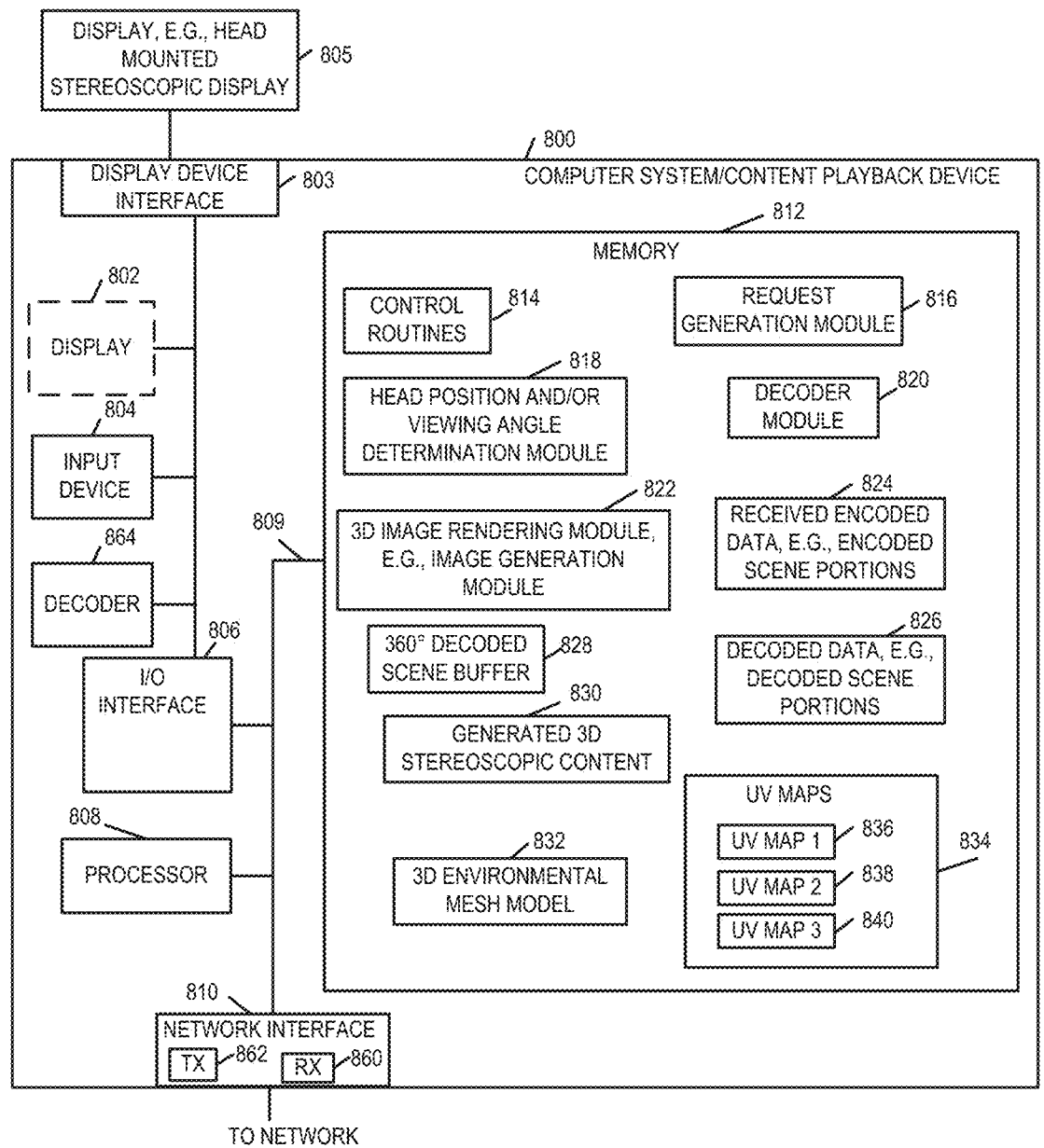
FIG. 8 illustrates an exemplary content playback device that can be used to receive, decode and display the content streamed by the system of FIG. 7 and may use the UV maps shown and described with reference to FIG. 24 and/or various other figures to allow different UV maps to be used for images having different resolution allocations.

FIG. 8 illustrates a computer system/playback device 800 implemented in accordance with the present invention which can be used to receive, decode, store and display imaging content received from a content delivery system such as the one shown in FIGS. 1 and 7. The playback device may be used with a 3D head mounted display such as the OCULUS RIFT™ VR (virtual reality) headset which may be the head mounted display 805. The device 800 includes the ability to decode the received encoded image data and generate 3D image content for display to the customer. The playback device in some embodiments is located at a customer premise location such as a home or office but may be located at an image capture site as well. The device 800 can perform signal reception, decoding, display and/or other operations in accordance with the invention.

The device 800 includes a display 802, a display device interface 803, input device 804, a decoder 864, input/output (I/O) interface 806, a processor 808, network interface 810 and a memory 812. The various components of the playback device 800 are coupled together via bus 809 which allows for data to be communicated between the components of the system 800. While in some embodiments display 802 is included as an optional element as illustrated using the dashed box, in some embodiments an external display device 805, e.g., a head mounted stereoscopic display device, can be coupled to the playback device via the display device interface 803. In some embodiments, the network interface 810 includes a receiver 860 and a transmitter 862.

The memory 812 includes various modules, e.g., routines, which when executed by the processor 808 control the playback device 800 to perform decoding and output operations in accordance with the invention. The memory 812 includes control routines 814, a request for content generation module 816, a head position and/or viewing angle determination module 818, a decoder module 820, a stereoscopic image rendering module 822 also referred to as a 3D image generation module, and data/information including received encoded image content 824, decoded image content 826, a 360 degree decoded scene buffer 828, and generated stereoscopic content 830.

The control routines 814 include device control routines and communications routines to control the operation of the device 800. The request generation module 816 is configured to generate a request for content to send to a content delivery system for providing content. The request for content is sent in various embodiments via the network interface 810. The head position and/or viewing angle determination module 818 is configured to determine a current viewing angle and/or a current head position of the user, e.g., position of the head mounted display, and report the determined position and/or viewing angle information to the content delivery system 700. In some embodiments the playback device 800 periodically sends current head position information to the system 700.

The decoder module 820 is configured to decode encoded image content 824 received from the content delivery system 700 to produce decoded image data 826. The decoded image data 826 may include decoded stereoscopic scene and/or decoded scene portions.

The 3D image rendering module 822 generates 3D images in accordance with the features of the invention, e.g., using the decoded image content 826, for display to the user on the display 802 and/or the display device 805. The generated stereoscopic image content 830 is the output of the 3D image generation module 822. Thus the rendering module 822 renders the 3D image content 830 to the display. In some embodiments the display device 805 may be a 3D display such as an oculus rift. The operator of the playback device 800 may control one or more parameters via input device 804 and/or select operations to be performed, e.g., select to display 3D scene.

FIG. 8 illustrates an exemplary content playback device that can be used to receive, decode and display the content streamed by the system of FIG. 7. The system 800 includes a display interface 803 coupled to a head mounted stereoscopic display 805, an input device 804, an optional display 802 and I/O interface. The interface 802 coupled the various input/output elements 803, 802, 804 to the bus 809 which in turn is coupled to processor 808, network interface 810 and memory 812. The network interface 810 allows the playback device to receive content from the streaming device 114 and/or communicate information such as view head position and/or position (camera rig) selection indicating selection of particular viewing position at an event. The memory 812 includes various data and modules as shown in FIG. 8. When executed the decoder module 820 causes received images to be decoded while 3D image rendering module 822 causes further processing of the images in accordance with the present invention and optionally stitching of images together as part of the presentation process.

Figure 9A:
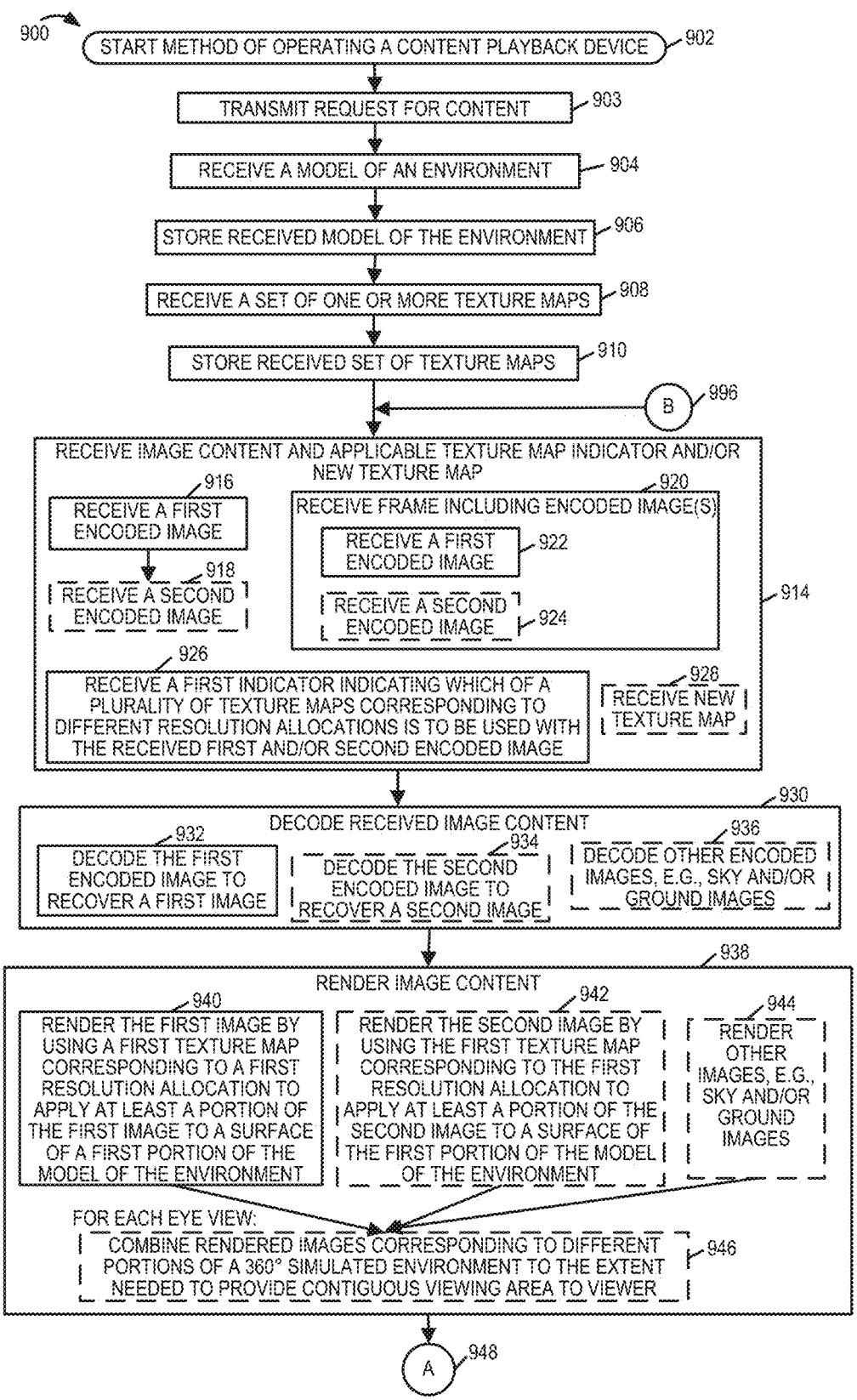
FIG. 9A illustrates the first part of an exemplary method of operating a content playback device in accordance with the present invention.
Figure 9B:
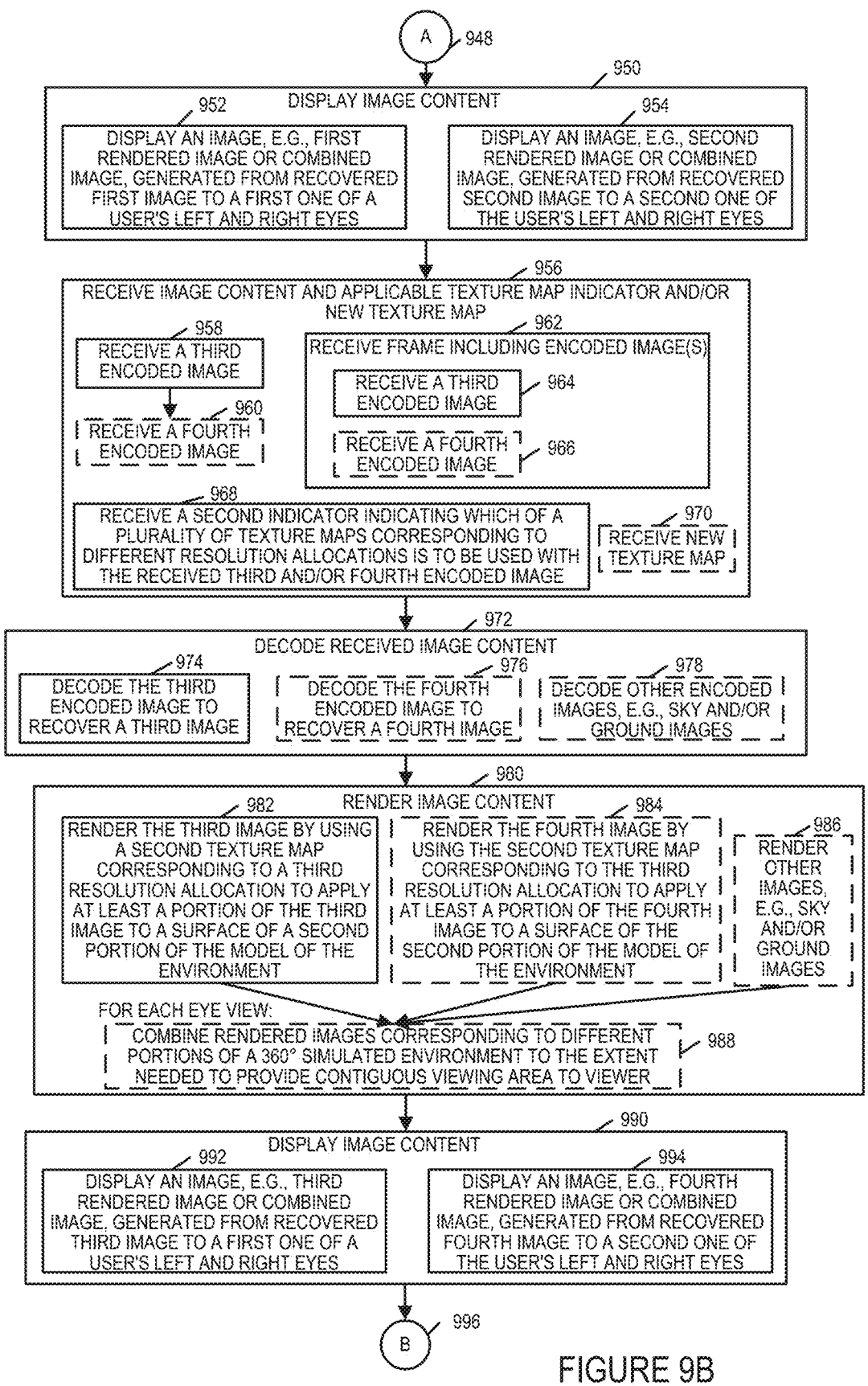
FIG. 9B illustrates the second part of an exemplary method of operating a content playback device in accordance with the present invention.

FIG. 9 which comprises a first part FIG. 9A and a second part FIG. 9B illustrates the steps 900 of a method of operating a content playback device. In accordance with the method 900 different UV maps may be used at different times for mapping a portion of one or more received images to an environmental model, e.g., a mesh model, of an environment. As a result of using different UV maps, while the number of pixels in a received image, e.g., encoded frame, may remain the same, the mapping of pixels of a received image to a segment of the environmental model may change. For example, using a first UV map may result in a first number of pixels in a received image mapping to a first portion of an environmental model while use of a second different UV map may result in a different number of pixels in a received image mapping to the same portion of the environmental model. The system generating and transmitting the images also in some embodiments communicates the UV maps and/or indicates to the playback device which UV map is to be used when mapping an image or set of images to the environmental model. Thus by changing the UV map to be used the encoding and transmission device can change the amount of data and/or resolution associated with a particular portion of the environmental model. Since the rendering involves stretching or otherwise conforming the indicated portion of an image to the corresponding segment of the 3D environmental model the image content will be scaled and/or otherwise modified as needed as part of the rendering process to cover the segment of the 3D model to which it applies. Consider for example if a first UV map maps one pixel to a first segment of the environmental model and a second UV map maps two pixels to the first segment of the environmental model, the resolution of the displayed first segment will be higher when the second UV map is used than when the first UV map is used for image rendering. While the UV map may be changed from image to image or from group of images to group of images thereby allowing the server generating and sending the images and UV map information to the playback device to dynamically alter the allocation of data and/or resolution within a portion of the environment, e.g., front portion, based on the scene areas considered of particular interest, e.g., scene areas where the actors, players, performers are in the environment or where movement is in the environment, the data rate used for transmitting images can be held relatively constant since the number of pixels in the images can remain the same with the UV map controlling the allocation of pixels to portions of the environment. Thus the methods allow for the image encoding technique to remain the same at least in some embodiments with the captured image or images being downsampled differently prior to encoding depending on the location of the scene portions considered of particular interest within a captured image and based on knowledge of which UV map will be used to apply the image, e.g., as a texture, to one or more segments of an environmental module. While the UV map may be changed on a per frame or image basis from one image or frame to the next, in some embodiments the change in UV maps is constrained to occur on I-frame or group of picture boundaries with a UV map being used for multiple frames within a group of pictures or between I-frames. While such a UV map transition constraint is used in some embodiments, it is not necessary or critical to the invention and some embodiments allow the UV map to be changed on a per frame basis.

The steps of the exemplary method 900 will now be discussed in detail. The method 900 starts in step 902, e.g., with a content playback device being powered on. The playback device may be, e.g., a game system connected to a head mounted display or TV or as is the case in various embodiments a cell phone mounted in a head mount with a touch pad or other control and one or more lenses for allowing a user to view left and right eye images on different portions of a cell phone screen which is used as a display device. The method 900 may be implemented by any of the content playback devices described in the present application.

In step 903, e.g., in response to user input indicating user selection of content to be played to a user, the content playback device transmits a request for content in step 903. In some embodiments this request is communicated to a content server or content provider system, e.g., a device which receives, processes and encodes images of an environment and supplies them to the playback device along with UV maps and/or information about which UV map to be used at a given time. The server may also provide an environmental model or a default model may be used.

In step 904 a model of an environment, e.g., a 3D mesh model is received, e.g., from the content server. The model may be and sometimes is a model of an environment where an event such as a play or sporting event is ongoing. The model may be a complete 360 degree model of the environment or a model of the portion of the environment to which image content is to be mapped, e.g., a front portion of the environment. As should be appreciated the features relating to using different UV maps to map images to a portion of the environment may be used for a full 360 degree environment, a portion of an environment, with stereo images and/or with non-stereoscopic images, e.g., panoramic images where the same image is displayed to both left and right eyes of a viewer.

Operation proceeds from step 904 to step 906 in which model of the environment received in step 903 is stored for future use, e.g., in rendering and displaying images mapped onto the model in accordance with one of the UV maps, e.g., texture maps, which are received in step 908. The texture maps may be and sometimes are received from the same server which provides the environmental model. The UV map indicates how a 2d image should be segmented with the segments then being applied to corresponding segments of the environmental model, e.g., as a texture or textures.

While an initial texture, e.g., initial UV map, may be received in step 908 in some embodiments a set of maps are received and stored with the different UV maps indicating different mappings between an image and a portion of the environmental model. Each map may be identified by a texture map identifier. During streaming of content the content server providing the images can indicate which texture map to use with which set of images. In other embodiments a new texture map may be streamed with or before the images to which the new texture map is to be applied. Storing of a set of texture maps in the playback device can provide efficient transmission since the maps can be reused without transmitting the UV/texture maps multiple times to the playback device.

In step 910 the received set of texture maps is stored for future use. With the texture maps having been stored, operation proceeds to step 914 in which image content is received. In step 904 in addition to image content an indicator identifying the texture map to be used to map the received image onto the model of the environment is received or the texture map to be used is received. When an indicator is received it identify the texture map in the stored set of texture maps which is to be used. An indicated texture map may remain in effect until a new texture map is specified and/or provided. Thus a single texture map may be used for a sequence of images, e.g., a group of pictures. The texture map may be changed by the sever when, e.g., motion is detected indicating a different area of the environment is an area of higher priority than an area to which high resolution was previously allocated. Thus as actors move or players on a field move, resolution allocation can be changed and the UV map corresponding to the current resolution allocation may be used in place of a previous UV map corresponding to a different resolution allocation.

Step 914 includes, in some embodiments steps 916, 918, 920, 926 and 928.

In step 916 a first encoded image is received. In step 918 which is optional, a second encoded image is received.

In step 920 which is an alternative to steps 916, 918 an encoded frame including one or both images is received. The second encoded image may be a second image of a stereoscopic image pair with the first and second images being left and right eye images to be displayed to a user of the playback device. For example odd lines of a frame may provide the first image and even lines of the encoded frame may provide the second encoded image. Alternatively a top half of an encoded frame may provide the first image and the bottom half the second image. Other ways of including the first and second images in a single frame are also possible.

In step 914, in addition to receiving image content which can be mapped to the environmental model, in step 926 a first indicator indicating which of a plurality of texture maps corresponding to different resolution allocation is to be used with the received first and/or second encoded images is also received. If a new texture map indicator is not received in step 914, and a new texture map is not received, the playback device will continue to use the last UV map which was being used. Rather than receive a texture map indicator, a new texture map may be received in step 928 which is to be used in rendering the received images.

With images received, e.g., in encoded form, operation proceeds from step 914 to step 930 In step 930 the received image or images are decoded. For example in step 932 the first encoded image is decoded to recover a first image. In step 934 the second encoded image is decoded to recover a second image. As discussed above, the first and second images may be left and right eye views. In embodiments where the first and second images are included in a single encoded frame decoding of the received frame and separation of the left and second images may be used in step 930 to produce left and right eye images which may be and sometimes are applied separately to the environmental map to generate separate, potentially different, left and right eye views.

In some embodiments the images communicate a complete 360 degree environment or panoramic view. In other embodiments the first and second images may correspond to a portion of the environment, e.g., a front portion or a 360 degree middle panoramic portion but not the sky and ground. In step 936 other images which are sent with the encoded first and second image or in a separate stream may be decoded to obtain textures for portions of the environment which are not provided by the first and/or second images. In some embodiments in step 936 a sky or ground image is obtained by decoding a received encoded image or frame.

With the decoding of images that were transmitted to the playback device having been completed in step 930 operation proceeds to step 938 in which image content is rendered using the received, e.g., decoded image or images, the UV map which was to be used in rendering the received images, and the environmental model. Step 938 involves applying the first image to the environmental model in accordance with UV map to be used. Thus the first image is used as a texture which is applied to segments of the environmental model in accordance with the applicable UV map, e.g., a first UV map. The rendering may be performed separately for left and right eye views.

In some embodiments step 938 includes step 940. In step 940 the first image is rendered by using the first texture map (UV map) corresponding to a first resolution allocation to apply at least a portion of the first image to a surface of a first portion, e.g., first segment, of the model of the environment. For example a first set of pixels of the first image may be mapped to the first segment of the mesh model of the environment based on the first texture map. In step 942 which may be performed in the case of stereo image playback, the second image is rendered by using the first texture map (UV map) corresponding to a first resolution allocation to apply at least a portion of the second image to a surface of the first portion, e.g., the first segment, of the model of the environment. For example a first set of pixels of the second image may be mapped to the first segment of the mesh model of the environment based on the first texture map. In optional step 944 images of portions of the environment not included in the first image, e.g., the sky or ground portions, are rendered, e.g., applied to the environmental model in accordance with a UV map relevant to these portions. It should be appreciated in some embodiments separate sky and ground portions are not communicated with such portions being part of the first and second images in some embodiments.

In operation step 946, which is performed for each eye view, rendered images corresponding to different portions of a 360 degree simulated environment are combined to the extent need to provide a contiguous viewing area to a user. Step 946 is performed separately for the left and right eye images since while the ground and sky portions may be the same for these images when they are presented in non-stereo format, the other portions of the left and right eye images may include differences which may result in the perception of depth when the left and right eye images are viewed by different eyes of a user of the playback device.

With the first image or pair of images having been applied to the model of the environment in step 938 operation proceeds to display step 950 via connecting node 948. In step 950 the rendered image content is displayed to a user of the playback device, e.g., on a display screen. In step 952 a first rendered image or a combined image generated from recovered first image content is displayed for viewing by one of a users left and right eyes or both eyes if stereoscopic display is not supported. In step 954 which is performed in the case of stereoscopic display, a second rendered image is displayed to a second one of a users left and right eyes. The displayed rendered second image is an image that was generated from recovered second image data or a combination of recovered, e.g., decoded second image data and data from another image, e.g., a sky or ground image portion.

With one image or pair of images having been rendered and displayed, operation proceeds to step 956 in which content corresponding to another image or pair of images is received and processed. The image or images received in step 956 may be and sometimes do correspond to a second group of pictures and corresponds to a different point in time than the first image. Thus, between the time the first image was captured and the third image received in step 956 was captured the players, actors or an area of motion may have shifted position from where the activity was at the time the first image was captured. For example, while remaining in a forward field of view, the players on a field may have moved left triggering the sever providing the third image to use a resolution allocation giving more resolution to the left portion of the front field of view than a center or right portion where the action was at the time the first image was captured. The different resolution allocation, e.g., a second resolution allocation by the server or encoding device, will correspond to specification that the playback device should use a different UV map, e.g., a second texture map, for rendering the third image than the first image. For example, the second UV map may specify using fewer pixels from the third image to map to the first segment than were used to map from the first image to the first segment of the environmental map and to use more pixels from third image to map to a second segment located in the left side of the forward field of view in the environmental model where the action is now located at the time of capture of the third image than were used to map to the second segment of the environmental map from the first frame.

Step 956 will now be discussed in detail. Step 956 includes, in some embodiments, steps 958, 960, 962, 926 and/or 968.

In step 958 a third encoded image is received. In step 960 which is optional, a fourth encoded image is received.

In step 962 which is an alternative to steps 958, 960 an encoded frame including one or both of the third and fourth encoded images is received.

The third encoded image may be a first image of a second stereoscopic image pair with the third and fourth images being left and right eye images to be displayed to a user of the playback device.

In step 956, in addition to receiving image content which can be mapped to the environmental model, in step 968 a second indicator indicating which of a plurality of texture maps corresponding to different resolution allocation is to be used with the received third and/or fourth encoded images is also received. If a new texture map indicator is not received, in step 968 and a new texture map is not received, the playback device will continue to use the last UV map which was being used. Rather than receive a texture map indicator, a new texture map may be received in step 970 which is to be used in rendering the received third and/or fourth images.

With images received, e.g., in encoded form, operation proceeds from step 956 to step 970. In step 970 the received third and/or fourth image or images are decoded. For example in step 974 the third encoded image is decoded to recover a third image. In step 976 the fourth encoded image is decoded to recover a fourth image. As discussed above, the third and fourth images may be left and right eye views. In embodiments where the third and fourth images are included in a single encoded frame decoding of the received frame and separation of the third and fourth images may be performed in step 972 to produce left and right eye images which may be and sometimes are applied separately to the environmental map to generate separate, potentially different, left and right eye views.

In some embodiments the third and/or fourth images communicate a complete 360 degree environment or panoramic view. In other embodiments the third and fourth images may correspond to a portion of the environment, e.g., a front portion or a 360 degree middle panoramic portion but not the sky and ground. In step 978 other images which are sent with the encoded third and fourth images or in a separate stream may be decoded to obtain textures for portions of the environment which are not provided by the third and/or fourth images. In some embodiments in step 986 a sky or ground image is obtained by decoding a received encoded image or frame.

With the decoding of images that were transmitted to the playback device having been completed in step 972 operation proceeds to step 980 in which image content is rendered using the received, e.g., decoded image or images, the UV map which was to be used in rendering the received images, e.g., the second UV map, and the environmental model. Step 980 involves applying the third image to the environmental model in accordance with second UV map to be used which results in a different allocation of pixels from the received image to the model of the environment than occurred when using the first UV map. Thu, as part of the rendering the third image is used as a texture which is applied to segments of the environmental model in accordance with the applicable UV map, e.g., the second UV map. The rendering may be performed separately for left and right eye views.

In some embodiments step 980 includes step 982. In step 982 the third image is rendered by using the second texture map (UV map) corresponding to a second resolution allocation to apply at least a portion of the third image to a surface of the first portion, e.g., first segment, of the model of the environment. For example a first set of pixels of the third image may be mapped to the first segment of the mesh model of the environment based on the second texture map where the first set of pixels includes fewer pixels than the first set which were mapped when the first UV map was used. A second set of pixels may be mapped to a second segment of the model where the second set of pixels includes more pixels than were mapped to the second segment when the first UV map was used. Thus by using different UV maps to map an image to the model, different allocations of the limited number of pixels to portions of the model of the environment may be achieved in an easy manner without having to alter the number of pixels transmitted in the encoded images provided to the playback device.

In step 978 which may be performed in the case of stereo image playback, the fourth image is rendered by using the second texture map (UV map) corresponding to the second resolution allocation to apply at least a portion of the fourth image to a surface of the first portion, e.g., the first segment, of the model of the environment. Similarly the second UV map is used to control mapping of pixels from the fourth image to the second segment of the environmental model.

In optional step 986 images of portions of the environment not included in the first image, e.g., the sky or ground portions, are rendered, e.g., applied to the environmental model in accordance with a UV map relevant to these portions. It should be appreciated in some embodiments separate sky and ground portions are not communicated with such portions being part of the first and second images in some embodiments.

In operation step 988, which is performed for each eye view, rendered images corresponding to different portions of a 360 degree simulated environment are combined to the extent need to provide a contiguous viewing area to a user. Step 988 is performed separately for the left and right eye images since while the ground and sky portions may be the same for these images when they are presented in non-stereo format, the other portions of the left and right eye images may include differences which may result in the perception of depth when the left and right eye images are viewed by different eyes of a user of the playback device.

With the third image, which may be part of a second pair of images, having been applied to the model of the environment in step 980 operation proceeds to display step 990. In step 990 the rendered image content is displayed to a user of the playback device, e.g., on a display screen. In step 992 a third rendered image or a combined image generated from recovered third image content is displayed for viewing by one of a users left and right eyes or both eyes if stereoscopic display is not supported. In step 994 which is performed in the case of stereoscopic display, a fourth rendered image is displayed to a second one of a user's left and right eyes. The displayed rendered fourth image is an image that was generated from recovered fourth image data or a combination of recovered, e.g., decoded fourth image data and data from another image, e.g., a sky or ground image portion.

The process of receiving and decoding images and rendering images using the UV map provided or specified by the server providing the images occurs on an ongoing basis as represented with operation proceeding from step 990 back to step 914 via connecting node B 996 allowing for additional images to be received and processed, e.g., a new first and second images.

In some embodiments the images correspond to a live sporting event with the server providing the images specifying different UV maps to be used during different portions of the sporting event based on where the action is occurring on the sports field with the generation of the images to be transmitted in encoded form taking into consideration the UV map which will be used to render the images. Thus, by specifying the use of different UV maps at different times resolution can be dynamically allocated to match where the action is occurring on a sports field or in an environment.

Figure 11:
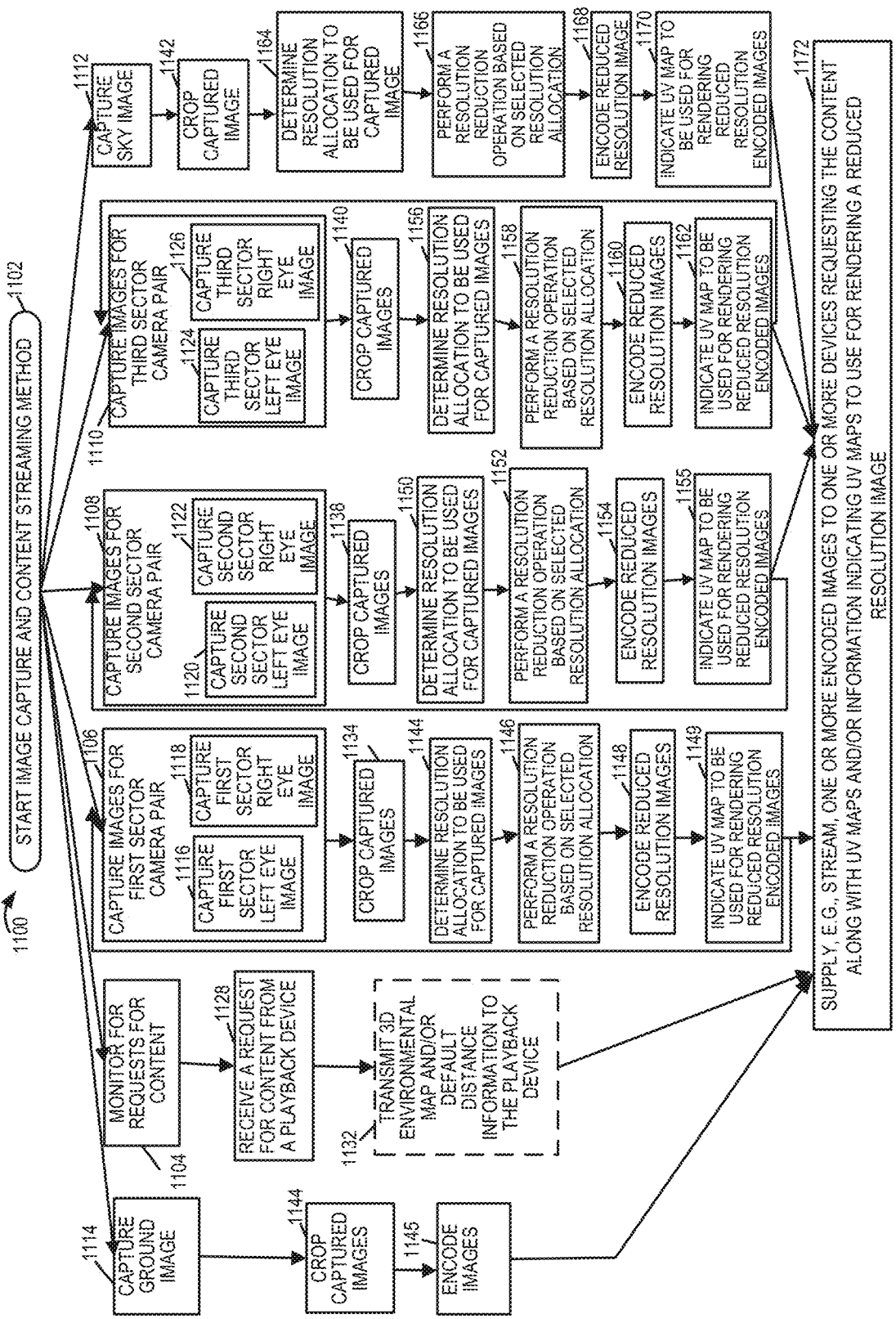
FIG. 11 illustrates an exemplary image capture and content streaming method in accordance with an exemplary embodiment in which different resolution allocations can be used for images corresponding to the same environmental portion at different times.

FIG. 11 which illustrates an image capture and content streaming method in accordance with an exemplary embodiment. The method 1100 shown in FIG. 11 starts in step 1102 when it is time to capture images, e.g., images corresponding to an event such as a sporting event or music performance.

From start step 1102 operation proceeds along a plurality of paths, the paths bringing with steps 1114, 1104, 1106, 1108, 1110, 1112, which may be performed in parallel and, optionally, asynchronously.

To facilitate an understanding of the image capture process reference will now be made to the exemplary camera rig shown in FIG. 13. The camera rig 1300 can be used as the rig 102 of the FIG. 1 system and includes a plurality of stereoscopic pairs each corresponding to a different one of three sectors. The first camera pair 1301 includes a left eye camera 1302 and a right camera 1304 intended to capture images corresponding to those which would be seen by a left and right eye of a person. Second sector camera pair 1305 includes left and right cameras 1306, 1308 while the third sector camera pair 1309 includes left and right cameras 1310, 1312. Each camera is mounted in a fixed position in the support structure 1318. An upward facing camera 1314 is also included. A downward facing camera which is not visible in FIG. 13 may be included below camera 1314. Stereoscopic camera pairs are used in some embodiments to capture pairs of upward and downward images however in other embodiments a single upward camera and a single downward camera are used. In still other embodiments a downward image is captured prior to rig placement and used as a still ground image for the duration of an event. Such an approach tends to be satisfactory for many applications given that the ground view tends not to change significantly during an event.

The output of the cameras of the rig 1300 are captured and processed by the method of FIG. 11 which will now be discussed further. Image capture steps shown in FIG. 11 are normally performed by operating a camera of the camera rig 102 to capture an image while encoding of images is performed by encoder 112 with responses to streaming requests and streaming of content being preformed by the streaming server 114.

In the first path of FIG. 11 which relates to downward image capture and processing, in step 1114 an image is captured of the ground, e.g., beneath rig 102. This may happen prior to rig placement or during the event if the rig includes a downward facing camera. From step 1114 operation proceeds to steps 1144 where the captured image is cropped prior to encoding in step 1145. The encoded ground image is then stored pending a request for content which may be responded to by supplying one or more encoded images in step 1146 to a requesting device.

The second processing path shown in FIG. 11 which starts with step 1104 relates the processing and responding to requests for content. In step 1104 monitor for request for content occurs, e g., by content server 114. In step 1128 a request for content is received from a playback device, e.g. device 122 located at customer premise 106.

In response to the content request the playback device is provided with information including one or UV maps corresponding to different resolution allocations which may be used.

From step 1104 operation proceeds to step 1128 in which is performed in cases where an environmental map was generated and/or other environmental information which may be different from a predetermined default setting or environmental is supplied to the playback device to be used in rendering images as part of an environmental simulation.

Thus, via step 1132 a playback device requesting content is provided the information need to model the environment and/or with other information which may be needed to render images onto the model. In addition to model information step 1132 may optionally include communication of a set of UV maps to the playback device requesting content for future use, e.g., with some different UV maps corresponding to different resolution allocations but the same area of a model in some embodiments.

Figure 13:
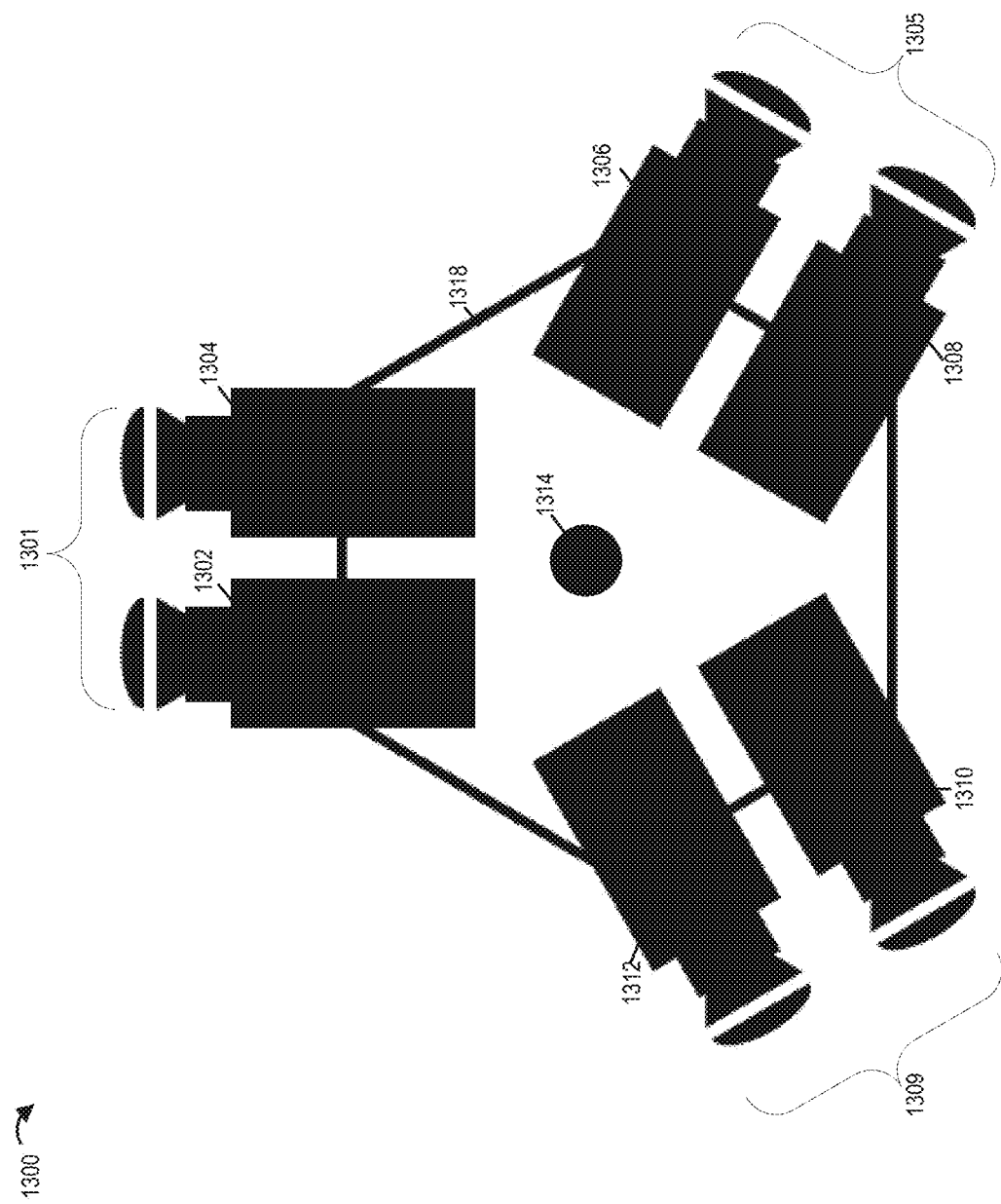
FIG. 13 illustrates a camera rig including multiple camera pairs for capturing left and right eye images corresponding to different sectors of a 360 degree field of view along with a camera or cameras directed towards the sky to capture a sky view.
Figure 14:
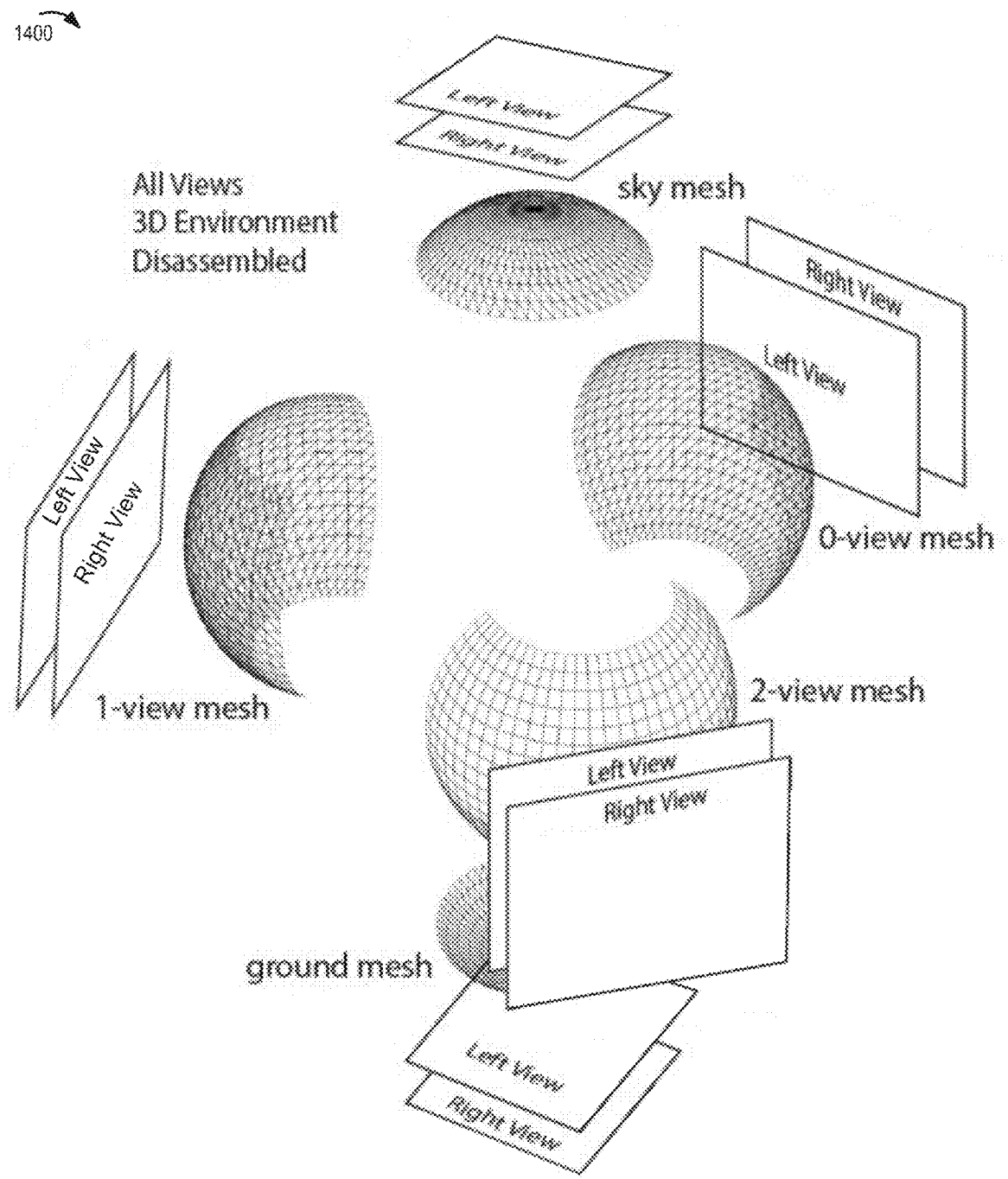
FIG. 14 shows how 5 different environmental mesh maps, corresponding to different camera views, can be combined to create a complete spherical view/environment onto which captured images can be projected, e.g., onto the inner surface, as part of a playback operation.

In some embodiments when the FIG. 13 camera rig is used each of the sectors corresponds to a known 120 degree viewing area with respect to the camera rig position, with the captured images from different sector pairs being seamed together based on the images known mapping to the simulated 3D environment. While a 120 degree portion of each image captured by a sector camera is normally used, the cameras capture a wider image corresponding to approximately a 180 degree viewing area. Accordingly, captured images may be subject to masking in the playback device as part of the 3D environmental simulation or cropping prior to encoding. FIG. 14 is a composite diagram 1400 showing how a 3D spherical environment can be simulated using environmental mesh portions which correspond to different camera pairs of the rig 102. Note that one mesh portion is shown for each of the sectors of the rig 102 with a sky mesh being used with regard to the top camera view and the ground mesh being used for the ground image captured by the downward facing camera.

Figure 15:
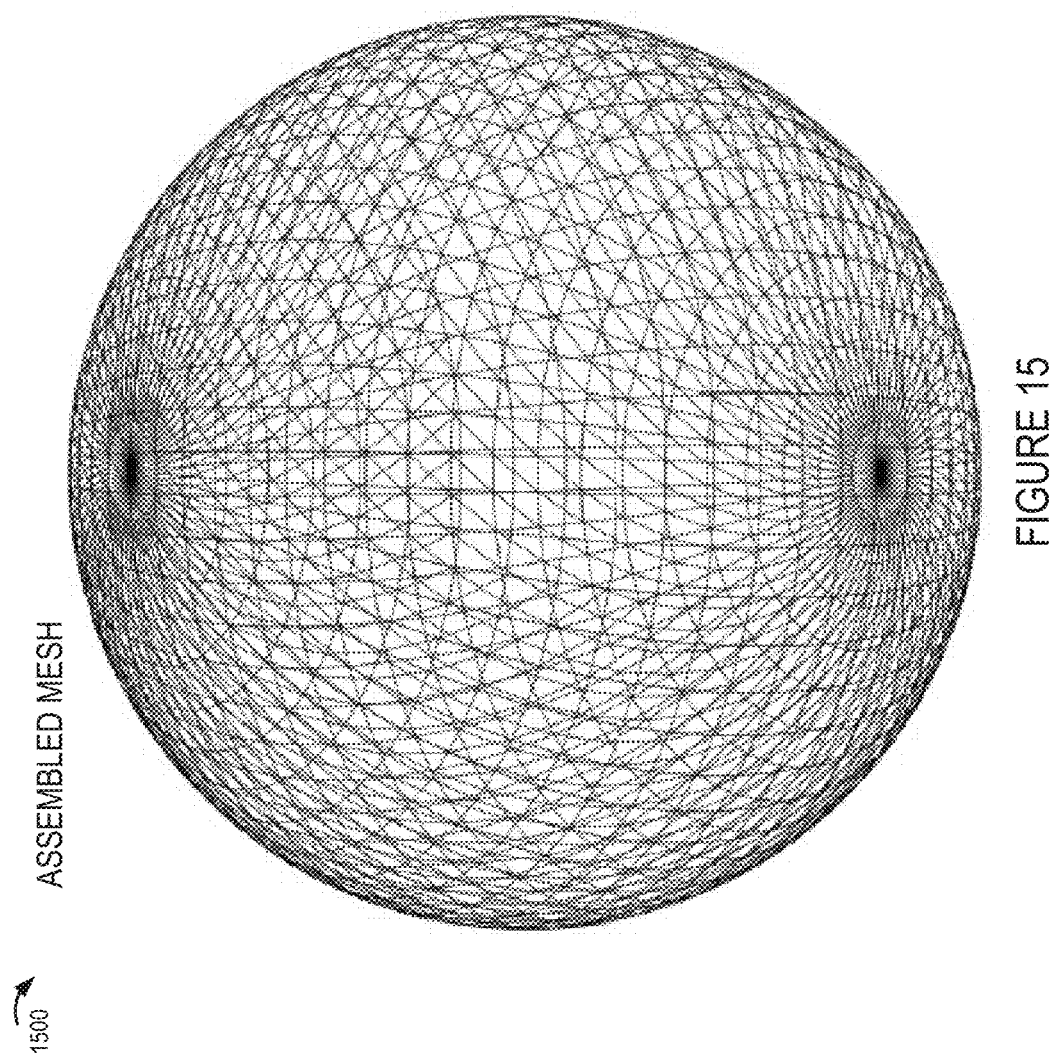
FIG. 15 shows the full assembly of 5 meshes shown in FIG. 14 to create a spherical simulated environment which can be viewed from a user as if he/she were located at the center of the environment, e.g., sphere.

When combined the overall meshes corresponding to different cameras results in a spherical mesh 1500 as shown in FIG. 15. Note that the mesh 1500 is shown for a single eye image but that it is used for both the left and right eye images in the case of stereoscopic image pairs being captured.

Mesh information of the type shown in FIG. 14 can and sometimes is communicated to the playback device in step 1132. The communicated information will vary depending on the rig configuration. For example if a larger number of sectors were used masks corresponding to each of the sectors would correspond to a small viewing area than 120 degrees with more than 3 environmental grids being required to cover the diameter of the sphere.

Environmental map information is shown being optionally transmitted in step 1132 to the playback device. It should be appreciated that the environmental map information is optional in that the environment may be assumed to be a default size sphere in the event such information is not communicated having a predetermined number of segments arranged in a known mesh. In cases where multiple different default size spheres are supported an indication as to what size sphere is to be used may be and sometimes is communicated in step 1132 to the playback device.

Operation proceeds from step 1132 to streaming step 1146. Image capture operations may be performed on an ongoing basis during an event particularly with regard to each of the 3 sectors which can be captured by the camera rig 102. Accordingly, processing paths starting with steps 1106, 1108 and 1110 which correspond to first, second and third sectors of the camera rig are similar in terms of their content.

Figure 16:
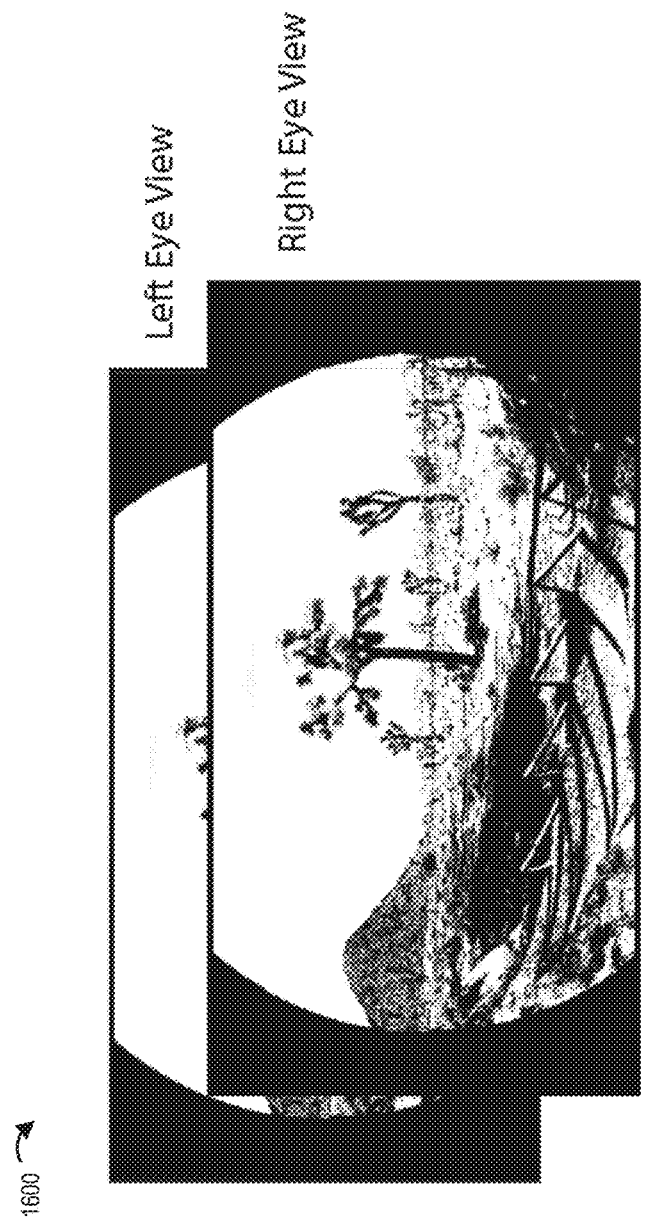
FIG. 16 shows a left eye view image and a right eye view image captured by left and right eye cameras, with fisheye lenses, corresponding to a sector of the camera rig shown in FIG. 13.

In step 1106, the first sector pair of cameras is operated to capture images, e.g., a left eye image in step 1116 and a right eye image in step 1118. FIG. 16 shows an exemplary image pair 1600 that may be captured in step 1106. The captured images are then cropped in step 1134, e.g., to remove undesired image portions such as image portions captured by another camera pair. In step 1144 a resolution allocation to be used for the captured left and right eye image is determined, e.g., selected. The selection may be based in information about which portion of the environment and thus captured images was important at the time of the capture of the images. The importance information may be based on detection of where individuals at the event being videoed are looking at the time of image capture, system controller input and/or the location of motion in the environment at the time of image capture. A resolution reduction operation is performed on the captured images in step 1146 based on the determined, e.g., selected, resolution allocation. The selected resolution allocation may be one of a plurality of supported resolution allocations corresponding to different supported UV maps corresponding to the portion of the environment captured by the first sector camera pair. In step 1148 the reduced resolution images generated in step 1146 are encoded. Information indicating the UV map to be used for rendering the reduced resolution images generated in step 1146 is generated in step 1149 and will, in some embodiments be associated with and transmitted with the encoded images generated in step 1146 so that the playback device can determine which UV map to use when rendering images recovered by decoding the encoded images generated in step 1146.

Figure 17A:
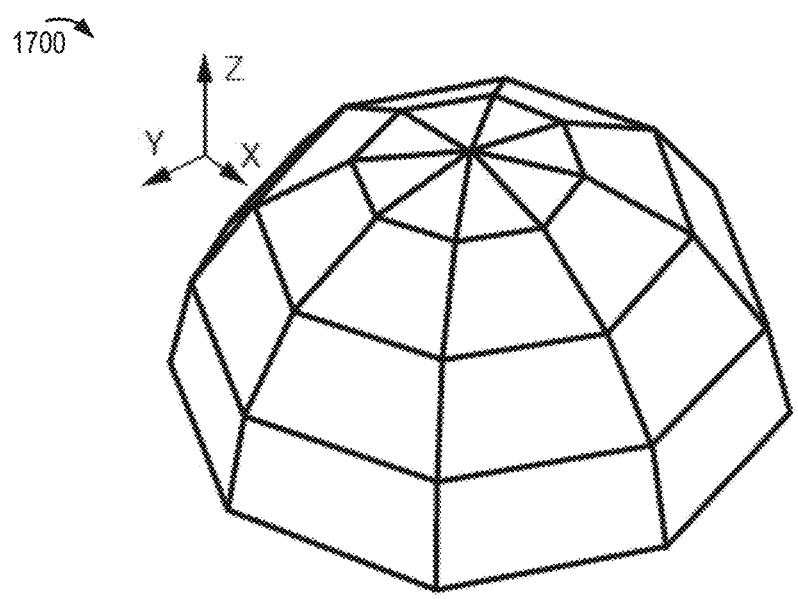
FIG. 17A shows an exemplary mesh model of an environment in accordance with the invention.

FIG. 17A shows an exemplary mesh model 1700 of an environment in accordance with the invention.

Figure 17B:
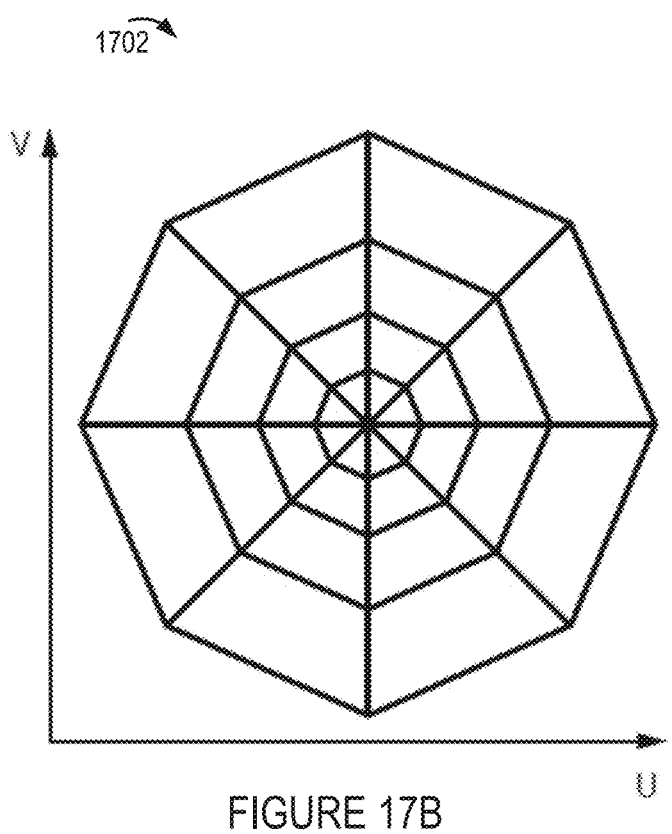
FIG. 17B shows a UV map which can be used to map portions of a 2D image onto surfaces of the mesh model shown in FIG. 17A.

FIG. 17B shows a UV map 1702 which can be used to map portions of a 2D image onto surfaces of the mesh model shown in FIG. 17A.

Figure 18:
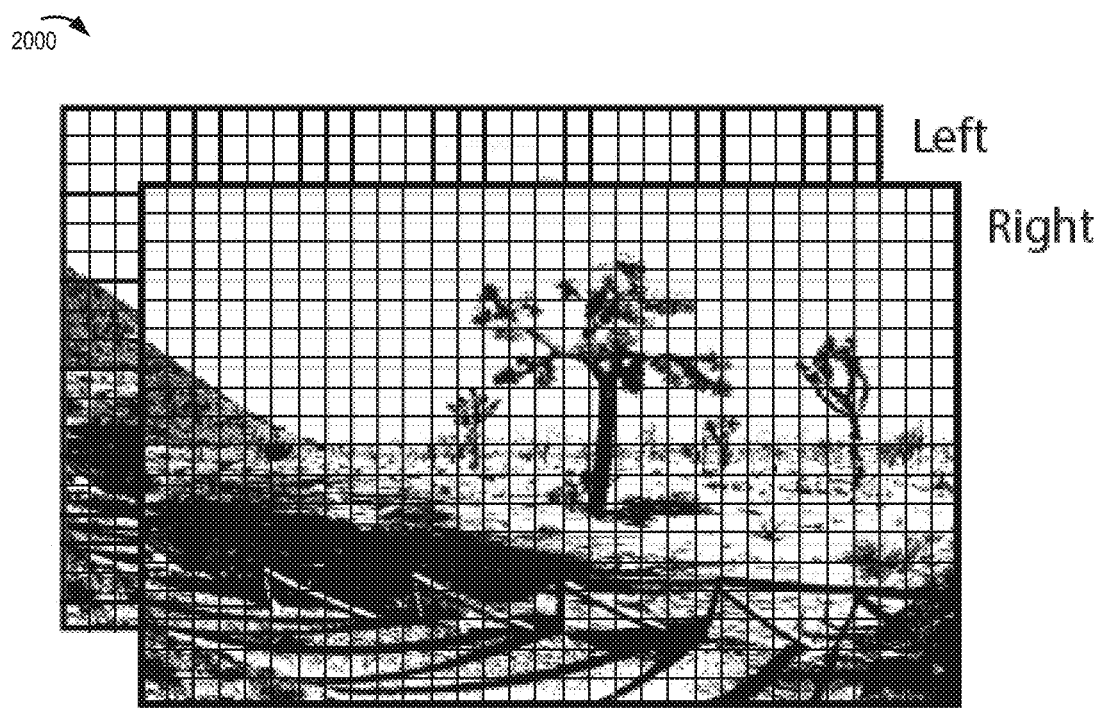
FIG. 18 shows how captured left and right eye view images of FIG. 16 may appear after cropping prior to encoding and transmission to one or more playback devices.

FIG. 18 shows an exemplary result 2000 of cropping the left and right eye view images of FIG. 16 as may occur in step 1134. The cropping of image pair shown in FIG. 18 may be performed prior to encoding and transmission to one or more playback devices.

The image capture, cropping and encoding is repeated on an ongoing basis at the desired frame rate as indicate by the arrow from step 1149 back to step 1106.

Similar operations to those described with regard to the images captured for the first camera pair are performed for the images captured by the second and third sector camera pairs.

In step 1172 the encoded images generated from the captured images are streamed to a playback device along with the information indicating the UV maps to be used in rendering the encoded images being streamed. In some embodiments before a UV map is used it is communicate in the content stream prior to the encoded image for which it is being supplied. Thus in some embodiments rather than being supplied with the UV maps via a separate channel or set of information in some embodiments the UV maps are embedded in the content stream used to deliver the encoded images to requesting playback device or devices.

Figure 12:
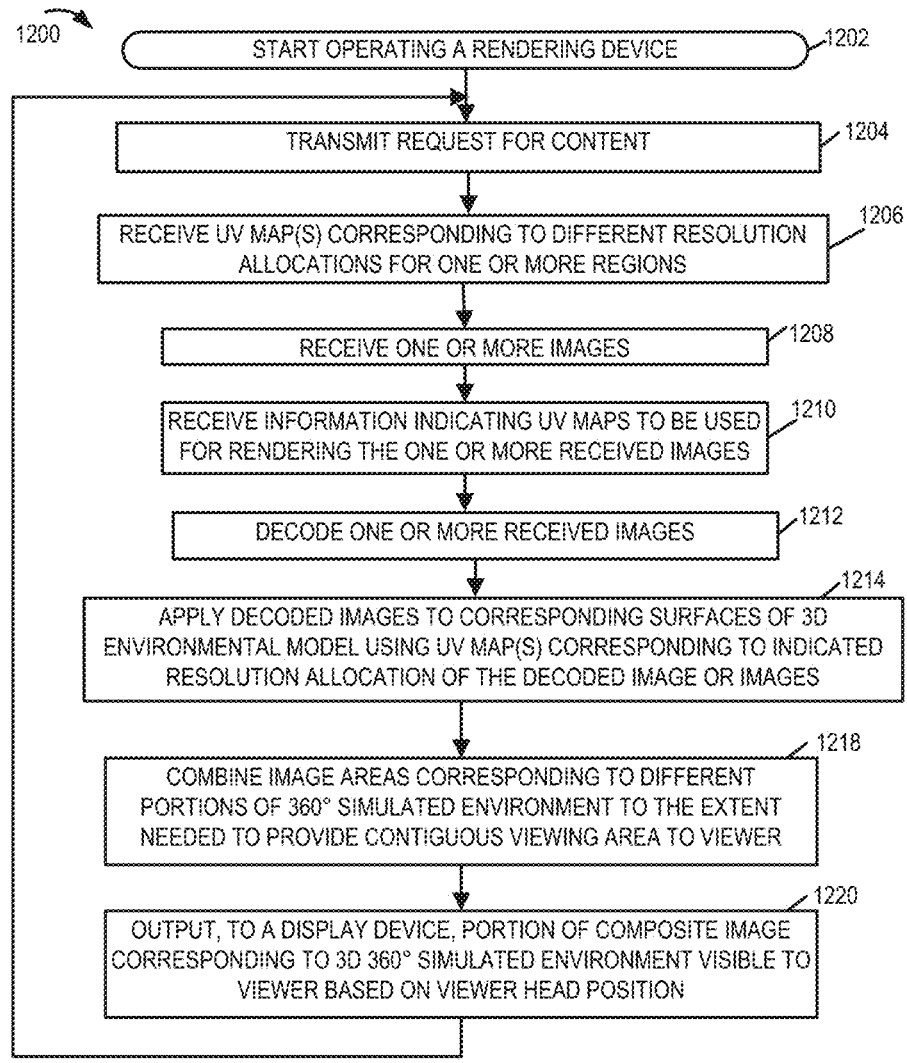
FIG. 12 illustrates a method of operating a playback device or system, e.g., a rendering device, which can be used in the system of FIG. 1, to receive and render images using UV maps and an environmental model in accordance with one exemplary embodiment.

FIG. 12 illustrates a method 1200 of operating a playback device or system, which can be used in the system of FIG. 1, in accordance with one exemplary embodiment. The method 1200 beings in start step 1202. In step 1204 the playback device transmits a request for content, e.g., to the streaming server of FIG. 1. The playback device then receives in step 1206 various information which may be used for rendering images. For example environmental model information may be received in step 1206 as well as one or more UV maps corresponding to different resolution allocations for one or more regions of the environment. Thus, in step 1206, the playback device may receive environmental model and/or UV map information corresponding to different resolution allocations. The information received in step 1206 is stored in memory for use on an as needed basis.

Operation proceeds from step 1206 to step 1208 in which one or more images are received, e.g., image captured of an environment to be simulated while an event was ongoing in the environment. In step 1210 information indicating which UV maps are to be used for rendering the one or more received images is indicated. In some embodiments the information indicates which UV map in a set of UV maps corresponding to different resolution allocation which may have been used for a portion of the environment is to be used for rendering left and right eye images of a frame pair, e.g., corresponding to a front portion of an environment. In step 1212 one or more of the received images are decoded.

Operation proceeds from step 1212 to steps 214 in which the decoded images corresponding to surfaces of the environmental model are applied using one or more UV maps corresponding to the indicated resolution allocation that was used to generate the decoded image or images. Operation proceeds from steps 1214 to step 1218 in which image areas corresponding to different portions of the 360 degree simulated environment are combined to the extent needed to generate a contiguous image of a viewing area to be displayed. Then in step 1220 the images are output to a display device with, in the case of stereoscopic image content, different images being displayed to a user's left and right eyes. Operation process from step 1220 back to step 1204 with content being requested, received and processed on an ongoing basis.

Figure 19:
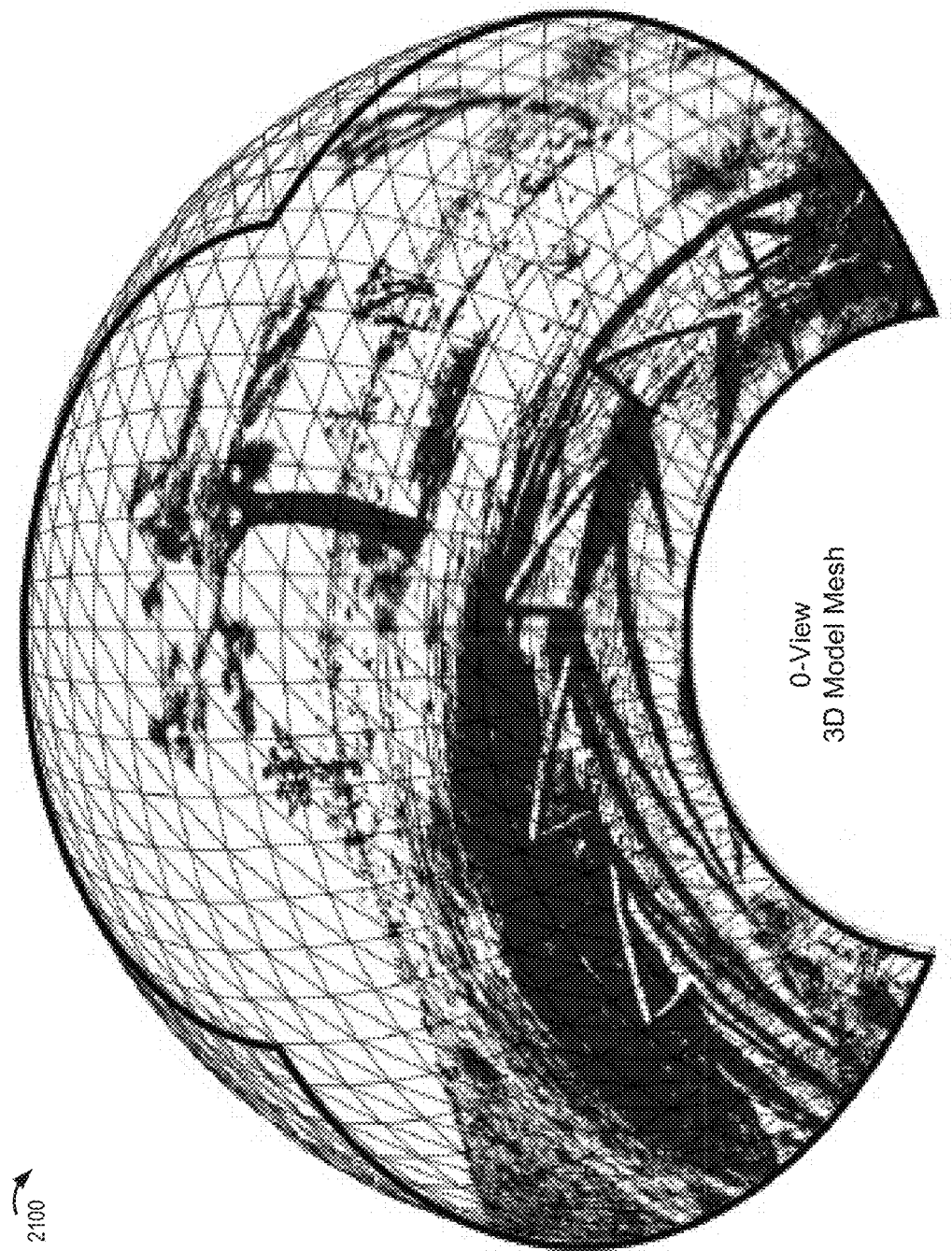
FIG. 19 shows an environmental mesh model corresponding to one sector of the camera rig with one of the images shown in FIG. 18 applied, e.g., projected, onto the environmental mesh.

FIG. 19 is a drawing 2100 that illustrates mapping of an image portion corresponding to a first sector to the corresponding 120 degree portion of the sphere representing the 3D viewing environment.

In step 1216, images corresponding to different portions of the 360 degree environment are combined the extent needed to provide a contiguous viewing area to the viewer, e.g., depending on head position. For example, ins step 1218 if the viewer is looking at the intersection of two 120 degree sectors portions of the image corresponding to each sector will be seemed and presented together to the viewer based on the know angle and position of each image in the overall 3D environment being simulated.

Figure 20:
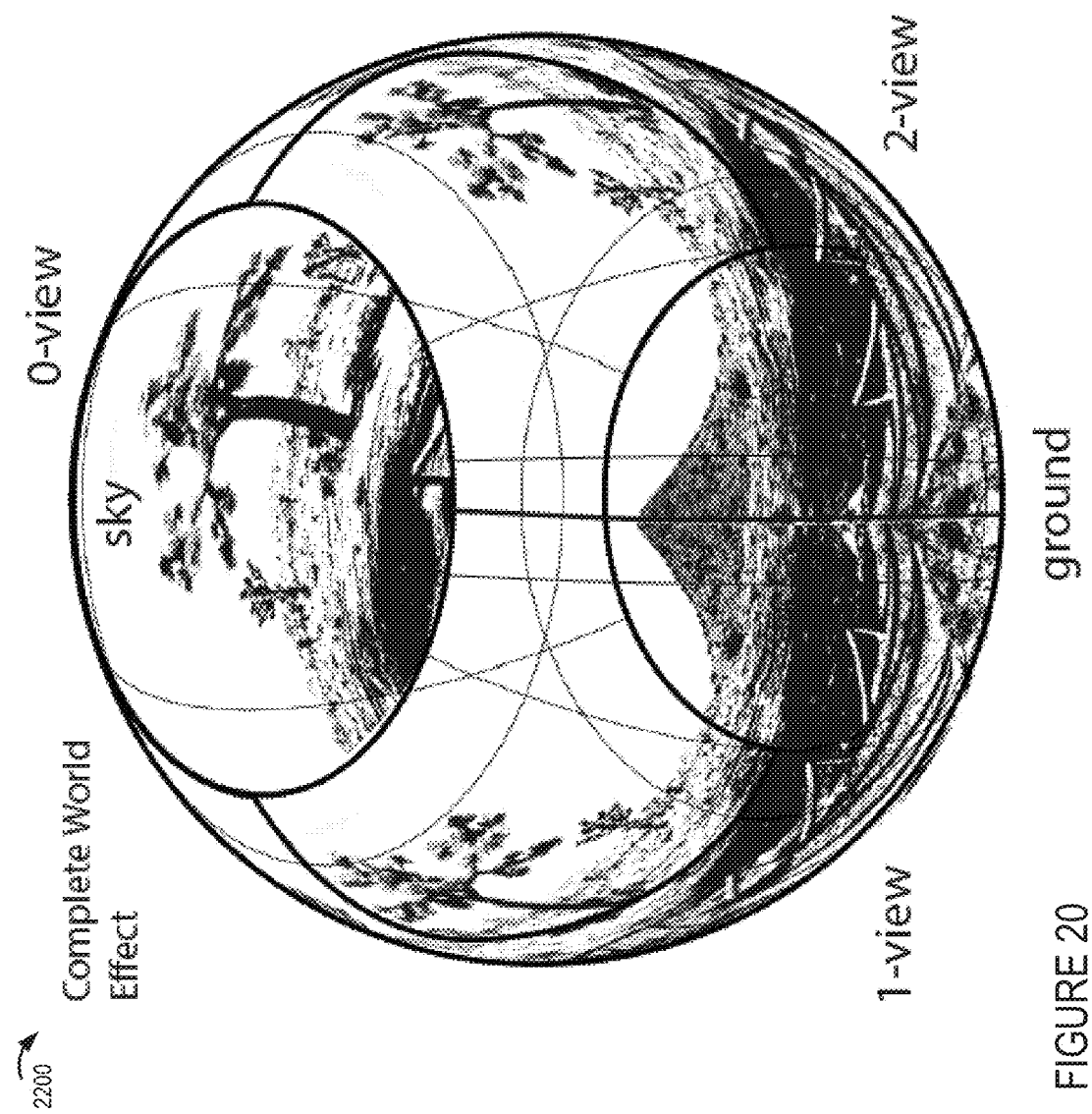
FIG. 20 shows application of images captured by cameras corresponding to each of the sectors as well as the sky and ground cameras of the camera rig can be combined and projected onto the modeled environment to simulate a complete 360 environment in the form of a sphere.

FIG. 20 is an illustration 2200 showing the result of applying textures to mesh models to form a complete 360 degree view of an environment which may be presented to a user viewing the environment from the perspective of being located in the center of the illustrated environment and with the images applied to the inside of the spherical environment. The result of the simulation and display is a complete world effect in which a user can turn and look in any direction.

The mapped images are output to a display device in step 1220 for viewing by a user. As should be appreciated the images which are displayed will change over time based on the received images and/or because of changes in head position or the user selected viewer position.

Methods and apparatus for supporting delivery, e.g., streaming, of video or other content corresponding to an environment are described. In some embodiments the images corresponding to the environment which are communicated to a playback device exceed the area a user can view at a given time so that content is available in the event the user changes his/her viewing angle by, for example, moving his/her head. By providing images for an environmental area larger than that which can be viewed by a user at a given time the playback device has enough information to provide images should the user's viewing angle change without the playback device having to wait for new images or other content corresponding to a portion of the environment which the user was not previously viewing.

In at least some embodiments the environment is represented using a mesh. Images are captured and encoded into frames, e.g., frames intended for viewing by a left eye and frames intended to be viewed by a right eye. While the techniques are described in the context of 3D stereoscopic applications, the methods can be used for stereoscopic viewing as well with a single stream of frames being communicated rather than a stream of frame pairs.

In some embodiments the techniques are used to communicate images corresponding to a 360 degree viewing area. However, the techniques may be used for communicating images corresponding to less than a 360 degree viewing area, e.g., with a single frame communicating image content corresponding to the 360 degree viewing area. The methods and apparatus of the present invention are particularly well suited for streaming of stereoscopic and/or other image content where data transmission constraints may make delivery of 360 degrees of content difficult to deliver at the maximum supported quality level, e.g., using best quality coding and the highest supported frame rate. However, the methods are not limited to stereoscopic content.

In various embodiments images corresponding to a 360 degree or other area are captured and combined to form an image of the area. The different portions of the image content of the area, e.g., a 360 degree environment, are mapped to a frame which is to be encoded and transmitted. Separate frames may be generated and transmitted for each of the left and right eye views. While the image content corresponding to different portions of the area may have been captured at the same resolution, the mapping of the captured images to the frame may, and in some embodiments is, different for different areas of the environment. For example, the front view portion of the environment may be preserved at full or near full resolution, with the sides and back being incorporated into the frame at lower resolutions. Images corresponding to the top and bottom of a 360 degree environment may be incorporated into the frame at a different, e.g., lower, resolution than the front and/or side views. In some embodiments images corresponding to the top and bottom of an environment are sent separately and, in many cases, as static images or at a different rate than images corresponding to the other portions of the environment.

As a result of the mapping process, a frame communicating an environment may use different numbers of pixels to represent the same size area of a physical environment. For example, a larger number of pixels may be used to represent a forward viewing area with a lower number of pixels being used to represent a rear viewing area. This represents selective downsampling at the time of generate a frame representing the multiple image areas.

In a decoder a the image is mapped or wrapped onto a 3D model of the environment as part of the display process in some embodiments. The map is sometimes referred to as a UV map since UV coordinates are used in mapping the two dimensional frame that is communicated to XYZ space of a 3D model of the environment. The grid (UV map) used to map the transmitted frame to the 3D model takes into consideration the reduced resolution used in some embodiments for the back and side portions of the environment.

In various embodiments, the map used to wrap a communicated frame unto the model of the environment may change to reflect the different allocations of resolution to different portions of the environment. For example, portions of the environment having high motion may be allocated more resolution at points in time when there is high motion and less resolution at other times.

Information on how the transmitted frame should be processed by the decoder to take into consideration the allocation of different amounts of resources, e.g., pixels, to different image areas at different points in time is communicated to the playback device and used to interpret the communicated frame and how it should be applied to the 3D environment.

The method used in various embodiments may be referred to as use of selective resolution allocation in a Panoramic Image map. This approach allows the encoder and playback device to use a UV map to optimize the resolution in a equi rectangular projection so that more of the limited number of pixels available in a communicated frame are used for the more important image element(s) and pixels aren't wasted on image areas of low importance. The methods and apparatus are particularly well suited for devices with limited pixel buffers, such as phones where every pixel is precious because of the phones fairly limited pixel buffer which is available for decoding images.

Figure 21:
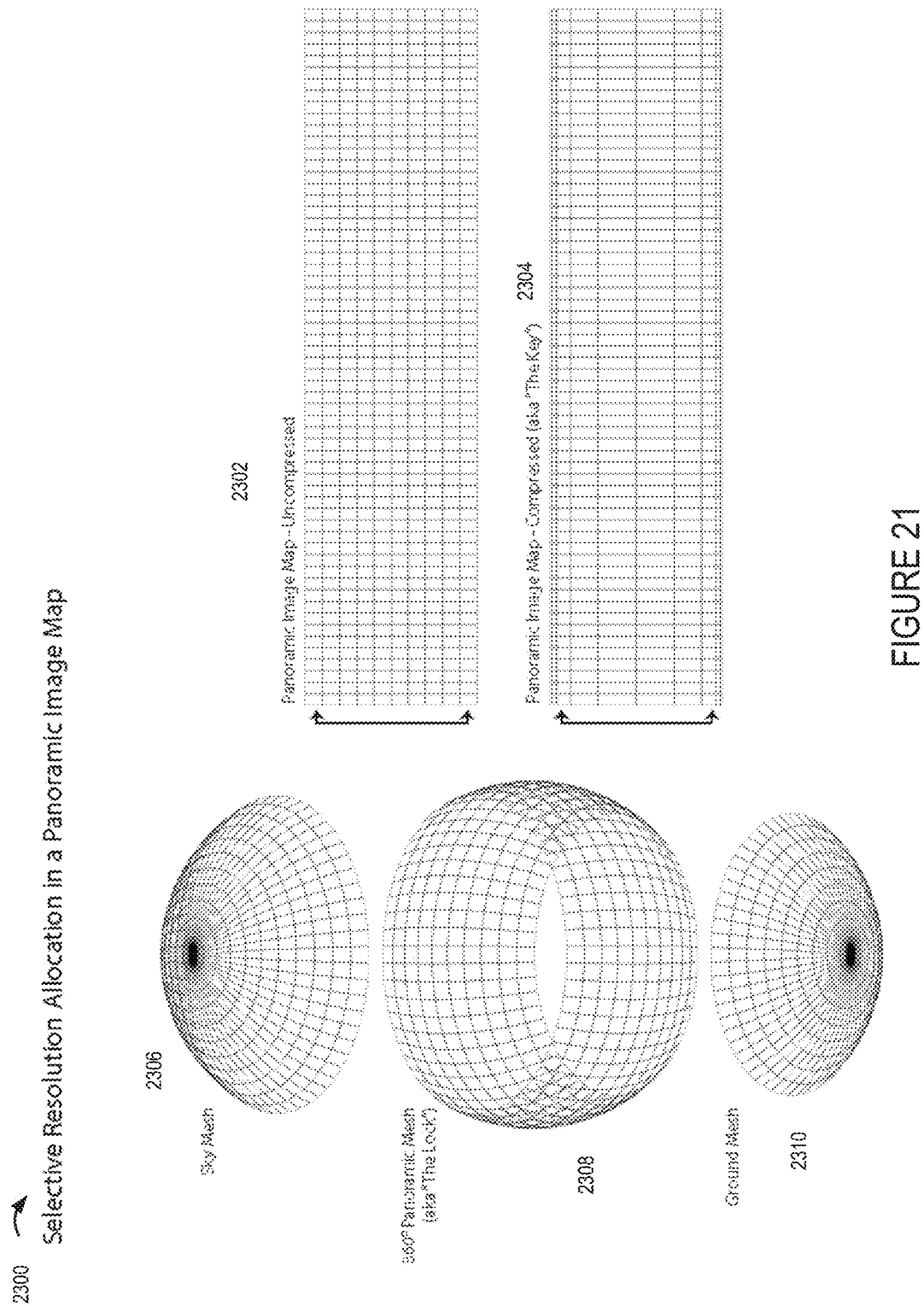
FIG. 21 shows how selective resolution can be used with regard to a frame which maps to an environmental grid with different resolutions being used for different portions of the image to be mapped to the environmental model, e.g., with smaller portions of the transmitted image being mapped to corresponding portions of the sky and ground mesh segments than the segments of the middle portion of the environment resulting in lower resolution being allocated to the top and bottom portions of the environment than the middle portion of the environment.

The process of selective resolution allocation in a panoramic image map can be understood when FIG. 21 is considered. FIG. 21 shows a 3D mesh model 2300 of an environment onto which captured images are to be wrapped as part of the process of rendering an image on a display device. The 3D model 2300 includes a sky mesh 2300, a 360 degree panoramic mesh 2308 and a ground mesh 2310. As part of the process of communicating images corresponding to the 3D environment represented by the 3D model, a frame representing an image of the sky is transmitted. A map is used to determine which parts of the transmitted frame are applied to which segments of the sky mesh. In at least one embodiment the sky map includes one segment for each segment of the sky mesh and provides a method of determining which portion of a frame representing an image in what is sometimes referred to as UV space will map to the segments of the sky mesh 2306. In some embodiments the frame representing the image of the sky is sent once and is thus static or sent at a low rate much less frequently than images to be mapped to the 360 degree panoramic mesh portion of the model 2300.

As part of the process of communicating images corresponding to the 3D environment represented by the 3D model, a frame representing an image of the ground is transmitted. A ground map is used to determine which parts of the transmitted frame are applied to which segments of the ground mesh. In one embodiment the ground map includes one segment for each segment of the ground mesh 2310 and provides a method of determining which portion of a frame representing an image in what is sometimes referred to as UV space will map to the segments of the ground mesh 2310. In some embodiments the frame representing the image of the ground is sent once and is thus static or sent at a low rate much less frequently than images to be mapped to the 360 degree panoramic mesh portion of the model 2300.

Of particular importance are frames corresponding to the 360 degree mesh portion since this includes the areas of the environment which tend to be most frequently viewed. While the image of this environmental area may be captured at a consistent resolution as represented by the uniform segments of the uncompressed panoramic image map 2302, different areas to which the panoramic image and panoramic mesh correspond may be of different amounts of importance at different times. For example, frontal areas were the main action is ongoing and/or areas with high motion may be important to represent in detail while other environmental areas may be less important. The uniform allocation of limited resources in terms of pixels of a frame to different areas of an environment is wasteful when the importance of the different image areas is taken into consideration along with the fact that the pixels of the frame are a limited resource. In order to make efficient use of the available pixels of a frame to communicate an image corresponding to a 360 degree environment, a map may be used to allocate different numbers of pixels to different portions of the 360 degree mesh. Thus some portions of the mesh 2308 may be coded using more pixels than other portions. In accordance with one such embodiment, a panoramic image map 2304 with non-uniform segments sizes may be used. While in the case of the FIG. 21 map each segment of the map will be used to map pixels of a received frame to a corresponding segment of the panoramic mesh 2308, some segments will use more pixels from the transmitted image than other segments. For example, mode pixels will be allocated to the middle portions of the panoramic mesh in the FIG. 21 example as represented by the larger segment sizes towards the middle of the map 2304 than towards the top and bottom of the map 2400. While the map 2304 is used to map portions of a received frame to the mesh 2308, prior to encoding of the communicated frame one or more segments of the uncompressed image of representing the panoramic environment will be downsampled taking into consideration the panoramic image map. For example, portions of an uncompressed image representing the top and bottom portions of the environment will be downsampled to reflect the small number of pixels allocated in the panoramic image map for representing such image portions while other portions may be subject to lower or no downsampling.

The panoramic image map is generated in some embodiments based on scene analysis and/or taking into consideration a user viewing position. The panoramic image map may be and in some embodiments is changed over time as the location of the main action changes, e.g., ball position during a sporting event in a stadium environment changes. The change is normally limited to occur on a group of pictures boundary within a video stream and/or upon a scene change boundary such as a boundary associated with the start or end of a commercial break in a video sequence. The new map to be used for interpreting frames may be transmitted at a playback device with or prior to a frame which is constructed taking into consideration the new map. Alternatively the playback device may so a variety of predetermined maps which may be used for mapping received frames to the mesh model of the environment and the video stream may include information indicating which of the plurality of maps is to be used for a particular set of communicated frames.

The selective allocation and varying of the image map to take into consideration content and/or user viewing position, can be applied to a full 306 degree area or some small portion of the environment. Accordingly, while shown with an example that maps a frame to a 360 degree environmental area the same method may be applied to a map that is used to map a frame to a 180 degree image area or some other portion of a 360 degree environment. While the map used to map an image to corresponding segments of a 3D model may change, the model need not change. However, changes in the model may be made to reflect changes in the environment, e.g., when a stage is moved and/or other changes in the environment are detected. Thus, both map and model changes are possible.

While different resolution allocations to the top and bottom portions of an area, e.g., the panoramic 360 degree middle area may be made, different resolution allocations may be made within a horizontal area of the environment.

For example, at different times it may be desirable to allocate different amounts of resolution to different portions of a sports field depending on where the ball or area of action is located.

FIG. 21 shows how selective resolution can be used with regard to an image, e.g., frame, which maps to an environmental grid corresponding to, for example, a 360 spherical panoramic mesh. Separate images may be communicated for applying as textures to the sky and ground mesh portions of the world model shown in FIG. 21.

The panoramic image 2302 prior to compression, corresponding to the 360 degree panoramic mesh 2308 includes image content at a generally uniform resolution in the example. In an actual embodiment it should be appreciated that the use of a fisheye lens may introduce some distortions and thus differences in resolution due to lens issues. However, for purposes of explaining the invention it will be presumed that image capture results in an image with a uniform resolution. The grid applied to the panoramic image 2302 is uniform and if used as a UV map would result in uniform resolution allocation to the segments of the 360 degree panoramic portion of the mesh model 2308. However, since a user is less likely to be looking at the bottom or top portions of the environment corresponding to the 360 degree panoramic mesh area, prior to encoding and transmission to the playback device the upper and lower portions are subject to a resolution reduction operation and the UV map to be used during playback is adjusted accordingly. Thus, in mesh 2304 which represents a UV map to be used to render a resolution adjusted image corresponding to the 360 panoramic area of the mesh model, the grid sizes are smaller. Thus, when applied fewer pixels will be extracted for a top segment from the source image and applied to the corresponding segment of the environment than will be extracted and applied for a segment corresponding to the middle horizontal portion of the 360 panoramic mesh model. Thus the UV model takes into consideration the selective allocation of resolution applied to the captured image representing the 360 panoramic area.

The playback device will use the UV mesh which reflects the resolution reduction applied to an image prior to transmission to the playback device when rendering the received image, e.g., applying the received image as a texture, onto the surface of the environmental model, e.g., mesh model of the environment.

While a static UV map reflecting a resolution reduction operation may be and is used in some embodiments, it may be desirable in at least some embodiments where the portion of the environment with the highest priority may change to support the dynamic selection of a resolution allocation approach to use and to use a UV map corresponding to the selected resolution allocation. In such a way, resolution allocation may be changed to reflect which portion of the environment is given priority in terms of resolution at a given time.

Figure 22:
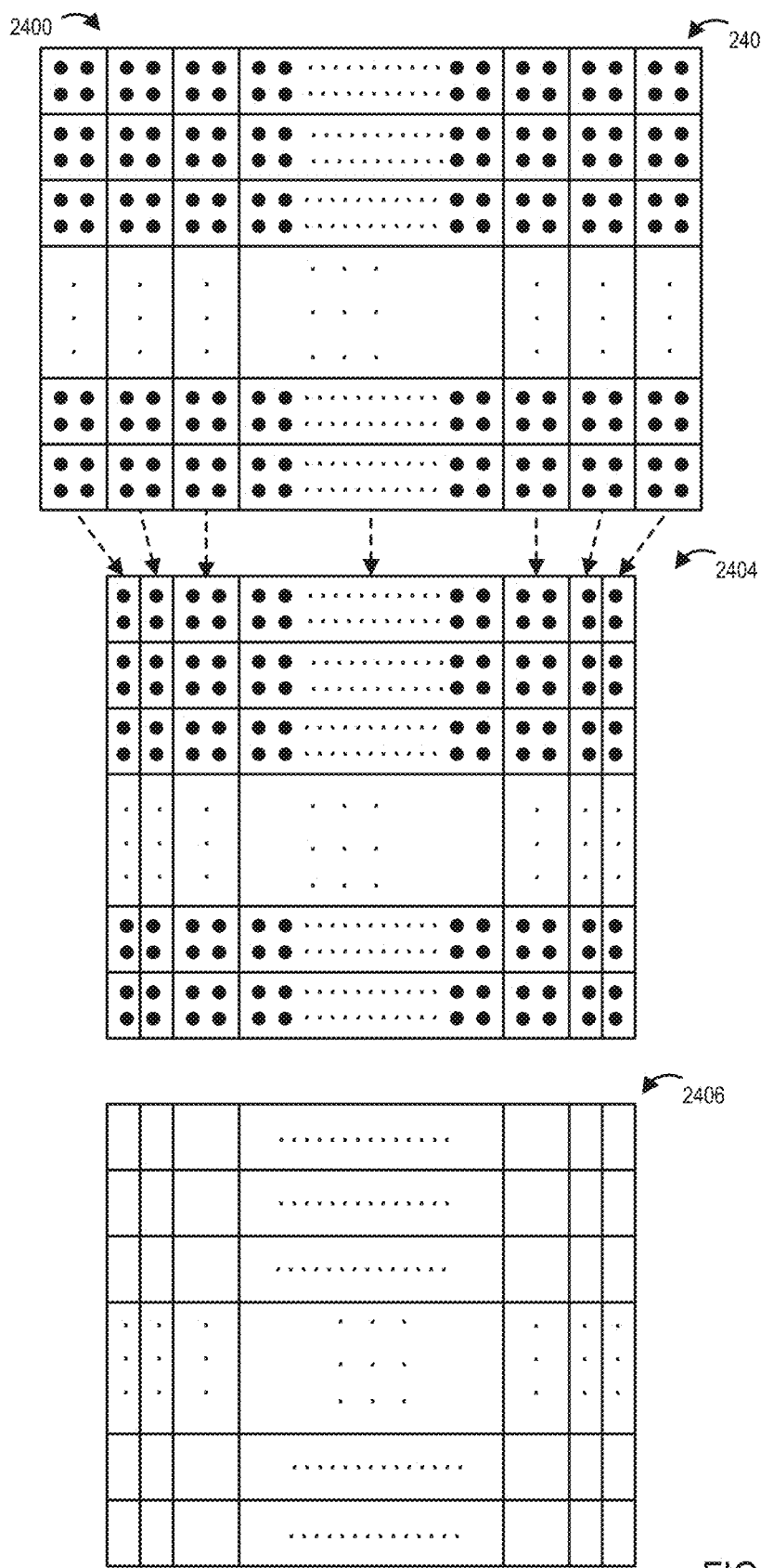
FIG. 22 shows a first captured image of a first portion of an environment, a first resolution adjusted image generated using a first resolution allocation from the first captured image, and a first UV map corresponding to the first resolution allocation.

FIG. 22 represented by reference number 2400, shows a first captured image 2402 of a first portion of an environment. Each large dot represents a pixel. The image 2402 is of uniform resolution as represented by the 4 pixels in each square grid area. Small dots are used to indicate that the image continues and extends toward the other illustrated portions of the image 2402. When a first resolution allocation is selected, e.g., a resolution which gives priority to the middle portion of the image 2402, resolution will be preserved during the middle portion of the image 2402 but reduced for the left and right portions. Such a resolution allocation may be desirable where, for example, the image 2402 is of a sports field and the action is at the center portion of the sports field when image 2402 is captured. Arrows extending from image 2402 towards reduced resolution image 2404 represent the application of a first selective resolution reduction operation to image 2402 to generate image 2404. The first resolution reduction operation may involve a downsampling applied to the left and right portions of image 2402 but not the middle portion. The grid shown as being applied to image 2404 represents the resolution allocation used to generate image 2404 from image 2402. As can be seen the first resolution adjusted image 2404 includes half as many pixel in the two left and right most rows of the image as did image 2402 but the same number of pixels for segments towards the center portion of the image 2404. Grid 2406 represents a first UV map corresponding to the first resolution allocation which is suitable for mapping segments of the image 2404 to segments of the model of the environment.

Figure 23:
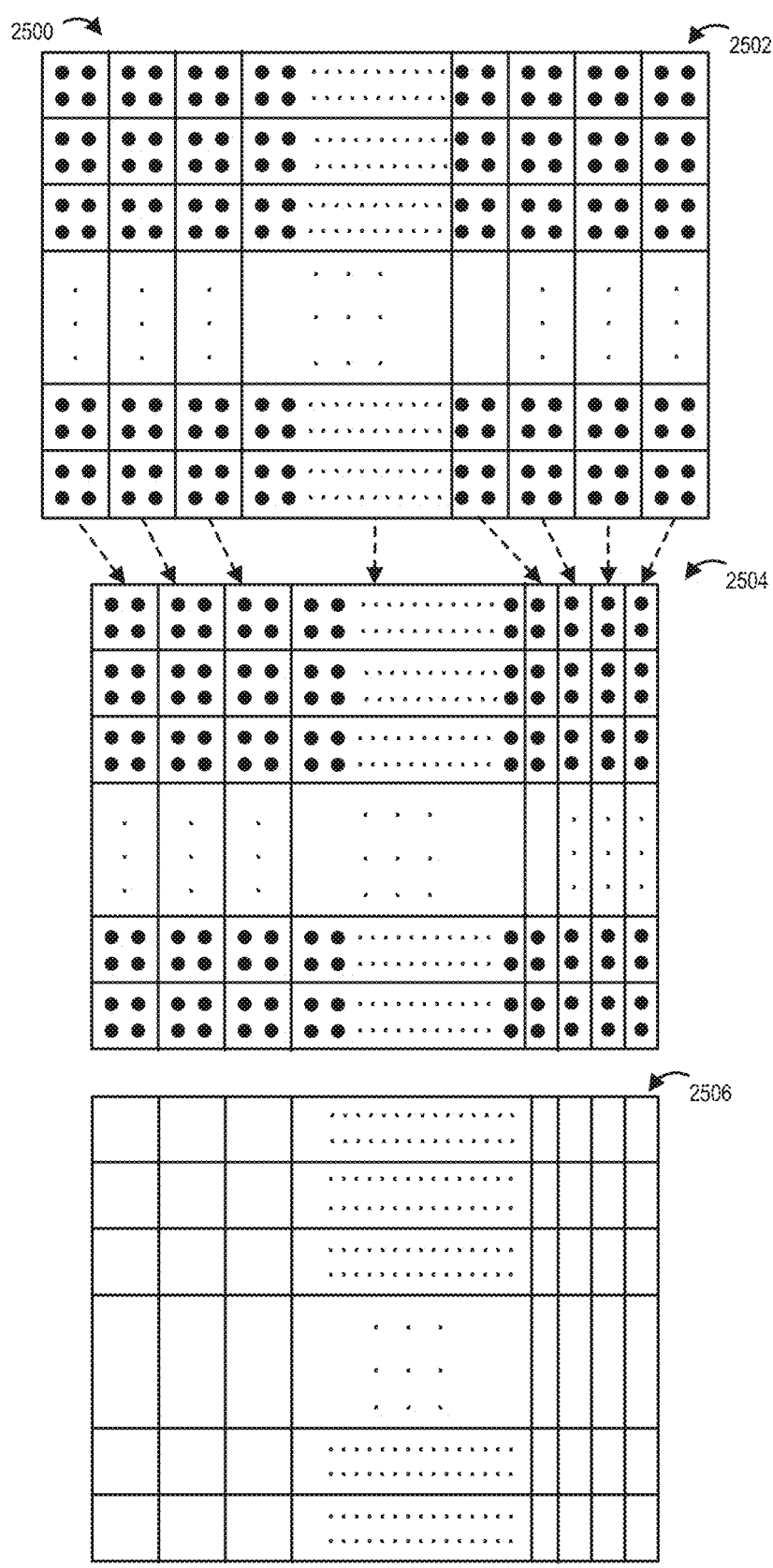
FIG. 23 shows a second captured image of the first portion of the environment, a second resolution adjusted image generated using a second resolution allocation from the second captured image, and a second UV map corresponding to the second resolution allocation.

FIG. 23 represented by reference number 2500, shows a first captured image 2502 of the first portion of the environment. As in the case of FIG. 22, each large dot represents a pixel. The image 2502 is of uniform resolution as represented by the 4 pixels in each square grid area. Small dots are used to indicate that the image continues and extends toward the other illustrated portions of the image 2502. When a second resolution allocation is selected, e.g., a resolution which gives priority to the left and middle portions of the image 2502, resolution will be preserved in the left and middle portions of the image 2502 but reduced for the right portion. Such a resolution allocation may be desirable where, for example, the image 2502 is of a sports field and the action is at the left portion of the sports field when image 2502 is captured. Arrows extending from image 2502 towards reduced resolution image 2504 represent the application of a second selective resolution reduction operation to image to generate image 2504. The second resolution reduction operation may involve a downsampling applied to the right portion of image 2502 but not the left or middle portions. Note that the area to which the downsampling is applied is of a size equal to the area to which downsampling was applied in FIG. 22. As a result images 2404 and 2504 will have the same total number of pixels but with the resolution being different in different areas of the images 2404, 2504.

While total pixel count is maintained as being constant for different reduced resolution images with the resolution allocation applying to different areas of an image, this is not critical and different images may include different numbers of pixels after a resolution reduction operation. However, keeping the pixel count constant facilitates encoding since the encoder can treat the images to be encoded as being of the same size even though when used in playback device different portions of the model will be rendered at different resolutions due to the use of different UV maps for different resolution allocations.

The grid shown as being applied to image 2504 represents the resolution allocation used to generate image 2504 from image 2502. As can be seen the second resolution adjusted image 2504 includes half as many pixel in the four right most rows of the image as did image 2502 but the same number of pixels for segments towards the left and center portions.

Grid 2506 represents a first UV map corresponding to the first resolution allocation which is suitable for mapping segments of the image 2504 to segments of the model of the environment.

Figure 24:
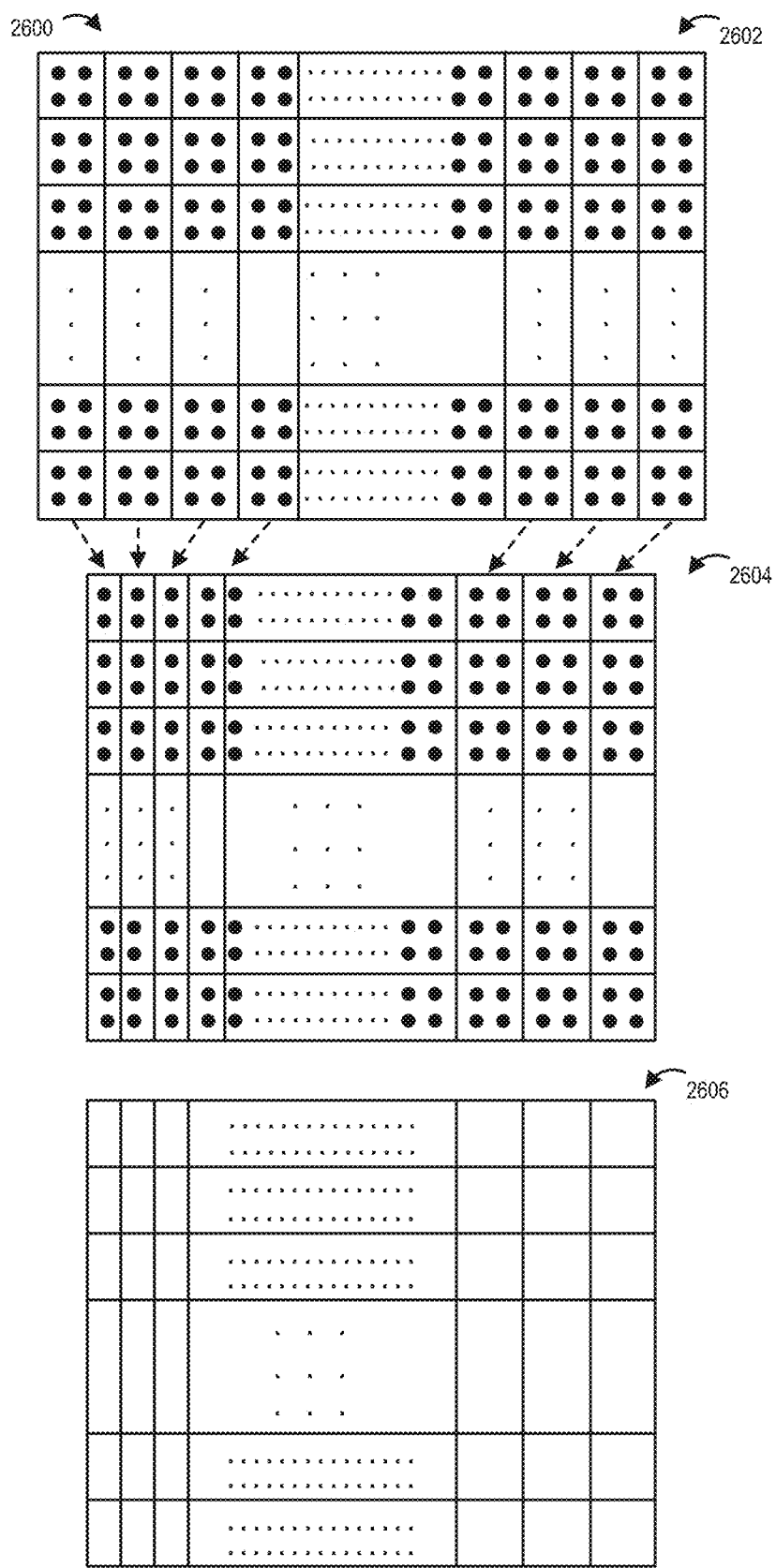
FIG. 24 shows a third captured image of the first portion of the environment, a third resolution adjusted image generated using a third resolution allocation from the third captured image, and a third UV map corresponding to the second resolution allocation.

FIG. 24 represented by reference number 2600, shows a first captured image 2602 of the first portion of the environment. As in the case of FIGS. 22 and 23, each large dot represents a pixel. The image 2602 is of uniform resolution as represented by the 4 pixels in each square grid area. Small dots are used to indicate that the image continues and extends toward the other illustrated portions of the image 2602. When a third resolution allocation is selected, e.g., a resolution which gives priority to the middle and right portions of the image 2602, resolution will be preserved in the middle and right portions of the image 2602 but reduced for the right portion. Such a resolution allocation may be desirable where, for example, the image 2602 is of a sports field and the action is at the right portion of the sports field when image 2602 is captured. Arrows extending from image 2602 towards reduced resolution image 2604 represent the application of a third selective resolution reduction operation to image to generate image 2604. The third resolution reduction operation may involve a downsampling applied to the left portion of image 2602 but not the right or middle portions. Note that the area to which the downsampling is applied is of a size equal to the area to which downsampling was applied in FIGS. 22 and 24. As a result images 2604 will have the same total number of pixels as images 2404, 2504 but with the resolution being allocated differently in terms of the portion of the environment to which higher resolution is allocated.

The grid shown as being applied to image 2604 represents the resolution allocation used to generate image 2604 from image 2602. As can be seen the third resolution adjusted image 2604 includes half as many pixel in the four left most rows of the image as did image 2602 but the same number of pixels for segments towards the right and center portions.

Grid 2606 represents a first UV map corresponding to the first resolution allocation which is suitable for mapping segments of the image 2604 to segments of the model of the environment.

UV map 2406 is communicated to a playback device for use with an image generated suing the first resolution allocation. UV map 2406 is communicated to a playback device for use in rendering an image generated using the second resolution allocation and UV map 2606 is communicated to the playback device for use in rendering an image generated using the third resolution allocation. The streaming system and the playback system both store the set of UV maps 2406, 2506, 2606 with the streaming system indicating which UV map should be applied to which image and the rendering device, e.g., playback device, using the indicated UV map associated with a received image.

While different resolution allocation are supported through the use of different UV maps this can be transparent to the decoder in the playback device which decodes received images since the decoder need not have knowledge of which of the plurality of possible resolution allocations were used to generate a received encoded image which is to be decoded by the decoder in the playback device.

Figure 25A:
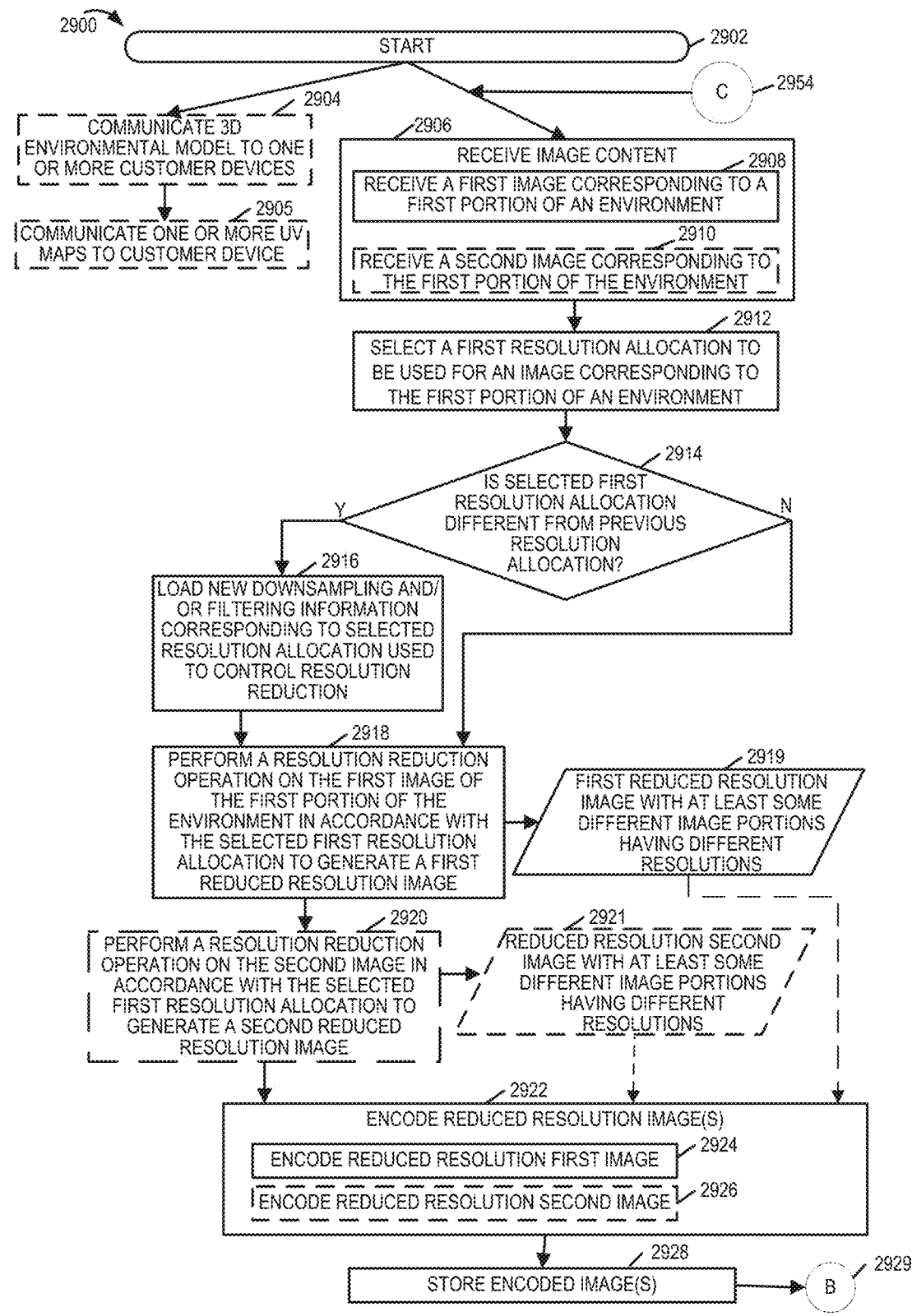
FIG. 25A shows a first part of a method of operating a content processing and delivery system in accordance with an exemplary embodiment.
Figure 25B:
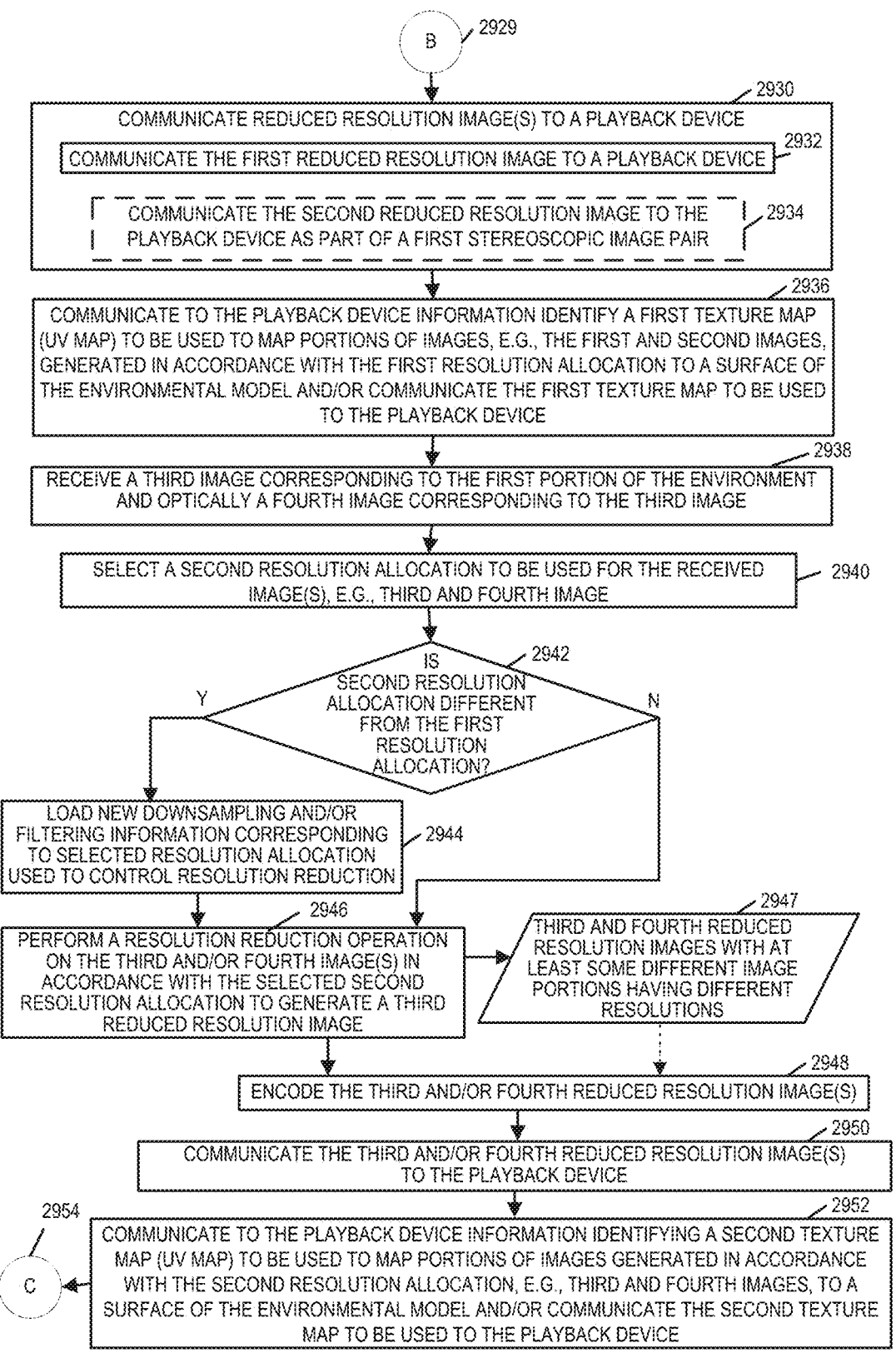
FIG. 25B shows a second part of a method of operating a content processing and delivery system in accordance with an exemplary embodiment.

FIG. 25 which comprises FIGS. 25A and 25B illustrates an exemplary method 2900 of operating a content processing and delivery system in accordance with an exemplary embodiment. FIG. 25A shows the first part of method 2900.

FIG. 25B shows the second part of method 2900. The method 2900 shown in FIG. 25 starts in step 2902 with the content processing and delivery system being initialized to process and deliver content, e.g., image content and/or information used to render images. In some embodiments the method of flowchart 2900 is performed using the content delivery and processing system 700 of FIG. 7.

From start step 2902 operation proceeds to steps 2904 and 2906, which may be performed in parallel and, optionally, asynchronously. In various embodiments customer rendering and playback devices are provided with information that can be used in rendering of image content and/or providing 3D playback experience to the viewers. In some embodiments this includes providing environmental model and/or other environmental information to the customer devices to be used in rendering images as part of an environmental simulation. In step 2904 a 3D environmental model and/or information that can be used to model is communicated to one or more customer devices. In some embodiments the model is a mesh model of the environment from which one or more images are captured. In some embodiments additional information which can be used in rendering images, e.g., one or more UV maps are also communicated to the customer devices, e.g., content playback devices, in step 2905. The UV maps correspond to different resolution allocations with different UV maps, also referred to as texture maps, providing different mappings of pixels of transmitted images to segments of the environmental model. If the UV maps are communicated in step 2905 they can later be identified when they are to be used to map a transmitted image and need not be retransmitted multiple time to the playback device. However, in some embodiments a set of UV maps is not communicated in step 2905 and an applicable UV map is transmitted with or prior to communication of an image to which the UV map is to be applied and used.

In some embodiments the information in steps 2904 and 2905 is communicated once, e.g., prior to communicating actual image content to the customer devices. While environmental map information and/or environmental models may be communicated to the playback device in some embodiments where such information is generated and/or available at the server side, in some other embodiments the environment may be assumed to be a default size and shape, e.g., a sphere or half sphere and in such a case the default environmental module and/or UV maps may be preloaded in the playback device and need not be transmitted by the server.

The processing of image content begins in step 2906 which can be performed in parallel with steps 2904, 2905. In step 2906 image content is received by the processing system, e.g., content delivery system 700 shown in FIG. 7. The image content received in step 2906 may be from an image capturing device such as the ones discussed in the application such as the one shown in FIG. 13. In some embodiments the step 2906 of receiving image content includes step 2908 wherein a first image corresponding to a first portion of an environment, e.g., environment of interest where images are captured, is received. In some embodiments the first image is one image of an image pair that also includes a second image, with the first image being one of a left and right eye image pair, the second image being a second one of a left and right eye image pair. In some such embodiments the first and second images are received as part of the image pair in step 2906. Thus in some such embodiments step 2906 further includes step 2910 of receiving the second image.

Operation proceeds from step 2906 to step 2912 the system selects a first resolution allocation to be used for at least one image corresponding to a first portion of the environment. This selection may be and sometimes is based on detection of motion in the received image content, the location of particular objects such as a sports jersey, and/or human input indicating which portion of the captured image is to be given priority and preserved at a higher resolution during encoding. For example, detection of player's jerseys or uniforms may indicate areas to be preserved at high resolution in which case a resolution allocation which preserves the areas where the uniforms are detected may and in some embodiments will be selected. Other portions of the image may be and sometimes are subject to down sampling. Each resolution may correspond to a particular UV map which is intended to be used for mapping images produced by using a particular corresponding resolution allocation.

Operation proceeds from step 2912 to step 2914. In step 2914 in which it is determined if the selected first resolution allocation is different from a previously selected resolution allocation, e.g., indicative of a change in down sampling and UV map. The selected first resolution allocation may be one of a plurality of supported resolution allocations corresponding to different supported UV maps corresponding to the first portion of the environment captured in the first image. In accordance with one aspect from the plurality of supported resolution allocations a resolution allocation may be selected at a given time to process a current image and/or group of images. If it is determined that the selected first resolution allocation is different than the previously selected resolution allocation the operation proceeds from step 2914 to step 2916 where new downsampling and/or filtering information corresponding to the newly selected resolution allocation used to control resolution reduction is loaded and then operation proceeds to step 2918. If in step 2914 it is determined that the selected first resolution allocation is the same as the previously selected resolution allocation (or is the same as a default allocation if no previous selection was made) then there is no need for new down sampling and/or filtering information to be loaded and thus the operation proceeds directly to step 2918. The selected resolution allocation for an image indicates how down sampling is to be applied to an image which is to be encoded and transmitted to the playback device.

In step 2918 a resolution reduction operation, e.g., downsampling, is performed on the first image of the first portion of the environment in accordance with the selected first resolution allocation to generate a first reduced resolution image 2919. The first reduced resolution image 2919 which is the output of step 2918 includes at least some image portions having different resolutions.

Operation proceeds from step 2916 to step 2920 in embodiments where pairs of images are processed, e.g., stereoscopic image pairs including left and right eye views. In step 2920 a resolution reduction operation is performed on the second image of the first portion of the environment, e.g., the second image in stereoscopic image pair, in accordance with the selected first resolution allocation to generate a second reduced resolution image 2921. The second reduced resolution image 2921 which is the output of step 2918 includes at least some image portions having different resolutions. Thus, where stereoscopic image pairs are processed, both the left and right eye images of a pair will be subject to the same resolution reduction operation.

While step 2920 is shown as being performed after step 2918 it may be performed in parallel with step 2918 simultaneously. The data output of steps 2918 and 2920, e.g., the generated first and second reduced resolution images 2919 and 2921, serve as inputs to the next step 2922. In the case of non-stereo image content, a single image will be processed and the second image will not be present.

In step 2922 the reduced resolution image 2919 and/or reduced resolution image 2921 are encoded. In step 2924 the first reduced resolution image is encoded. In step 2926 the second reduced resolution image, when present, is encoded.

Operation proceeds from step 2922 to step 2928. In step 2928 the encoded reduced resolution images are stored in memory, e.g., for subsequent communication, e.g., streaming to a content playback device, e.g., located at a customer premises such as a house or home. Operation proceeds from step 2928 to step 2930 via connecting node B 2929. In step 2930 the encoded reduced resolution image(s) are communicated to a playback device. This may involve transmitting, e.g., streaming, the images to the playback device over a wired network, cable network or wireless network or some other type of network. Step 2930 includes steps 2932 and step 2934. In step 2932 the first reduced resolution image is communicated to the customer playback device, e.g., in encoded form and in step 2934 in the second reduced resolution image is communicated to the playback device, e.g., in encoded form. Step 2934 is performed when a stereo pair of images is communicated, e.g., in a single frame or pair of frames.

Operation is shown proceeding from step 2930 to step 2936. However depending on the embodiment step 2936 may precede step 2930. In step 2936 a texture map, e.g., first texture map, to be used to map the encoded images to the model of the environment is indicated or provided to the playback device. The identification of the first texture map may be sufficient where the first texture map, e.g., UV map, was already loaded into the playback device e.g., as part of step 2905. Based on the communicated information and/or map, the playback device knows that it is to use the first UV map with the first and second images which were produced using the first resolution allocation to which the first UV map corresponds. The first UV map may be used by the playback device to render other images which are also produced in accordance with the first resolution allocation. In some embodiments a resolution allocation is maintained for a group of pictures and thus the same UV map may be used for multiple consecutive images in such embodiments.

Operation proceeds from step 2936 in which the playback device is provided information about what texture map to use while rendering the first and second images to step 2938 which relates to processing of an additional image or images, e.g., a third image and/or forth image. The third and/or fourth image may be and in some embodiments are left and right images of a second stereoscopic image pair or some other image or images of the environment captured after the first image.

In step 2940 a second resolution allocation is selected to be used for the received images, e.g., third and/or fourth images. The resolution allocation may be determined using the same techniques used to determine the first resolution allocation, e.g., identifying an area or areas of importance based on motion, presence of an object such as sports jersey, ball, etc. Once the second resolution allocation is selected from the set of resolution allocations, e.g., each corresponding to a different UV map, operation proceeds to step 2942. In step 2942 a check is made to determine if the second resolution allocation is different from the first resolution allocation. The second resolution allocation may be different, e.g., because the ball or players may have moved to a different portion of the field since the first image was captured. If the second selected resolution allocation is different than the first selected resolution allocation new downsampling information needs to be loaded and used and operation proceeds to step 2944. In step 2944 the new downsampling and/or other resolution allocation information is loaded so that it can be used in the resolution reduction step 2946. If in step 2942 it is determined that the second resolution allocation is the same as the first, the processor of the system implementing the method 2900 already knows the downsampling to be preformed since it was used process the first image and need not load new downsampling information and operation proceeds to step 2946.

In step 2946 a resolution reduction operation, e.g., downsampling, is performed on the received third and/or fourth image to produce reduced resolution versions of the third and/or fourth images 2947. Operation proceeds from step 2946 to step 2948 in which the reduced resolution third and/or fourth images are encoded prior to being communicated, e.g., transmitted, to the playback device in step 2950.

In step 2952, which is shown being performed after step 2950 but which may and sometimes does precede step 2950 or occur in parallel with step 2950, the information indicating the UV map to be used for rendering the third and fourth images is communicated to the playback device. This may involve sending the UV map to be used to the playback device or simply identifying a previously stored UV map. Since the third and fourth images were generated using the second resolution allocation the information will identify the UV map corresponding to the second UV allocation. Operation proceeds from step 2952 via connecting node 2954 to step 2906 where additional image content is received, e.g., from a camera device, and treated as new first and second images.

Over time a sequence of images representing view may be received and processed with the resolution allocation used at a given time depending on the received image content and/or user input. Over time as different resolution allocations are used, the content playback device will be signaled to use different corresponding UV maps. Thus when the second resolution allocation is different from the first resolution allocation the playback device will be instructed to use a second different UV map to render images generated in accordance with the second resolution allocation which is different from a first UV map used to render images generated in accordance with the first resolution allocation. A large number of different resolution allocations can be used in combination with corresponding UV maps allowing for a wide variety of different resolution allocations to be supported.

Figure 26:
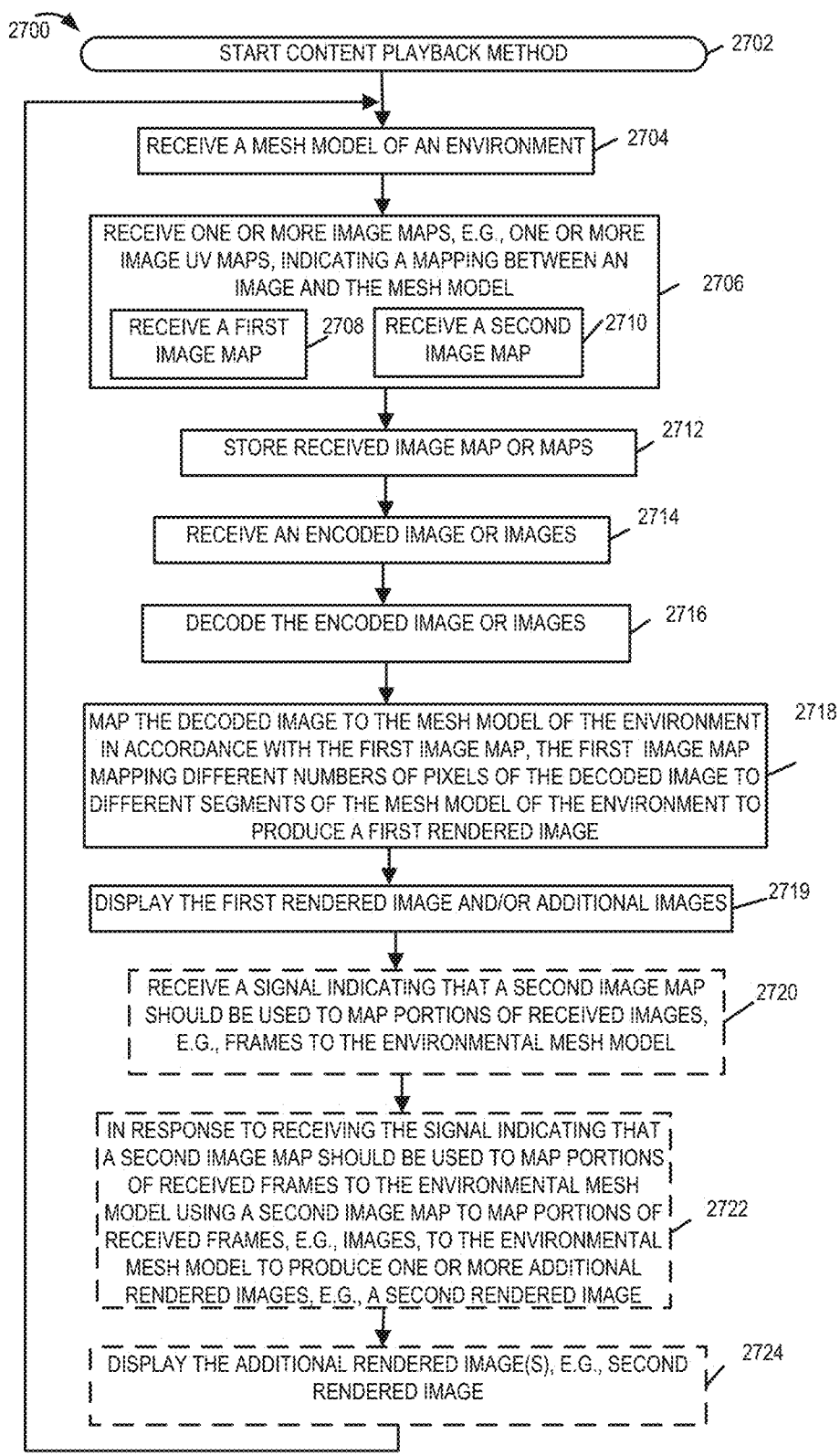
FIG. 26 illustrates an exemplary embodiment of a method of playing back content in accordance with the invention.

FIG. 26 illustrates an exemplary embodiment of a content playback method 2700 which may be, and in some embodiments is, implemented on exemplary computer system/content playback device 800. The method 2700 may be used by a device which receives content encoded and transmitted in accordance with the method of FIG. 25.

For explanatory purposes, the exemplary content playback method 2700 will be explained in connection with the playback device 800 shown in FIG. 8. It should be appreciated that the method 2700 can be implemented on other apparatus. The exemplary playback method 2700 begins in start step 2702 from which operation proceeds to step 2704.

In step 2704, the receiver 860 of the network interface 810 of the content playback device 800 receives a mesh model of an environment. Operation proceeds from step 2704 to step 2706. In step 2706, the receiver 860 of the network interface 810 of the content playback device 800 receives one or more image maps, e.g., one or more image UV maps, indicating a mapping between an image and the mesh model of an environment. In some embodiments, step 2706 includes sub-step 2708 and/or sub-step 2710. In sub-step 2708, the receiver 860 of the network interface 810 of the content playback device 800 receives a first image map. In sub-step 2710, the receiver 860 of the network interface 810 of the content playback device 800 receives a second image map. Operation proceeds from step 2706 to step 2712.

In step 2712, the content playback device 800 stores the received image map or maps in a storage device, e.g., memory 812. For example, UV MAP 1 836 and UV MAP 2 836 are stored in memory 812. In some embodiments the received image maps are stored in a storage device coupled to the content playback device 800. Operation proceeds from step 2712 to step 2714.

In step 2714, the receiver 860 of the network interface 810 receives an encoded image. Operation proceeds from step 2714 to step 2716. In step 2716, the decoder 864 of the playback device 800, decodes the received encoded image. In some embodiments, a hardware decoder module decodes the received encoded images. In some embodiments, the processor 808 executing instructions from decoder module 820 decodes the received encoded image. Operation proceeds from step 2716 to step 2718.

In step 2718, the decoded image is mapped to the mesh model of the environment in accordance with the first image map to produce a first rendered image. The first image map mapping different numbers of pixels of the decoded image to different segments of the mesh model of the environment. While the mapping of the different numbers of pixels of the decoded image to different segments of the mesh model of the environment may occur in a variety of different ways, in some embodiments, the different numbers of pixels are mapped to environmental regions of the same size but located at different locations in the environment. In some such embodiments, segments in the environment corresponding to action are allocated more pixels than segments in which less or no action is detected. In some embodiments, at least some segments corresponding to a front viewing area are allocated more pixels per segment than segments corresponding to a rear viewing area. This mapping may be, and in some embodiments is, performed by the processor 808 of the playback device 800. Operation proceeds from step 2718 to step 2719.

In step 2719, the first rendered image is displayed for example on display 802 of content display device 800.

In some embodiments, operation proceeds from step 2719 to step 2720. In step 2720, the receiver 860 of the network device 810 of the playback device 800 receives a signal indicating that a second image map should be used to map portions of received frames to the environmental mesh model. In some embodiments the decoded image is a frame. Operation proceeds from step 2720 to optional step 2722. In step 2722, in response to receiving the signal indicating that a second image map should be used to map portions of received frames to the environmental mesh model, a second image map is used to map portions of received frames to the environmental mesh model to produce one or more additional rendered images, e.g., a second rendered image. In some embodiments, the second image map is the second image map received in step 2710.

In some embodiments, the first image map allocates a first number of pixels of a frame to a first segment of said environmental mesh model wherein the decoded image is a frame and said second image map allocates a second number of pixels of the frame to the first segment of said environmental mesh model, the first and second number of pixels being different. The mapping of step 2722 may be, and in some embodiments is, performed by the processor 808 of the playback device 800. Operation proceeds from optional step 2722 to optional step 2724.

In step 2724, the additional rendered image(s), e.g., the second rendered image, is displayed for example on display 802 of content display device 800. Operation proceeds from step 2724 to step 2704 where the method continues as previously described.

In some embodiments of the exemplary method 2700, the received mesh model of an environment is stored in a storage device, e.g., 3D environmental mesh model 832 stored in memory 812 of the playback device 800. In some embodiments, the received encoded image data which may be, and in some embodiments are encoded scene portions, is stored in a storage device, e.g., received encoded data 824 stored in memory 812 of the playback device 800. In some embodiments, the decoded image data is stored in a storage device, e.g., decoded data 826 stored in memory 812 of the playback device 800. In some embodiments, the one or more of the rendered images are stored in a storage device, e.g., memory 812 of the playback device 800. In some embodiments, the first and second images are rendered by the processor 808 executing instructions contained in the image generation module 822. In some embodiments, a hardware, e.g., circuits, image generation module performs the operation of rendering the one or more images, e.g., the first and/or second rendered images.

Figure 10:
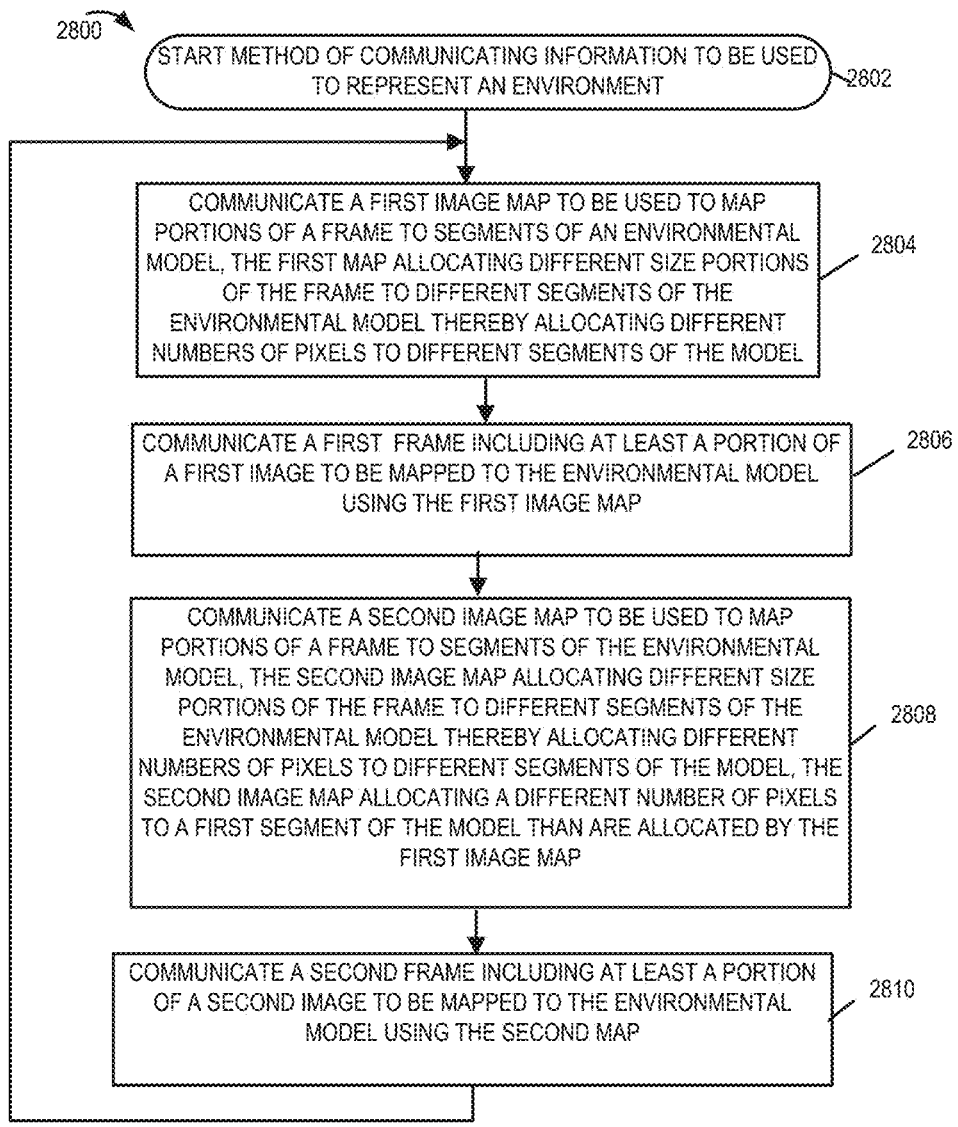
FIG. 10 illustrates an exemplary method of communicating information to be used to represent an environment in accordance with the present invention.

The exemplary embodiment of method 2800 of communicating information to be used to represent an environment will now be described in connection with FIG. 10. The exemplary method 2800 may be, and in some embodiments is, implemented by a content delivery system such as for example content delivery system 700 illustrated in FIG. 7.

Operation of the method 2800 begins in start step 2802. Operation proceeds from step 2802 to step 2804.

In step 2804, a first image map to be used to map portions of a frame to segments of an environmental model are communicated, e.g., to a content playback device such as for example content playback device 800 illustrated in FIG. 8. The first image map allocates different size portions of the frame to different segments of the environmental model thereby allocating different numbers of pixels to different segments of the environmental model. In some embodiments, the network interface 710 of the content delivery system 700 performs this operation. In such embodiments, the network interface 710 includes a transmitter 711 which performs this function. Operation proceeds from step 2804 to step 2806.

In step 2806, a first frame including at least a portion of a first image to be mapped to the environmental model using the first image map is communicated, e.g., to the content playback device 800. In some embodiments, the network interface 710 of the content delivery system 700 performs this operation. In some embodiments, the network interface 710 includes a transmitter 711 which performs this operation. Operation proceeds from step 2806 to step 2808.

In step 2808, a second image map to be used to map portions of a frame to segments of the environmental mode is communicated, e.g., to the content playback device such as for example content playback device 800. The second image map allocates different size portions of the frame to different segments of the environmental model thereby allocating different numbers of pixels to different segments of said model. The second image map allocates a different number of pixels to a first segment of the environmental model than are allocated by the first image map. In some embodiments, the network interface 710 of the content delivery system performs this operation. In some embodiments, the network interface 710 includes a transmitter 711 which performs this operation. Operation proceeds from step 2808 to step 2810.

In step 2810, a second frame including at least a portion of a second image to be mapped to the environmental model using the second image map is communicated e.g., to the content playback device such as for example content playback device 800. The first and second image maps map different numbers of pixels to an area corresponding to the same portion of an environment thereby providing different resolution allocations for the same portion of the environment based on which of the first and second image maps are used. In some embodiments, the network interface 710 of the content delivery system performs this operation. In some embodiments, the network interface 710 includes a transmitter 711 which performs this operation. Operation proceeds from step 2810 to step 2804 where operation proceeds as previously described.

Figure 27:
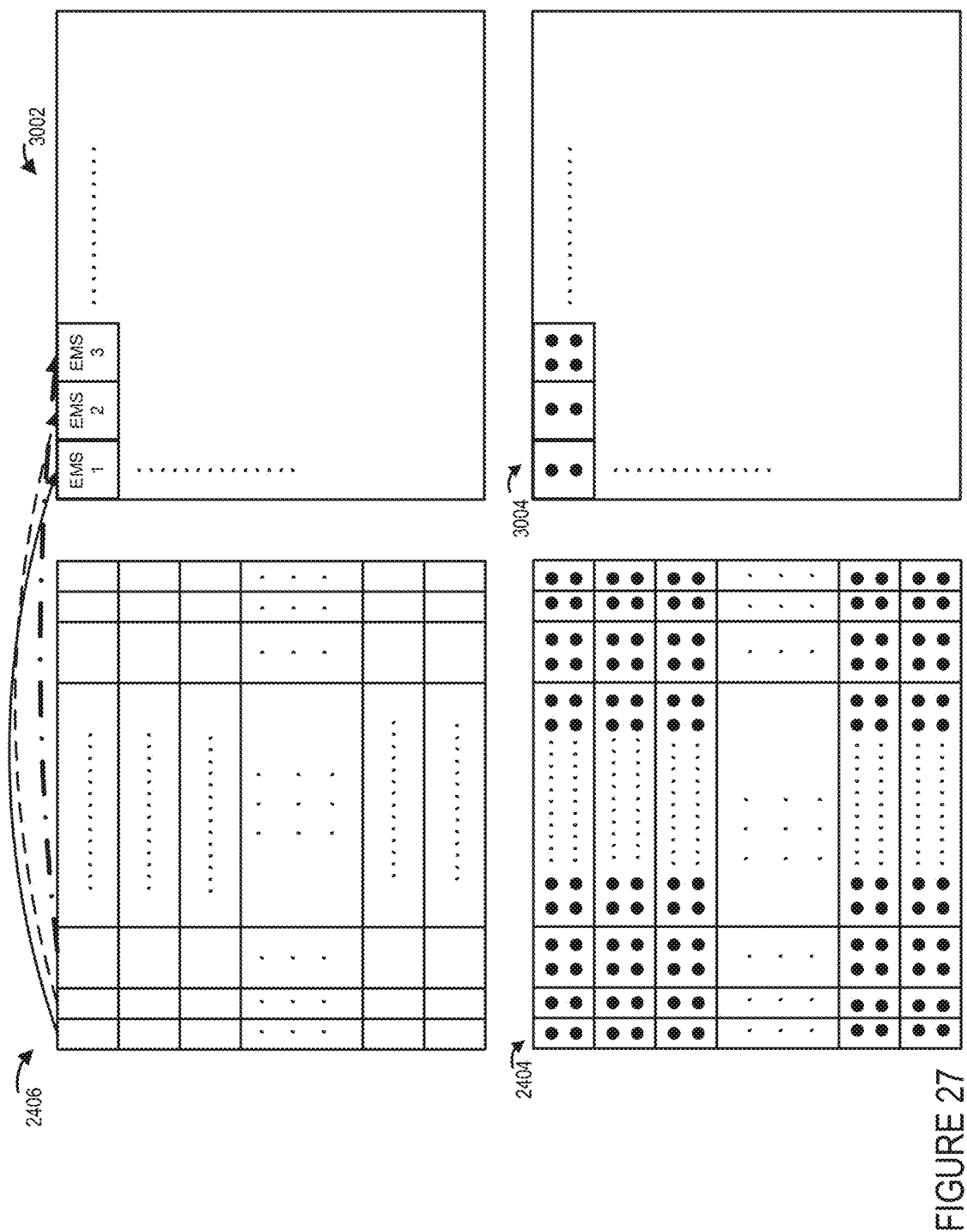
FIG. 27 illustrates an example of how a playback device, such as the playback device or devices shown in any of the other figures, can perform image rendering using a UV map corresponding to the resolution allocation that was used to generate the image to be rendered.
Figure 28:
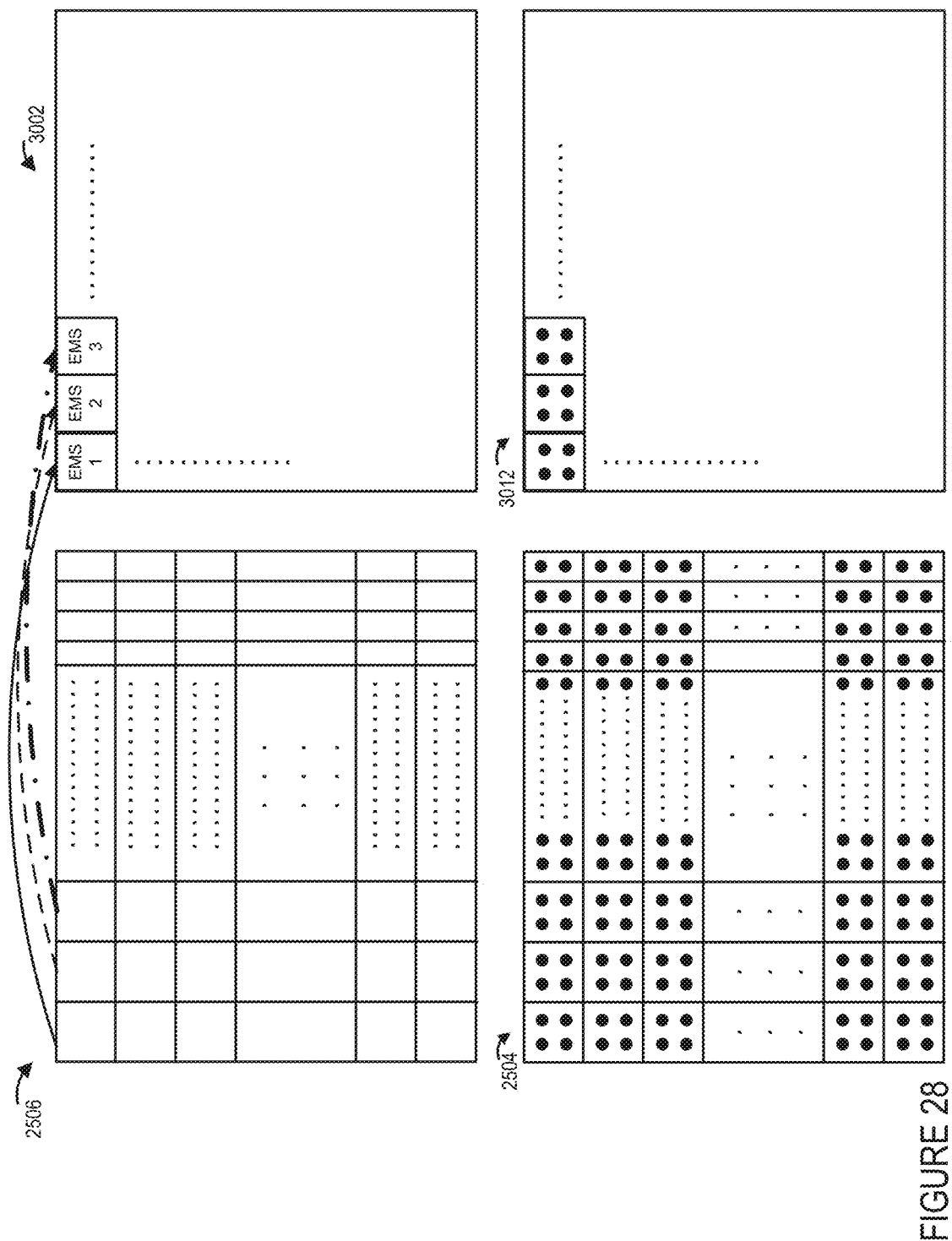
FIG. 28 illustrates an example of how a playback device, such as the playback device or devices shown in any of the other figures, can perform image rendering using a UV map corresponding to the resolution allocation that was used to generate the image to be rendered.
Figure 29:
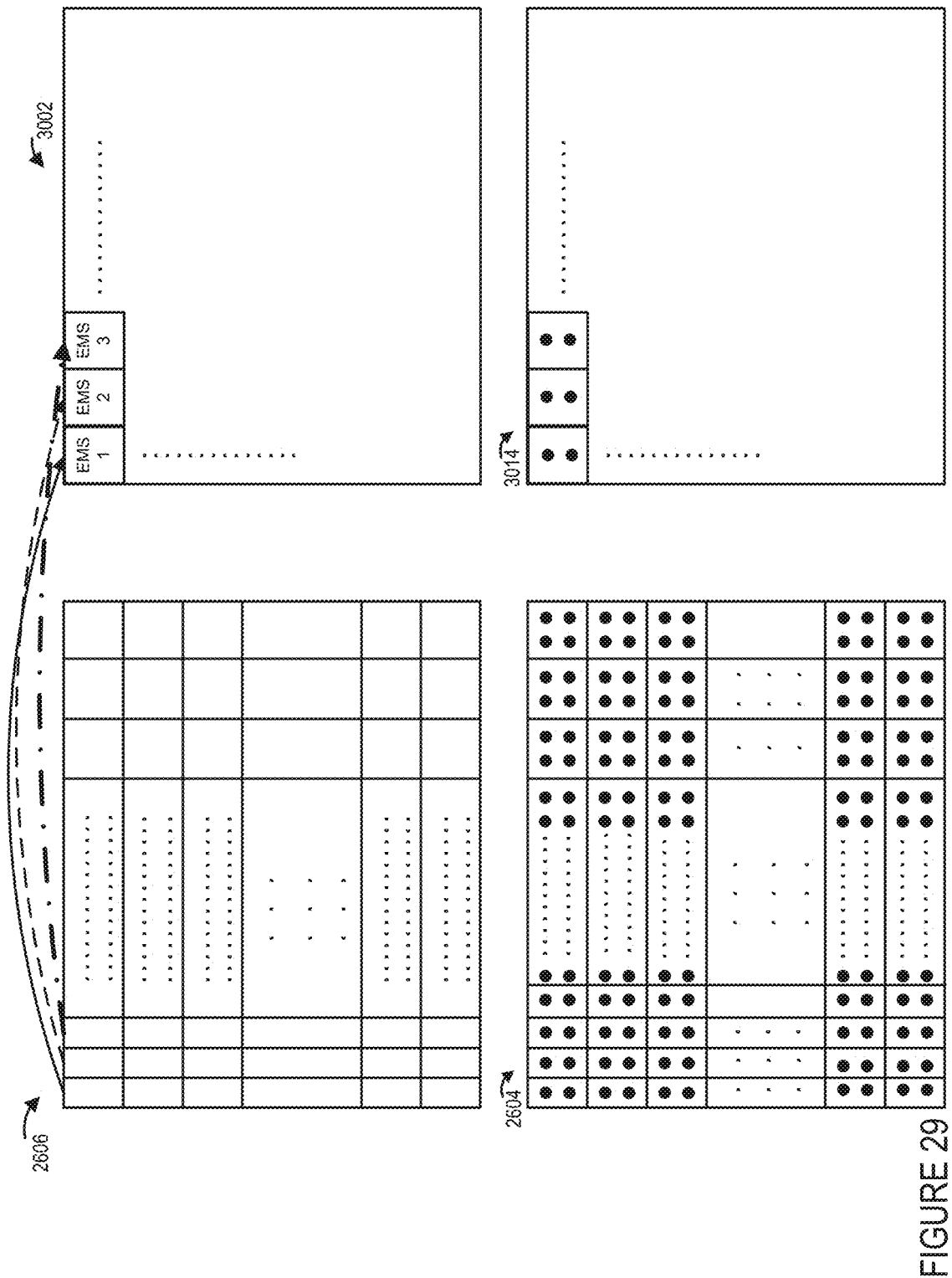
FIG. 29 illustrates an example of how a playback device, such as the playback device or devices shown in any of the other figures, can perform image rendering using a UV map corresponding to the resolution allocation that was used to generate the image to be rendered.

FIGS. 27, 28 and 29 show how a playback device, such as the playback device or devices shown in any of the other figures, can perform image rendering using a UV map corresponding to the resolution allocation that was used to generate the image to be rendered.

FIG. 27 shows how a reduced resolution image 2404 can be rendered using the UV map 2406 and an environmental module 3002 with environmental segments in the model corresponding to segments of the UV map. The top portion of FIG. 27 shows the relationship between segments of the UV map 2406 and the segments of the environmental model 3002. A first segment of the UV map 2406 corresponds to a first environmental module segment (EMS 1) of environmental model 3002, as represented by the solid arrow extending from the first segment of the UV map 2406 and EMS 1. A second environmental module segment (EMS 2) of environmental model 3002 corresponds to the second segment of the UV map 2406 as indicated by the dashed arrow extending from the second segment of the UV map 2406 and EMS 2. A third environmental module segment (EMS 3) of environmental model 3002 corresponds to the third segment of the UV map 2406 as indicated as represented by the dashed arrow extending from the second segment of the UV map 2406 and EMS 3. There is a known, e.g., one to one, relationship between other segments of the UV map 2406 and the environmental model 3002.

During rendering, the UV map 2406 is used to determine how to apply portions of an image generated in accordance with the first resolution allocation to portions of the environmental model 3002, as a texture. In the FIG. 27 UV map 2404 is applied to the communicated image 2404 to determine how to segment the image 2404 into sets of pixels to be applied to the corresponding segments of the environmental model 3002. The pixels in the segments of the image 2404 corresponding to a segment of the UV map 2406 are then applied to the corresponding segment of the environmental model 3002, e.g., as a texture, with scaling and reshaping being used as necessary to cover the surface of the segment of the environmental model 3002. The portion of the image applied to the corresponding segment of the environmental model 3002 is scaled and/or adjusted in shape as necessary to fully occupy the corresponding segment of the environmental model 3002 in some embodiments. Thus, for example, two pixels of the communicated image corresponding to the first segment of the UV map 2406 are scaled to fully occupy the first segment EMS1 of the environmental model 3002 to which they are applied. Similarly in the FIG. 27 example, the two pixels of the image 2404 being rendered, corresponding to the second segment of the UV map 2406 are scaled to fully occupy the second segment EMS2 of the environmental model 3002 to which they are applied as a texture. In the FIG. 27 example, the third segment of the UV map corresponds to four pixels of the image 2404 to be rendered. The four pixels are applied as a texture to the third segment EMS3 of the environmental model 3002 as a texture during the rendering process. Thus, assuming the third segment of the environmental model 3002 is the same size as the first and second segments of the environmental model, the third segment will be of higher resolution than the first and second segments and correspond to more pixels in the received image 2404 than either of the first and second segments. Thus the segments of the UV map 2406 corresponding to portions of an image which were subject to resolution reduction prior to encoding may correspond to the same size area of the environmental model 3002 of another segment which does not correspond to a resolution reduction operation. As should be appreciated the segment corresponding to the area where resolution reduction was not performed will be displayed in the generated image of the simulated environment at a higher resolution than the portion to which resolution reduction was performed prior to encoding.

As discussed above, different resolution reduction operations may be performed to produce images that are transmitted. The playback device will use a UV map corresponding to the resolution reduction operation that was performed when rendering the received images. Thus, while the environmental model 3002 may remain the same for multiple images, different UV maps 2406, 2506, 2606 may be used with the same environmental model 3002.

FIG. 28 shows the application of UV map 2506 to an image 2504, generated using the second selective resolution reduction operation, which allocates less resolution to the right portion of an image corresponding to a portion of an environment than the left and middle portions. Thus FIG. 28 shows how a reduced resolution image 2504 can be rendered using the UV map 2506 and the environmental model 3002 with environmental segments corresponding to segments of the UV map. The top portion of FIG. 28 shows the relationship between segments of the UV map 2506 and the segments of the environmental model 3002. A first segment of the UV map 2506 corresponds to the first environmental module segment (EMS 1) of environmental model 3002, as represented by the solid arrow extending from the first segment of the UV map 2506 and EMS 1. A second environmental module segment (EMS 2) of environmental model 3002 corresponds to the second segment of the UV map 2506 as indicated by the dashed arrow extending from the second segment of the UV map 2506 and EMS 2. A third environmental module segment (EMS 3) of environmental model 3002 corresponds to the third segment of the UV map 2506 as indicated by the dashed arrow extending from the second segment of the UV map 2506 and EMS 3.

During rendering, the UV map 2506 is used to determine how to apply an image to be rendered to the environmental model 3002. FIG. 28 shows how the communicated image 2504 and the pixels in the segments of the image corresponding to a segment of the UV map are applied to the corresponding segment of the environmental model 3002. The portion of the image 2504 applied to the corresponding segment of the UV map is scaled and/or adjusted in shape as necessary to fully occupy the corresponding segment of the UV map. Thus, for example, four pixels of the communicated image corresponding to the first segment of the UV map 2504 are scaled to fully occupy the first segment EMS1 of the environmental model to which they are applied. Similarly in the FIG. 28 example, the four pixels of the image being rendered, corresponding to the second segment of the UV map are scaled to fully occupy the second segment EMS2 of the environmental model 3002 to which they are applied as a texture. In the FIG. 28 example, the third segment of the UV map also corresponds to four pixels of the image to be rendered. The four pixels are applied as a texture to the third segment of the environmental model as a texture during the rendering process. Thus, assuming the third segment of the environmental model is the same size as the first and second segments of the environmental model, the third segment will be of the same resolution as the first and second segments. In accordance with the second resolution allocation scheme resolution reduction is not applied to the left and middle portions of the image but resolution reduction is performed with regard to the right side of the image. Thus while the first, second and third segments of the rendered image will be of the same resolution in the FIG. 28 example, segments corresponding to the right side of the image and thus the right side of the environmental model 3002 will be of lower resolution.

FIG. 29 shows the application of UV map 2606 to an image 2604, generated using the third selective resolution reduction operation, which allocates less resolution to the left portion of an image corresponding to a portion of an environment than the middle and right portions. Thus FIG. 28 shows how a reduced resolution image 2604 can be rendered using the UV map 2606 and the environmental model 3002 with environmental segments corresponding to segments of the UV map 2606. The top portion of FIG. 29 shows the relationship between segments of the UV map 2606 and the segments of the environmental model 3002. A first segment of the UV map 2606 corresponds to the first environmental module segment (EMS 1) of environmental model 3002, as represented by the solid arrow extending from the first segment of the UV map 2606 and EMS 1. A second environmental model segment (EMS 2) of environmental model 3002 corresponds to the second segment of the UV map 2506 as indicated by the dashed arrow extending from the second segment of the UV map 2606 and EMS 2. A third environmental module segment (EMS 3) of environmental model 3002 corresponds to the third segment of the UV map 2606 as indicated by the dashed arrow extending from the second segment of the UV map 2606 and EMS 3.

During rendering, the UV map 2606 is used to determine how to apply an image to be rendered to the environmental model 3002. FIG. 29 shows how the communicated image 2604 and the pixels in the segments of the image corresponding to a segments of the UV map are applied to the corresponding segments of the environmental model 3002. The portion of the image 2604 corresponding to a segment of the environmental model 3002 as indicated by the UV map 2606 is scaled and/or adjusted in shape as necessary to fully occupy the corresponding segment of the environmental model 3002. Thus, for example, two pixels of the communicated image 2604 corresponding to the first segment of the UV map 2606 are scaled to fully occupy the first segment EMS1 of the environmental model to which they are applied. Similarly in the FIG. 29 example, the two pixels of the image being rendered, corresponding to the second segment of the UV map 2606 are scaled to fully occupy the second segment EMS2 of the environmental model 3002 to which they are applied as a texture. In the FIG. 29 example, the third segment of the UV map also corresponds to two pixels of the image to be rendered. The two pixels are applied as a texture to the third segment of the environmental model 3002 as a texture during the rendering process. Thus, assuming the third segment of the environmental model 3002 is the same size as the first and second segments of the environmental model 3002, the third segment will be of the same resolution as the first and second segments. In accordance with the third resolution allocation scheme resolution reduction is not applied to the middle and right portions of the transmitted image but resolution reduction is performed with regard to the left side of the image. Thus while the first, second and third segments of the rendered image will be of the same resolution in the FIG. 29 example, segments corresponding to the middle and side of the image and right side of the environmental model 3002 will be of higher resolution.

Thus, by using different UV maps different resolution allocation can be achieved during playback while the size and/or number of pixels in the input images remains the same. This provides an easy and efficient way of changing resolution allocations without having to alter the size or number of pixels in the images being transmitted.

Figure 41:
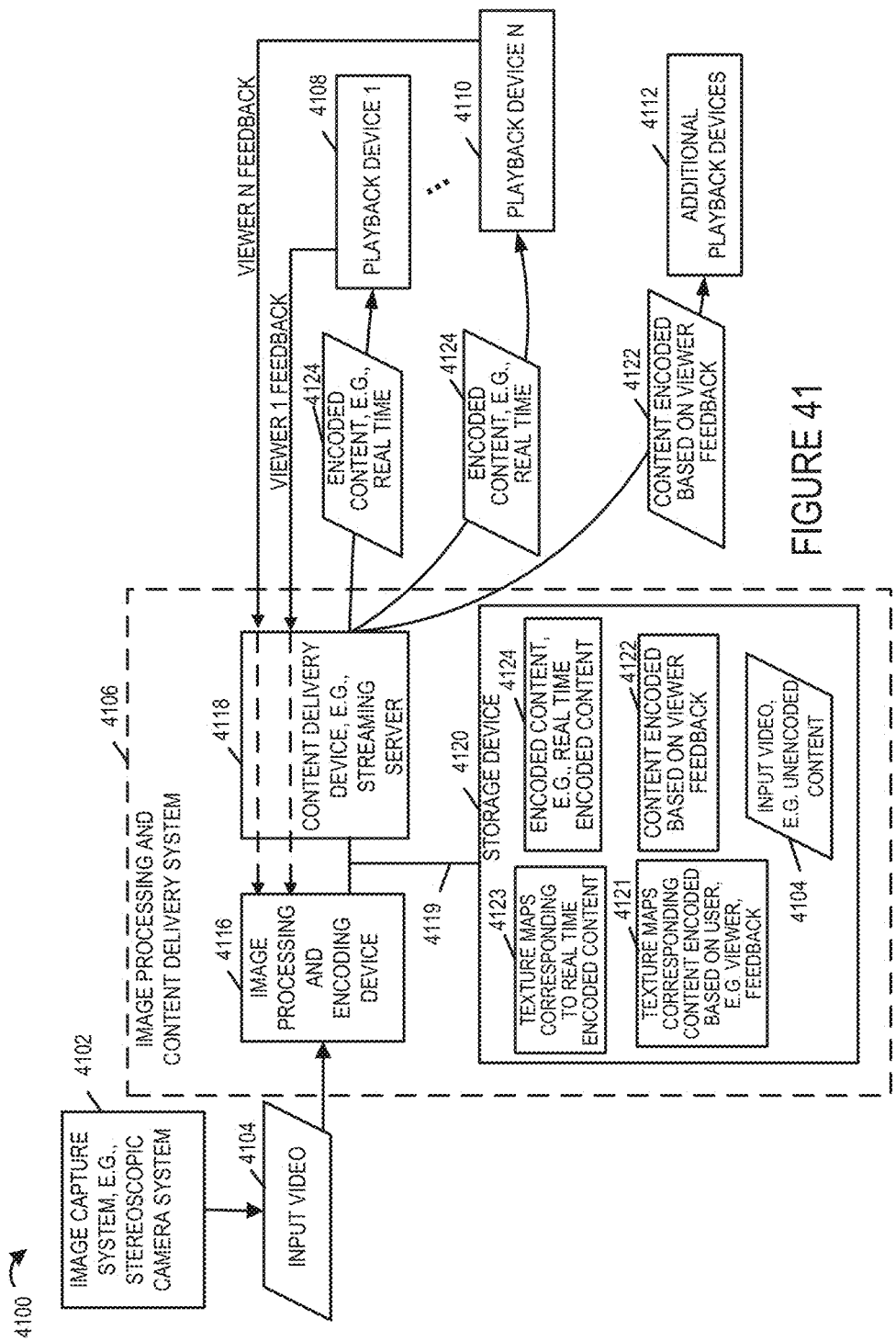
FIG. 41 illustrates an exemplary system which may be the same or similar to the system shown in FIG. 1 but with various components and signaling shown in greater detail.

FIG. 41 is an illustration of a system 4100 which may be the same or similar to the system shown in FIG. 1 but with various components and signaling shown in greater detail. The system 4100 includes an image capture system 4102 which can be a stereoscopic or non-stereoscopic image capture system, e.g., rig with multiple cameras capable of capturing a 360 degree view or some other smaller view of an environment. The images, e.g., input video 4104 captured by the image capture system 4102 are supplied to the image processing and content delivery system 4106 for processing and potential streaming to playback devices 1 4108 to N 4110 via a communications network, such as the network 105 shown in FIG. 1, e.g., in response to requests for content, e.g., at a data rate that can be supported by the communications link to the playback device sending the request. In addition to devices 1 to N the system includes additional playback devices 4112, not shown in FIG. 1 but which may be present in the system of FIG. 1. The additional playback devices 4112 are located at the same or different customer premises than customer premises 1-N shown in FIG. 1. In some cases the additional playback devices 4112, each of which includes a display and decoding apparatus which are the same as or similar to the display 124 and decoding apparatus 122, are located in a different country from devices 1 to N and receive content that is streamed at a time after the content is supplied to playback devices 1 4108 to N 4110. Content requests and viewer feedback information is supplied by the playback devices 1 to N to the image processing and content delivery system 4106. The feedback information indicates, in some embodiments, what portion of the environment represented by the provided content a user is viewing during one or more, e.g., each, frame time. While feedback information is provided for each frame in some embodiments, in other embodiments environmental viewing information is supplied at a lower rate, e.g., for each key frame or set of frames corresponding to a key frame. As will be discussed below the environmental portion viewing information allows for prioritization of portions of the environment which can be used to control resolution allocation for one or more data rates prior to re-encoding of the content for streaming to the additional playback devices 4112.

For purposes of explaining the invention reference numbers starting with 41 will be used to refer to the components of FIG. 41 but it should be appreciated that the image capture system 4102 may be the same or similar to the image capture system 102. In the case of a non-stereoscopic system individual cameras may be used in place of pairs of cameras. The image capture system 4102 may be the same or similar to the image capture system 102. Similarly the image processing and content delivery system 4106 may be used as the image processing and content delivery system 104. The image processing and encoding device 4116 may be and sometimes is used as the image processing and encoding device 112 with the content delivery device 4118 being used in place of the content delivery device 114. The hardware used to implement content delivery device 4118 may be the same or similar to the hardware used to implement the content delivery device 114 and may be a steaming server. In the FIG. 41 example, the content delivery device responds to content requests by providing the requested content to the playback devices but also receives via a network interface viewer feedback information indicating which portions of an environment are viewed during playback at different times and supplies the feedback information to the image processing system which can then prioritize environmental portions and re-encode the content that was transmitted to the playback devices for subsequent transmission to the same or additional devices in response to subsequent content requests. While the content delivery device 4118 is shown as a single device it may be, and sometimes is, implemented using a set of streaming servers distributed at various locations which provide feedback information to the image processing and encoding device 4116. In the FIG. 41 example, content storage device 4120 is shown as a separate device but it may be included in the streaming server and/or image processing and encoding device 4116. The devices 4116, 4118 and 4120 are coupled together by a bus represented by a solid line 4119 over which information and content can be exchanged and communicated. Each of the image processing system 4116 and content delivery device 4418 include a processor and memory with the processor being configured to control the device in which the processor is located to operate in accordance with the invention. Thus in some embodiments the image processing system includes a processor, various interfaces, a display device and other components. FIG. 7 shows a computer system that can be used as the image processing and encoding device 4116 and/or as the content delivery device 4118. In an embodiment where the computer system shown in FIG. 7 is used as the image processing and encoding device 4116 and/or the content delivery device 4118 it would include the elements shown in FIG. 7 as well as any additional elements of these devices shown in FIGS. 41 and/or 42.

Content storage device 4120 is used to store the original content 4104 received from the image capture system to enable initial real time encoding as well as subsequent re-encoding. The storage device 4120 also includes encoded content 4124 that is generated from real time encoding of the received input video 4104 while an event is ongoing along with the corresponding texture maps 4123 to be used by a playback device which receives the encoded video content 4124. In addition to the real time encoded video content 4124 the storage device 4120 includes content 4122 encoded based on view feedback, e.g., for a plurality of data rates, along with the corresponding texture maps 4121. The texture maps 4123 and 4121 may be, and sometimes are, stored with the encoded content with which they are to be used or separate from the encoded content. The texture map or texture maps to be used for applying one or more frames to a surface are normally transmitted, e.g., by the content delivery device, to a playback device which is also supplied with the encoded content corresponding to the texture map. The texture map or maps are normally supplied to the playback device prior to the time the playback device will need the texture map to determine how to apply the image or images in the encoded content as textures to one or more surfaces of the environment, e.g., inside surface of a sphere or surfaces of an environment having another shape which is being simulated by the playback device.

As can be seen in the FIG. 41 example, the encoded real time content 4124 is supplied to playback devices 4108 and 4110 which supply feedback information to the content delivery system and through it the image processing and encoding apparatus 4116 so that the environmental portion viewing information can be used in determining priorities of different portions of the environment represented by content 4104.

Figure 42:
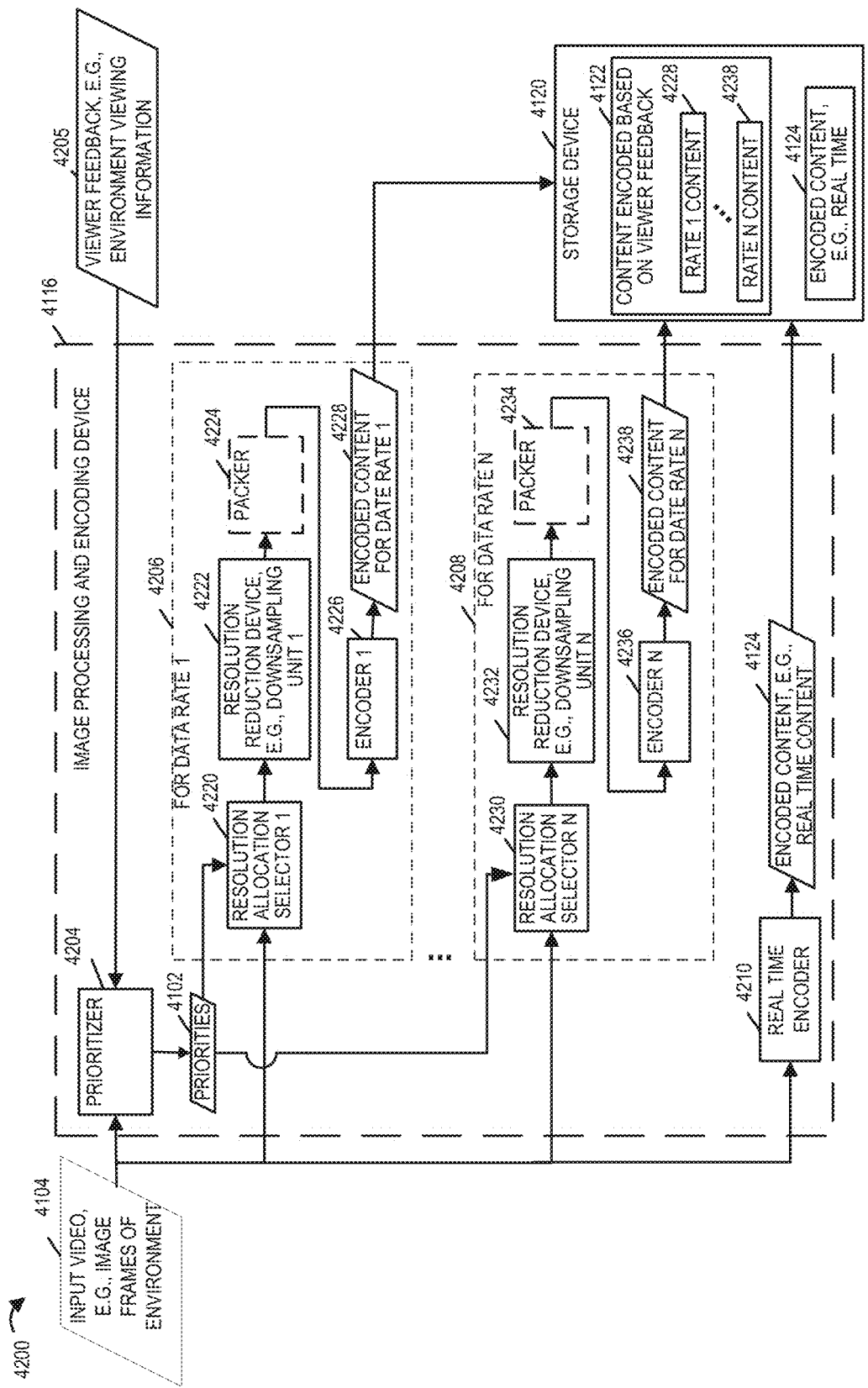
FIG. 42 illustrates various components of the image processing and encoding device shown in FIG. 41 in greater detail.

Various components of the image processing and encoding device 4116 are shown in detail in the diagram 4200 of FIG. 42 which also shows various inputs and outputs of the image processing and encoding device 4116 as well as some of the encoded content included in storage device 4120 which is made available to the content delivery system 4118 for streaming to playback devices. Texture maps and other data stored in storage device 4120 and discussed with regard to FIG. 41 are not shown in FIG. 42 due to space limitations but are present. Components shown in FIG. 4200 which are the same or similar to those shown in FIG. 41 are identified using the same reference numbers and will not be described again in detail.

Image processing and encoding device 4116 includes a real time encoder 4210 which generates encoded content 4124 along with indications of which texture map or maps 4123 are to be used with the generated content 4124. The real time encoded content 4124 is encoded while an event is ongoing based on predetermined resolution allocations, resolution allocation decisions based on object tracking such as where a ball is located and/or input from a limited number of viewers at an event whose head position is tracked during an event and the information used for determining resolution allocations for the real time encoded content.

The image processing and encoding apparatus 4116 includes a prioritizer 4204, video processing chains 1 to N 4206, 4208 each of which correspond to a different data rate to be supported and a real time encoding chain including a real time encoder 4210. Each video processing chain received the input video and encodes it for the data rate to which the chain corresponds. While shown in parallel, the real time encoding normally occur at least partially while an event is ongoing with priority based encoding being performed by video processing chains 4206, 4208 being performed at a later time based on received feedback information with the input video being supplied for such later, e.g., re-encoding operations, from storage device 4120.

The real time encoder 4210 receives the input video 4104, e.g., while an event is ongoing and encodes the content for delivery to playback devices in real time or near real time. Thus playback devices 4108, 4110 may and often do receive some of the content while the event which is the source of the video content is still ongoing, e.g., during a basketball game or concert.

The real time encoded content 4124 may be encoded for one or more playback rates and transmitted to the playback devices 4108, 4110 for decoding, rendering using corresponding texture maps and display to users of the playback devices 4108, 4110.

Feedback information 4205 from multiple users of the playback devices 4108, 4110 is received and used by the prioritizer 4204 which prioritizes portions of the environment, where the input video 4104 was captured, as will be discussed further below, e.g., on a frame time basis or for a group of frames. The viewer feedback 4205 is received in some embodiments from the content server 4118 which supplied the real time encoded content 4124 or previously encoded content to the playback devices 4108, 4110 or additional devices 4112.

Environmental portion priority information 4102 is generated in some embodiments on a per frame time basis and supplied to the resolution allocators 4220, 4230 of each video processing chain. Thus each of the video processing chains 4206, 4208 which perform re-encoding for one or the supported data rates receives the environmental portion priority information 4102.

The video processing chain for data rate 1 4206 will now be described. As will be discussed further below with regard to FIG. 40 which shows a method implemented in accordance with the invention, the resolution allocation of the first data rate chain 4206 selects resolution allocations to be used, e.g., for a frame or sets of frames, based on the priority information. For example, in some embodiments a resolution allocation is made and then applied on a group of frames or images basis where the group corresponds to the spacing of key frames such as I-frames so that the resolution allocation will change on key frame boundaries facilitating coding and decoding operations and not between key frames.

Resolution allocator 4220 determines which of a plurality of possible resolution allocations to be used for a given frame time or set of frame times. The plurality of resolution allocations involve downsampling row and/or column portions of input images. In various embodiments for a given data rate the number of row and/or column portions to be downsampled is known with the resolution allocator selector for data rate 1 4220 determining, e.g., on a per frame time or per set of frames basis, which of the various possible resolution allocations should be used and thus also which corresponding texture map should be used for decoding. With a resolution allocation having been determined, processing proceeds to resolution reduction device 4222 which is responsible for downsampling row and/or column portions of an image to be encoded in accordance with the selected resolution allocation for the frame time corresponding to the image. Thus since the resolution allocation may select to use different resolution allocations for different frame times, the downsampling unit 4222 takes into consideration the resolution allocation to be applied to a particular image based on the frame time to which the image corresponds and applies the selected resolution reduction. In the case of stereoscopic images, a left and right eye image may correspond to a single frame time. The left and right eye images can be and sometimes are packed by packer 4224 into a single frame for encoding purposes. In other embodiments the left and right eye images are not packed together but rather encoded separately, e.g., sequential. In the case of non-stereoscopic images, there is only a single image for a frame time and thus the packer 4224 need not be used and can be omitted.

After resolution reduction the reduced resolution images are supplied to the encoder 4226 which encodes the images to achieve an output stream having the desired data rate, e.g., data rate 1 in the case of processing by encoder 1. Information may be, and sometimes is, embedded in the encoded video frames indicating the texture map to be used for rendering the individual frame or included in control information that is transmitted with the encoded content. In this way a decoder can identify the corresponding texture map and use the correct one of various texture maps that may be used for data rate one when rendering a particular received encoded image that was decoded and is to be applied as a texture on a surface of the environment for display to a user of a playback device.

The content encoded for data rate 1 is stored as encoded content 4122 in the storage device 4120 and made available for streaming to one or more playback device by content delivery device 4118.

The video processing chains for the other data rates operate in the same or similar manner as the video processing chain 4206 for data rate 1 but for a different data rate and thus a different amount of resolution reduction per frame.

For example, video processing chain 4208 includes an Nth resolution allocation selector 4230, a Nth resolution reduction device 4232, an optional Nth packer 4234, an Nth encoder 4236 which encodes the content for the Nth data rate resulting in encoded content 4238 data rate N which is stored in the storage device 4120 for streaming to one or more users of playback devices.

While feedback from real time encoded content is shown it should be appreciated that the prioritization and re-encoding can be performed based on feedback from content which was not encoded in real time and the real time example is for purposes of explaining the invention in the context of one real world application, e g., where content corresponding to a sporting event is first encoded and transmitted in real time and then re-encoded for subsequent transmission using feedback from viewers of the previously transmitted content.

The feedback and its use to prioritize environmental portions and select resolution allocation schemes will now be discussed further.

Figure 30:
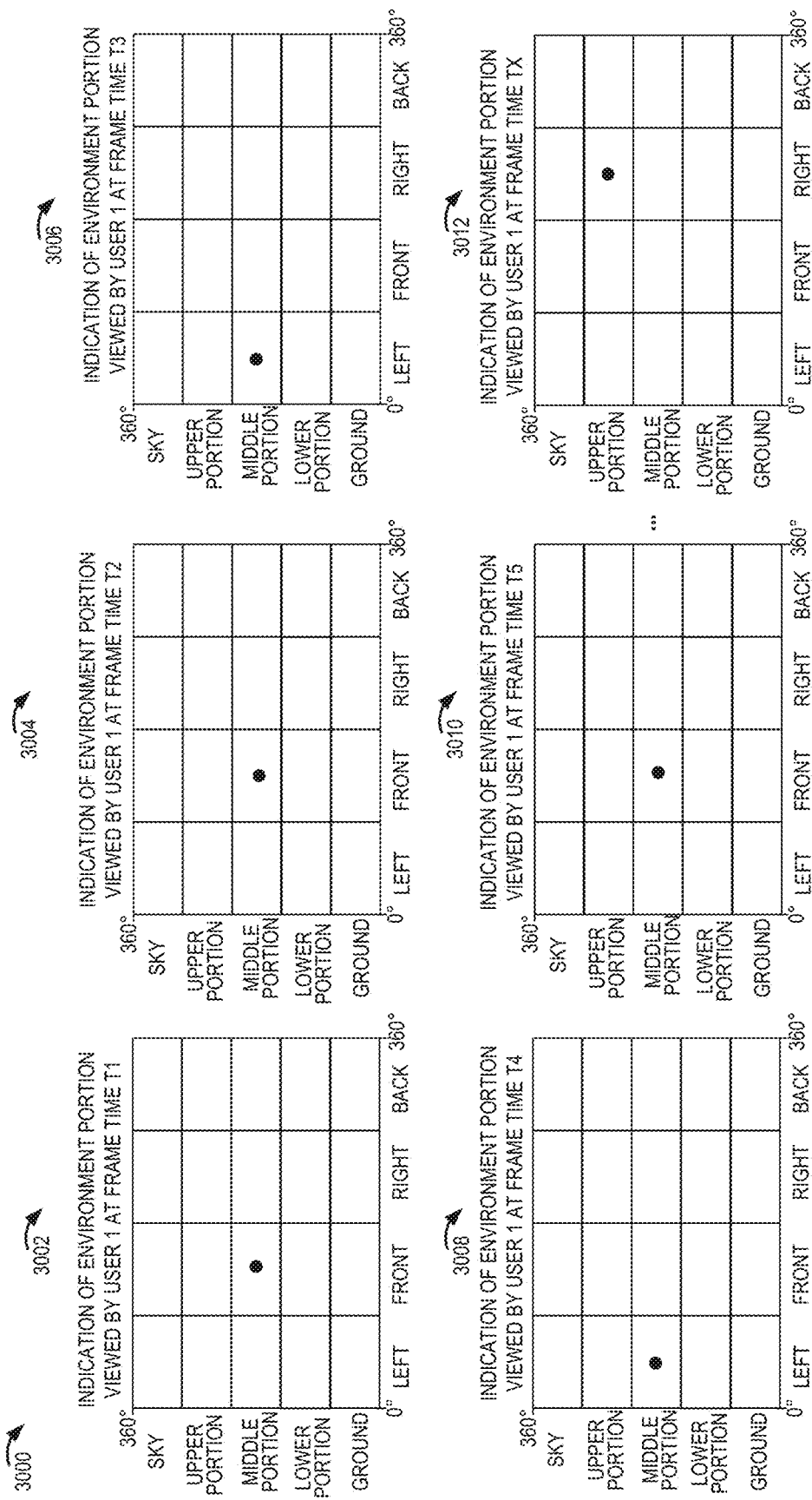
FIG. 30 illustrates various charts for different frame times showing collected viewing information for various portions of the environment which may be viewed.

FIG. 30 illustrates a set 3000 of exemplary environmental portion viewing information for a user of a playback device for a piece of content, e.g., sporting event, which includes a total of X frame times. The viewing information may be reported back to the streaming and encoding system in response to the content being streamed, e.g., in real time, during the event. The content may be, and in some embodiments is, streamed in an encoded form and displayed to the user of the playback device using a head mounted display with a tracking device. In some embodiments the content may be stereoscopic content which includes left and right eye frames which are displayed to the user. In other embodiments the content is non-stereoscopic content, e.g., with one frame being communicated and displayed to the user of the playback device at a given time. During playback the playback device determines user head position, e.g., from a tracking sensor in the head mounted display or holder of the head mounted display. The head position is determined on a per frame basis. The head position including rotation to a nominal forward center position and tilt allows the playback device to determine which portion of an environment is being viewed at a given frame time during content playback. This information is stored and reported back to the encoding and streaming system for future use, e.g., for determination resolution allocations during the duration of the event to be used for re-encoding and potential streaming of the content at a later time, e.g., to support one or more data rates.

The content provided to the viewer and used to capture the environmental viewing portion information shown in FIG. 30 may have been, and sometimes is, generated and streamed in real time while the event is ongoing. The initial real time transmission may rely on a predetermined resolution allocation or resolution allocation decisions determined from a position of an object at the event, e.g., ball, and/or viewing information collected from one or a few viewers at the event. Collecting viewing information from large numbers of viewers at the event is difficult since spectators normally want to watch the event and not wear helmets and/or other head mounted tracking devices. Furthermore while viewers at the event are likely to direct their view to the main action of the event, it should be appreciated that the different environmental setting of being at a live event and viewing the event in the form of streamed content may result in different viewing actions when a large number of viewers are considered. For example, users watching playback in a simulated 3D environment may tend to stray their view from the main field in an attempt to explore the rear and side portions of the environment out of interest in the environment which may not exist to a person who walked into a stadium and already viewed the non-field portions of the environment and was able to observe the other spectators at the environment. This is particularly the case where one or more users may be watching an event for a second or third time seeking to observe particular portions of the environment which they find interesting but which they did not pay attention to during the initial live streaming of the event. While users are more likely to explore the environment during a playback of an event, objects which capture the attention of some viewers during the live streaming are likely to capture the attention of viewers during non-live playback. For example a plane or bird in the sky may capture the attention of some viewers during the actual event or live streaming of content but is even more likely to draw the attention of viewers during a non-live or repeated playback of the content.

By receiving information on the portions of the environment being viewed during individual frame times, environmental portions can be prioritized and resolution allocations can be made for portions of the environment for frames or sets of frames. The content can then be subject to resolution reduction operations prior to or as part of an encoding process with higher priority environmental portions given greater resolution allocations than portions of the environment determined to be of lower priority. The switching between resolution allocations may be, and in some embodiments is, set to occur on key frame boundaries, boundaries corresponding to I-frames which can be decoded without reliance on previous frames.

The viewing information 3000 shown in FIG. 30 is for one user but is exemplary of the viewing information that may be, and sometimes is, collected for a large number of viewers, e.g., hundreds or even thousands of viewers, to which content is transmitted and playback by a playback device which then reports the head position/environmental viewing portion information for different portions, e.g., frames, of an event.

The charts 3002, 3004, 3006, 3008, 3010, 3012 correspond to different frame times and show the portions of the environment which may be viewed. While the portions of the environment are shown as being divided into 5 vertical portions, e.g., ground, a lower portion, a middle portion, an upper portion and a sky portion, and 4 horizontal portions, e.g., a left portion, front portion, right portion and back or rear portion, the environment may be divided into a much larger number of portions with each portion corresponding to a few rows or columns of pixels of a transmitted image. For example the sky portion represented by the first horizontal row of chart 3002 may be divided into 5 or more portions allowing for a portion in which a bird is flying or a plane is flying to be identified and allocated more resolution than other portions of the sky. Similarly the other portions may be divided into multiple portions with the actual reported environmental viewing information being far more detailed than the example shown in FIG. 30 which is for purposes of explaining the invention.

In the FIG. 30 example, at the start of an event the user to which FIG. 30 corresponds is detected viewing the middle front portion as shown and represented in chart 3002 using a dot. This may correspond to an event, e.g., at the center of a court or field used to start a sporting event. The user's view status is at the middle front portion for multiple frame times, as might be expected given that a frame time is relatively short, e.g., 1/30 of a second in some embodiments. Thus in chart 3002, corresponding to frame time T2, the user is shown viewing the middle front portion of the environment, which is the same as during frame time T1. During frame time T3, as shown in chart 3006, the user's view changes to the middle left portion of the environment, e.g., as might be expected as a ball moves downcourt or downfield left of the viewer using the playback device. The user's view of the environment remains directed to the left middle portion at frame time T4 as shown in chart 3008 but moves again to the front middle portion at frame time T5 shown in chart 3010, e.g., at the ball or action move in the opposite direction back towards the front middle portion of the environment. The three dots . . . shown in FIG. 30 are used to represent multiple additional frame times for which environmental viewing information is collected and reported from a user of a playback device prior to the last frame TX of an event for which viewing information is collected from the playback device. As shown in chart 3012 by frame time TX the user's view of the environment has shifted to the right upper portion as shown in chart 3012. Such a portion of the environment may correspond to a scoreboard, for example, where a final score of a basketball game or soccer match which was being displayed is shown.

While the environmental portions for which viewing information is gathered correspond to the full set of possible viewing portions which in the example is a full 360 degrees both vertically and horizontally, in other embodiments the information may be collected for a smaller portion of the environment, e.g., for the front portion, with another portion not being tracked because resolution allocation is not adjusted for the other portion. Furthermore, it should be appreciated that the method is applicable to systems and content that provide a user an opportunity to view less than a full 360 degree view of the environment in all directions and that the example is used for purposes of explaining the invention and is not intended to be limiting to a particular environment or portion of the environment.

The environmental portion viewing information of the type shown in FIG. 30 may be collected for a large number of viewers for all or a portion of a piece of content, e.g., event or program, transmitted to playback devices. Some of the users of the playback devices may be aware that their viewing information will be collected and used to control resolution allocation. Such viewers' identities may be known and reported along with the environmental viewing portion. Such users may be rewarded or compensated for allowing their identity to be tracked and may be advised to try to avoid looking at the ground or sky and focus on the main action of the event. Other users may have their environmental viewing information tracked and reported anonymously. The anonymous viewers may not be aware that their viewing information will be used to control resolution allocation for subsequent encodings of the event and may tend to have their view stray from the main action more than the users who are aware that their identity will be known and viewing information used to influence future resolution allocation and re-encoding of the content being viewed. Thus while the viewing information between the identified users and anonymous users will generally agree, the anonymous users who normally outnumber the identified users can be useful in identifying environmental portions away from the main action but of particular interest to at least some users. For example, the anonymous viewers' viewing information can be used to identify portions of the environment of interest such as sign areas, interesting members of the audience, birds and planes flying overhead, where the main action is not occurring but where it may be desirable to persevere resolution at a higher level than at other portions of the environment away from the main action.

In some embodiments, in order to take advantage of the viewing characteristics and differences between users who are aware that their viewing information is being used, e.g., to control resolution allocation, and anonymous users who might not be aware their viewing information is being tracked and used or who might not care about the implications viewing portions of the environment where the main action is not occurring might have on resolution of future versions of the content, the viewing information for different types of users, e.g., known and anonymous users, may be, and sometimes is, collected and counted separately and weighted differently for purposes of determining the priority of different portions of the environment for resolution preservation purposes. For example, a count of known identified users may be weighted twice as heavily as a count of anonymous users when determining the priority of a portion of the environment.

Figure 34:
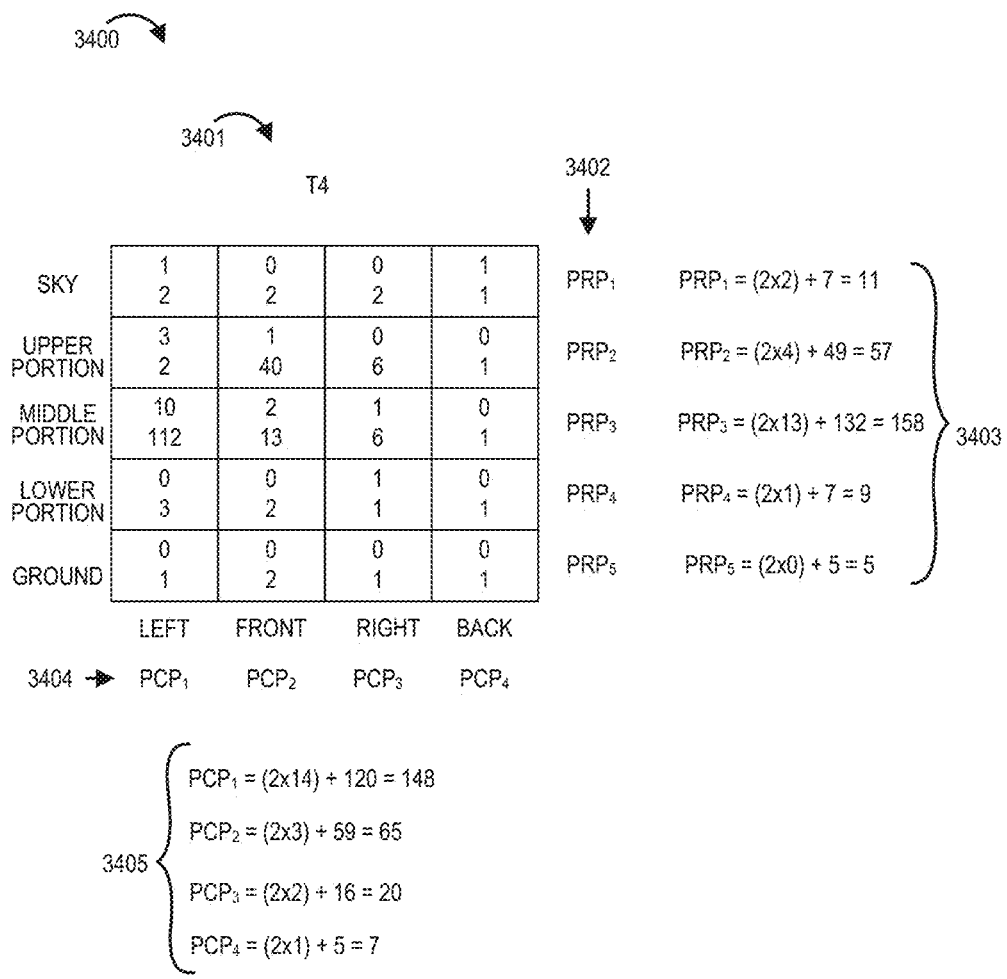

FIGS. 31-36 show viewing statistics priority determinations made for each of the portions of the environment shown in the example of FIG. 30 for each of the frame times shown in FIG. 30. For example FIG. 31 corresponds to frame time T1; FIG. 32 corresponds to frame time T2; FIG. 33 corresponds to frame time T3; FIG. 34 corresponds to frame time T4; FIG. 35 corresponds to frame time T5; and FIG. 36 corresponds to frame time TX. The viewing information shown in FIGS. 31-36 is for 20 users whose identity is known and who are aware that their environmental viewing portion information will be tracked and used and for 200 anonymous users whose identity is not known and who are likely unaware how their viewing information will be used to control future resolution allocation when re-encoding the content being viewed. Each segment of the set of information corresponds to a different portion of the environment with the viewing count of identified known users being shown in the top portion of the segment and the viewing count of the anonymous viewers being shown in the lower portion of the segment. Each viewer has his/her view reported as being directed to one of the portions of the environment during any given frame time.

Figure 31:
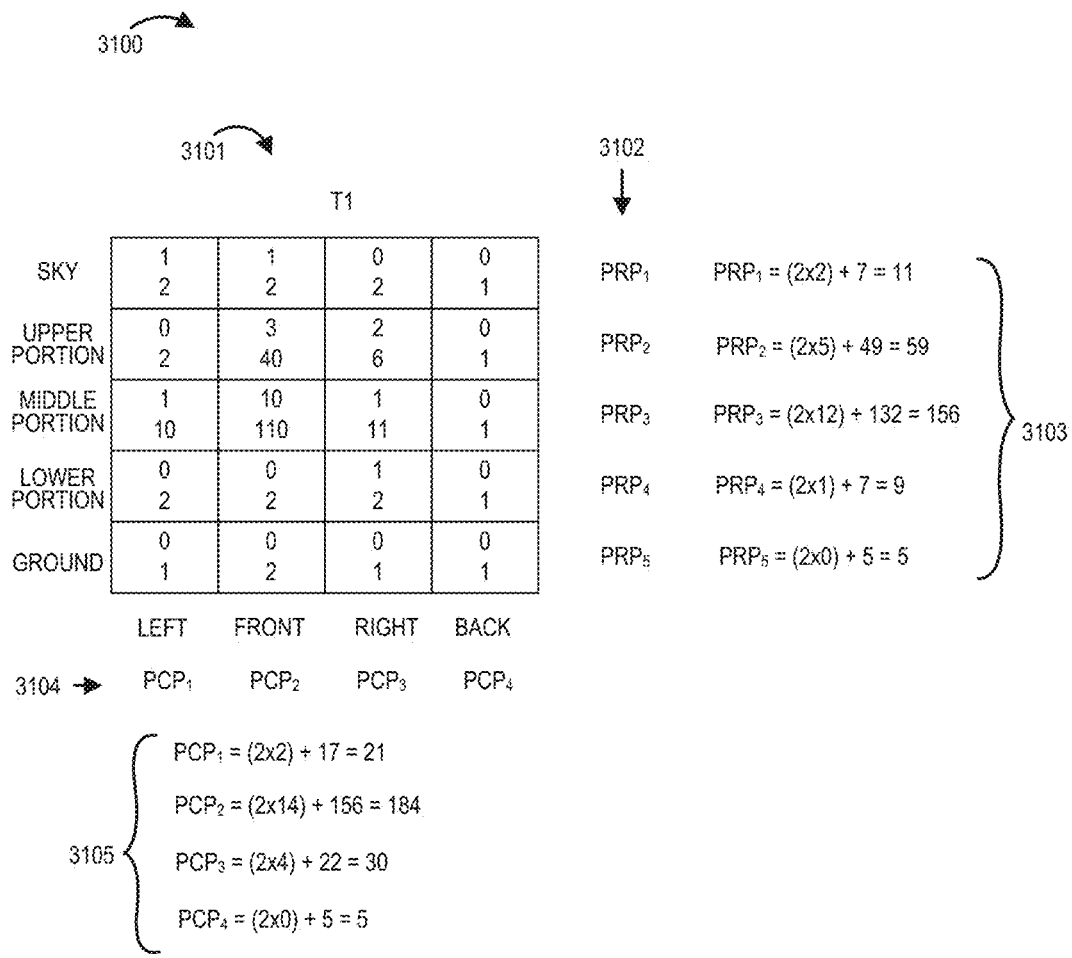
Figure 36:
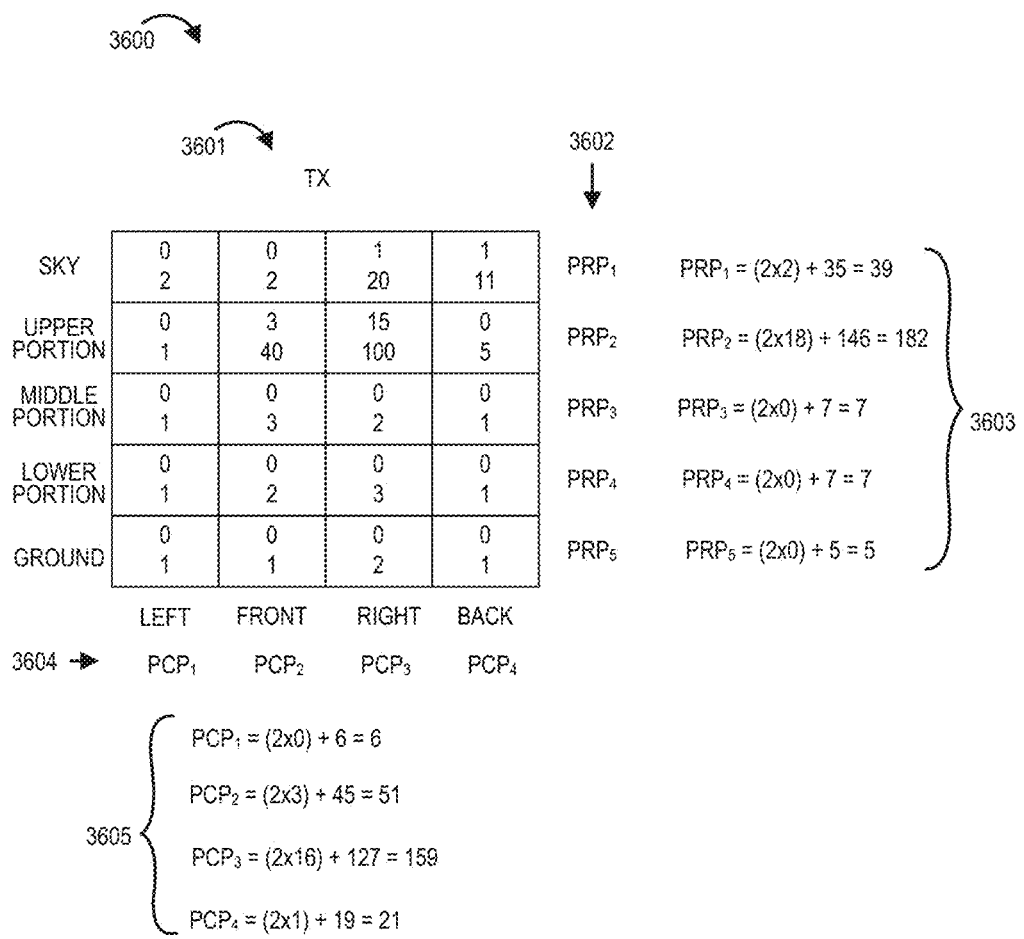

FIG. 31 shows information 3100 corresponding to frame time T1 including: exemplary viewing information 3101, e.g., a segmented set of collected statistical viewing information including counts for known and anonymous users, priorities 3102 determined for different row portions, calculations 3103 used in determining the row portion priorities, priorities 3104 determined for different column portions, and calculations 3105 used in determining the column portion priorities. FIG. 32 shows information 3200 corresponding to frame time T2 including: exemplary viewing information 3201, e.g., a segmented set of collected statistical viewing information including counts for known and anonymous users, priorities 3202 determined for different row portions, calculations 3203 used in determining the row portion priorities, priorities 3204 determined for different column portions, and calculations 3205 used in determining the column portion priorities. FIG. 33 shows information 3300 corresponding to frame time T3 including: exemplary viewing information 3301, e.g., a segmented set of collected statistical viewing information including counts for known and anonymous users, priorities 3302 determined for different row portions, calculations 3303 used in determining the row portion priorities, priorities 3304 determined for different column portions, and calculations 3305 used in determining the column portion priorities. FIG. 34 shows information 3400 corresponding to frame time T4 including: exemplary viewing information 3401, e.g., a segmented set of collected statistical viewing information including counts for known and anonymous users, priorities 3402 determined for different row portions, calculations 3403 used in determining the row portion priorities, priorities 3404 determined for different column portions, and calculations 3405 used in determining the column portion priorities. FIG. 35 shows information 3500 corresponding to frame time T5 including: exemplary viewing information 3501, e.g., a segmented set of collected statistical viewing information including counts for known and anonymous users, priorities 3502 determined for different row portions, calculations 3503 used in determining the row portion priorities, priorities 3504 determined for different column portions, and calculations 3505 used in determining the column portion priorities. FIG. 36 shows information 3600 corresponding to frame time TX including: exemplary viewing information 3601, e.g., a segmented set of collected statistical viewing information including counts for known and anonymous users, priorities 3602 determined for different row portions, calculations 3603 used in determining the row portion priorities, priorities 3604 determined for different column portions, and calculations 3605 used in determining the column portion priorities.

Consider FIG. 31 which shows information 3100 corresponding to frame time T1 including viewing information 3101, e.g., a segmented set of collected statistical viewing information including counts for known and anonymous users, and priorities 3102 (PRP1, PRP2, PRP3, PRP4, PRP5) determined for different row portions RP1 corresponding to the sky portion, RP2 corresponding to the upper portion of the environment, RP3 corresponding to the middle portion of the environment, RP4 corresponding to the lower portion of the environment and RP5 corresponding to the ground portion of the environment. The majority of viewers have their direction directed to the front middle portion for frame time T1, e.g., where the ball is located at time T1 during the example of FIG. 30 to which the viewing information in FIG. 31 corresponds. Note that of the 20 identified known users, 10 have their view directed to the middle front portion of the environment and 3 have their view directed to the upper middle portion of the environment. Similarly a large number of anonymous viewers have their attention directed to the same area at time T1 with 110 anonymous viewers viewing the front middle portion at time T1 and 40 anonymous viewers viewing the upper front portion of the environment at time T1. A smaller number of viewers have their attention directed to the left middle portion and the left upper portion of the environment with the majority of viewers having their attention clustered around the front middle portion and front upper portion of the environment, as might be expected with the ball centered in the center of the environment, e.g. at center court or mid field.

Each of the row portions RP1, RP2, RP3, RP4, and RP5 include multiple rows of pixel values in the original captured images of the event. The captured images may include single images. However in the case of stereoscopic image capture a pair of left and right eye images will normally be captured for each frame time. A resolution reduction operation can be performed by downsampling a row portion, e.g., by replacing a row portion including multiple rows with a row portion including fewer rows of pixels prior to encoding. Such a resolution reduction operation may include simply eliminating one or more rows of pixels in the row portion to be downsampled but in other embodiments the pixel values in multiple rows are averaged, e.g., in a vertical direction and replaced with a single value for N original pixel values. For example if a row portion including two rows was down sampled by a factor of two the resolution would be reduced in half with one pixel value replacing each pair of pixel values corresponding to a column of the row portion being down sampled.

Each of the column portions CP1, CP2, CP3, and CP4, corresponding to left, front, right and back portions of the environment include multiple columns of pixel values in the original captured images of the event. As noted above the captured images may include a single image for each frame time. However in the case of stereoscopic image capture a pair of left and right eye images will normally be captured for an individual frame time. A resolution reduction operation can be performed by downsampling a column portion, e.g., by replacing a column portion including multiple columns of pixel values with a column portion including fewer columns of pixels prior to or during encoding. Such a resolution reduction operation may include simply eliminating one or more columns of pixels in the column portion to be downsampled but in other embodiments the pixel values in multiple columns are averaged, e.g., in a horizontal direction and replaced with a single value for N original pixel values. For example if a column portion including two columns of pixel values was downsampled by a factor of two the resolution would be reduced in half with one pixel value replacing each pair of pixel values corresponding to a row of the column portion being downsampled.

In some but not necessarily all embodiments the number of row and column portions to be downsampled is predetermined and fixed for a given data rate to be supported. For lower data rates a larger number of row and column portions of the input images may be downsampled prior to encoding. By prioritizing the different portions of the environment based on user feedback, resolution allocations can be determined for different data rates, and the portions to be downsampled can be selected based on the relative importance of the different portions of the environment.

Column 3102 identifies five priorities (priority row portion 1 (PRP1), priority row portion 2 (PRP2), priority row portion 3 (PRP3), priority row portion 4 (PRP4), priority row portion 5 (PRP5)), corresponding to row portions ((RP1 (sky), RP2 (upper portion), RP3 (middle portion), RP4 (lower portion), RP5 (ground)), respectively, which are determined. Information 3103 shows calculations used to determine values for each of the five priorities (PRP1, PRP2, PRP3, PRP4, PRP5). Consider for example FIG. 31 which shows that the priority row portion 1 (PRP1) is determined by weighting the total number (2) of known users who have viewed RP1 by a weighting factor of 2 and adding the weighted number (4) to the total number (7) of anonymous users reported to be viewing RP1 during frame time 1. The other row portion priorities (PRP2, PRP3, PRP4, PRP5) are calculated in a similar manner with the priority of RP1 (PRP1) being determined to be 11, with the priority of RP2 (PRP2) being determined to be 59, with the priority of RP3 (PRP3) corresponding to the middle portion being determined to be 156, with the priority of RP4 (PRP4) being determined to be 9 and with the priority of RP5 (PRP5) being determined to be 5. As might be expected, the row portion (row portion 3 (RP3) corresponding to the middle portion), corresponding to the majority of viewers, has been determined to have the highest priority (PRP3=156), and the ground (RP5) which is being viewed by few viewers is being assigned the lowest priority (PRP5=5). By ranking the row portions according to priority, it is easy to identify the higher priority row portions with the resolution reduction being performed, to the extent necessary for a given data rate on the lower priority row portions.

Row 3104 identifies four priorities (PCP1, PCP2, PCP3, PCP4), corresponding to column portions ((CP1 (left), CP2 (front), CP3 (right), CP4 (back)), respectively, which are determined. Information 3105 shows calculations used to determine values for each of the four priorities (PCP1, PCP2, PCP3, PCP4). Column portion priorities are calculated in a similar manner, as previously described with respect to row portion priorities. In the example of FIG. 31, the priority for CP1 (PCP1) is determined to be 21 based on the weighted contribution, with weighting factor 2, of 2 known users and the contribution of 17 anonymous users who were observing the first column portion CP1 during frame time T1. In the FIG. 31 example, the priority of column portion 1 (PCP1) is determined to be 21, the priority of CP2 (PCP2) is determined to be 184, the priority of CP3 (PCP3) is determined to be 30 and the priority of CP4 (PCP4) is determined to be 5.

The ranked order of row portion priorities for frame time T1 in the FIG. 31 example is PRP3 (156), PRP2 (59), PRP1 (11), PRP4 (9) and PRP5 (5). The ranked order of column portion priorities is PCP2 (184), PCP3 (30), PCP1 (21) and PCP4 (5).

In various embodiments the number of rows and columns of pixel values transmitted to a playback device for a given data rate stream is held constant while the resolution allocation may be changed over time, e.g., as the priority of different portions of the environment change over time.

For each supported data rate, row and column portions of the input image may be downsampled by a predetermined amount with the determined row and column portion priorities being used to control the resolution allocation and thus which portion or portions of the images will be subjected to the downsampling.

In one embodiment to support a first data rate resolution reduction is performed on one row portion and resolution reduction is not performed on any column portions. For example, to support the first data rate, one row portion is downsampled for each time frame. In such a case for frame time T1 for the example of FIG. 31, the lowest priority row portion, RP5 will be subjected to downsampling.

In one embodiment, for a second data rate, which is lower than a first data rate, resolution reduction is performed on two row portions and resolution reduction is not performed on any column portions. For example to support a second data rate, two row portions are downsampled for each frame time. In such a case for frame time T1 for the example of FIG. 31 the two lowest priority row portions RP5 and RP4 will be subjected to downsampling.

In one embodiment, to support a third data rate, which is lower than the second data rate, resolution reduction is performed on two row portions and resolution reduction is performed on one column portion. For example to support a third data rate, two row portions are down sampled and one column portion is downsampled for each frame time. In such a case for frame time T1 for the example of FIG. 31, the two lowest priority row portions RP5 and RP4 will be subject to down sampling and the lowest priority column portion CP4 will be subjected to downsampling.

In one embodiment, to support a fourth data rate, which is lower than the third data rate, resolution reduction is performed on two row portions and resolution reduction is performed on two column portions. For example to support a fourth data rate, two row portions are downsampled and two column portion are downsampled for each frame time. In such a case for frame time T1 for the example of FIG. 31, the two lowest priority row portions RP5 and RP4 will be subjected to downsampling and two lowest priority column portion CP4 and CP1 will be subjected to downsampling.

In one embodiment, to support a fifth data rate, which is lower than the fourth data rate, resolution reduction is performed on three row portions and resolution reduction is performed on two column portions. For example in one embodiment to support a fifth data rate, three row portions and two column portions are downsampled for each frame time. In such a case for frame time T1 for the example of FIG. 31, the three lowest priority row portions RP5, RP4 and RP1 will be subjected to downsampling and the two lowest priority column portions CP4 and CP1 will be subjected to downsampling.

In one embodiment, to support a sixth data rate, which is lower than the fifth data rate, resolution reduction is performed on three row portions and resolution reduction is performed on three column portions. For example, in one embodiment to support a sixth data rate which is lower than the fifth data rate 3 row portions and 3 column portions are subjected to downsampling. In such a case for the sixth data rate frame time T1 for the example of FIG. 31, the three lowest priority row portions RP5, RP4 and RP1 will be subjected to downsampling and the three lowest priority column portions CP4, CP1 and CP3 will be subjected to downsampling.

Consider FIG. 32 which corresponds to frame time T2. Column 3202 identifies five priorities (priority row portion 1 (PRP1), priority row portion 2 (PRP2), priority row portion 3 (PRP3), priority row portion 4 (PRP4), priority row portion 5 (PRP5)), corresponding to row portions (RP1 (sky), RP2 (upper portion), RP3 (middle portion), RP4 (lower portion), RP5 (ground)), respectively, which are determined. Information 3203 shows calculations used to determine values for each of the five priorities ((PRP1, PRP2, PRP3, PRP4, PRP5). FIG. 32 shows that the priority row portion 1 (PRP1) is determined by weighting the total number (1) of known users who have viewed RP1 by a weighting factor of 2 and adding the weighted number (2) to the total number (7) of anonymous users reported to be viewing RP1 during frame time T2. The other row portion priorities (PRP2, PRP3, PRP4, PRP5) are calculated in a similar manner with the priority of RP1 (PRP1) being determined to be 9, with the priority of RP2 (PRP2) being determined to be 55, with the priority of RP3 (PRP3) corresponding to the middle portion being determined to be 160, with the priority of RP4 (PRP4) being determined to be 9 and with the priority of RP5 (PRP5) being determined to be 7. As might be expected, the row portion (row portion 3 (RP3) corresponding to the middle portion), corresponding to the majority of viewers, has been determined to have the highest priority (PRP3=160), and the ground (RP5) which is being viewed by few viewers is being assigned the lowest priority (PRP5=7). By ranking the row portions according to priority, it is easy to identify the higher priority row portions with the resolution reduction being performed, to the extent necessary for a given data rate on the lower priority row portions.

Row 3204 identifies four priorities (PCP1, PCP2, PCP3, PCP4), corresponding to column portions ((CM (left), CP2 (front), CP3 (right), CP4 (back)), respectively, which are determined. Information 3205 shows calculations used to determine values for each of the four priorities (PCP1, PCP2, PCP3, PCP4). Column portion priorities are calculated in a similar manner, as previously described with respect to row portion priorities. In the example of FIG. 32, the priority for CP1 (PCP1) is determined to be 19 based on the weighted contribution, with weighting factor 2, of 1 known user and the contribution of 17 anonymous users who were observing the first column portion CP1 during frame time T2. In the FIG. 32 example, the priority of column portion 1 (PCP1) is determined to be 19, the priority of CP2 (PCP2) is determined to be 181, the priority of CP3 (PCP3) is determined to be 32 and the priority of CP4 (PCP4) is determined to be 8.

The ranked order of row portion priorities for frame time T2 in the FIG. 32 example is PRP3 (160), PRP2 (55), PRP1 (9), PRP4 (9) and PRP5 (7). The ranked order of column portion priorities for frame time T2 in the FIG. 32 example is PCP2 (181), PCP3 (32), PCP1 (19) and PCP4 (8).

In one embodiment to support a first data rate, resolution reduction is performed on one row portion and resolution reduction is not performed on any column portions. For example, to support the first data rate, one row portion is downsampled for each time frame. In such a case for frame time T2 for the example of FIG. 32, the lowest priority row portion, RP5 will be subjected to downsampling.

In one embodiment, for a second data rate, which is lower than a first data rate, resolution reduction is performed on two row portions and resolution reduction is not performed on any column portions. For example to support a second data rate, two row portions are downsampled for each frame time. In such a case for frame time T2 for the example of FIG. 32 the two lowest priority row portions RP5 and RP4 will be subjected to downsampling.

In one embodiment, to support a third data rate, which is lower than the second data rate, resolution reduction is performed on two row portions and resolution reduction is performed on one column portion. For example to support a third data rate, two row portions are downsampled and one column portion is downsampled for each frame time. In such a case for frame time T2 for the example of FIG. 32, the two lowest priority row portions RP5 and RP4 will be subjected to downsampling and the lowest priority column portion CP4 will be subjected to downsampling.

In one embodiment, to support a fourth data rate, which is lower than the third data rate, resolution reduction is performed on two row portions and resolution reduction is performed on two column portions. For example to support a fourth data rate, two row portions are downsampled and two column portions are downsampled for each frame time. In such a case for frame time T2 for the example of FIG. 32, the two lowest priority row portions RP5 and RP4 will be subjected to downsampling and two lowest priority column portion CP4 and CP1 will be subjected to downsampling.

In one embodiment, to support a fifth data rate, which is lower than the fourth data rate, resolution reduction is performed on three row portions and resolution reduction is performed on two column portions. For example in one embodiment to support a fifth data rate, three row portions and two column portions are downsampled for each frame time. In such a case for frame time T2 for the example of FIG. 32, the three lowest priority row portions RP5, RP4 and RP1 will be subjected to downsampling and the two lowest priority column portions CP4 and CP1 will be subjected to downsampling.

In one embodiment, to support a sixth data rate, which is lower than the fifth data rate, resolution reduction is performed on three row portions and resolution reduction is performed on three column portions. For example, in one embodiment to support a sixth data rate which is lower than the fifth data rate 3 row portions and 3 column portions are subjected to downsampling. In such a case for the sixth data rate frame time T2 for the example of FIG. 32, the three lowest priority row portions RP5, RP4 and RP1 will be subjected to downsampling and the three lowest priority column portions CP4, CP1 and CP3 will be subjected to downsampling.

Consider FIG. 33 which corresponds to frame time T3. Column 3302 identifies five priorities (priority row portion 1 (PRP1), priority row portion 2 (PRP2), priority row portion 3 (PRP3), priority row portion 4 (PRP4), priority row portion 5 (PRP5)), corresponding to row portions ((RP1 (sky), RP2 (upper portion), RP3 (middle portion), RP4 (lower portion), RP5 (ground)), respectively, which are determined. Information 3303 shows calculations used to determine values for each of the five priorities (PRP1, PRP2, PRP3, PRP4, PRP5). FIG. 33 shows that the priority row portion 1 (PRP1) is determined by weighting the total number (2) of known users who have viewed RP1 by a weighting factor of 2 and adding the weighted number (4) to the total number (7) of anonymous users reported to be viewing RP1 during frame time T3. The other row portion priorities (PRP2, PRP3, PRP4, PRP5) are calculated in a similar manner with the priority of RP1 (PRP1) being determined to be 11, with the priority of RP2 (PRP2) being determined to be 57, with the priority of RP3 (PRP3) corresponding to the middle portion being determined to be 158, with the priority of RP4 (PRP4) being determined to be 9 and with the priority of RP5 (PRP5) being determined to be 5. As might be expected, the row portion (row portion 3 (RP3) corresponding to the middle portion), corresponding to the majority of viewers, has been determined to have the highest priority (PRP3=158), and the ground (RP5) which is being viewed by few viewers being assigned the lowest priority (PRP5=5). By ranking the row portions according to priority, it is easy to identify the higher priority row portions with the resolution reduction being performed, to the extent necessary for a given data rate on the lower priority row portions.

Row 3304 identifies four priorities (PCP1, PCP2, PCP3, PCP4), corresponding to column portions ((CP1 (left), CP2 (front), CP3 (right), CP4 (back)), respectively, which are determined. Information 3305 shows calculations used to determine values for each of the four priorities (PCP1, PCP2, PCP3, PCP4). Column portion priorities are calculated in a similar manner, as previously described with respect to row portion priorities. In the example of FIG. 33, the priority for CP1 (PCP1) is determined to be 179 based on the weighted contribution, with weighting factor 2, of 13 known users and the contribution of 153 anonymous users who were observing the first column portion CP1 during frame time T3. In the FIG. 33 example, the priority of column portion 1 (PCP1) is determined to be 179, the priority of CP2 (PCP2) is determined to be 33, the priority of CP3 (PCP3) is determined to be 21 and the priority of CP4 (PCP4) is determined to be 7.

The ranked order of row portion priorities for frame time T3 in the FIG. 33 example is PRP3 (158), PRP2 (57), PRP1 (11), PRP4 (9) and PRP5 (5). The ranked order of column portion priorities for frame time T3 in the FIG. 33 example is PCP1 (179), PCP2 (33), PCP3 (21) and PCP4 (7).

In one embodiment to support a first data rate resolution reduction is performed on one row portion and resolution reduction is not performed on any column portions. For example, to support the first data rate, one row portion is downsampled for each time frame. In such a case for frame time T3 for the example of FIG. 33, the lowest priority row portion, RP5 will be subjected to downsampling.

In one embodiment, for a second data rate, which is lower than a first data rate, resolution reduction is performed on two row portions and resolution reduction is not performed on any column portions. For example to support a second data rate, two row portions are downsampled for each frame time. In such a case for frame time T3 for the example of FIG. 33 the two lowest priority row portions RP5 and RP4 will be subjected to downsampling.

In one embodiment, to support a third data rate, which is lower than the second data rate, resolution reduction is performed on two row portions and resolution reduction is performed on one column portion. For example to support a third data rate, two row portions are downsampled and one column portion is downsampled for each frame time. In such a case for frame time T3 for the example of FIG. 33, the two lowest priority row portions RP5 and RP4 will be subjected to downsampling and the lowest priority column portion CP4 will be subjected to downsampling.

In one embodiment, to support a fourth data rate, which is lower than the third data rate, resolution reduction is performed on two row portions and resolution reduction is performed on two column portions. For example to support a fourth data rate, two row portions are downsampled and two column portions are downsampled for each frame time. In such a case for frame time T3 for the example of FIG. 33, the two lowest priority row portions RP5 and RP4 will be subjected to downsampling and two lowest priority column portions CP4 and CP3 will be subjected to downsampling.

In one embodiment, to support a fifth data rate, which is lower than the fourth data rate, resolution reduction is performed on three row portions and resolution reduction is performed on two column portions. For example in one embodiment to support a fifth data rate, three row portions and two column portions are downsampled for each frame time. In such a case for frame time T3 for the example of FIG. 33, the three lowest priority row portions RP5, RP4 and RP1 will be subjected to downsampling and the two lowest priority column portions CP4 and CP3 will be subjected to downsampling.

In one embodiment, to support a sixth data rate, which is lower than the fifth data rate, resolution reduction is performed on three row portions and resolution reduction is performed on three column portions. For example, in one embodiment to support a sixth data rate which is lower than the fifth data rate 3 row portions and 3 column portions are subjected to downsampling. In such a case for the sixth data rate frame time T3 for the example of FIG. 33, the three lowest priority row portions RP5, RP4 and RP1 will be subjected to down sampling and the three lowest priority column portions CP4, CP3 and CP2 will be subjected to down sampling.

Consider FIG. 34 which corresponds to frame time T4. Column 3402 identifies five priorities (priority row portion 1 (PRP1), priority row portion 2 (PRP2), priority row portion 3 (PRP3), priority row portion 4 (PRP4), priority row portion 5 (PRP5)), corresponding to row portions ((RP1 (sky), RP2 (upper portion), RP3 (middle portion), RP4 (lower portion), RP5 (ground)), respectively, which are determined. Information 3403 shows calculations used to determine values for each of the five priorities (PRP1, PRP2, PRP3, PRP4, PRP5). FIG. 34 shows the priority row portion 1 (PRP1) is determined by weighting the total number (2) of known users who have viewed RP1 by a weighting factor of 2 and adding the weighted number (4) to the total number (7) of anonymous users reported to be viewing RP1 during frame time T4. The other row portion priorities (PRP2, PRP3, PRP4, PRP5) are calculated in a similar manner with the priority of RP1 (PRP1) being determined to be 11, with the priority of RP2 (PRP2) being determined to be 57, with the priority of RP3 (PRP3) corresponding to the middle portion being determined to be 158, with the priority of RP4 (PRP4) being determined to be 9 and with the priority of RP5 (PRP5) being determined to be 5. As might be expected, the row portion (row portion 3 (RP3) corresponding to the middle portion), corresponding to the majority of viewers, has been determined to have the highest priority (PRP3=158), and the ground (RP5) which is being viewed by few viewers being assigned the lowest priority (PRP5=5). By ranking the row portions according to priority, it is easy to identify the higher priority row portions with the resolution reduction being performed, to the extent necessary for a given data rate on the lower priority row portions.

Row 3404 identifies four priorities (PCP1, PCP2, PCP3, PCP4), corresponding to column portions ((CP1 (left), CP2 (front), CP3 (right), CP4 (back)), respectively, which are determined. Information 3405 shows calculations used to determine values for each of the four priorities (PCP1, PCP2, PCP3, PCP4). Column portion priorities are calculated in a similar manner, as previously described with respect to row portion priorities. In the example of FIG. 34, the priority for CP1 (PCP1) is determined to be 148 based on the weighted contribution, with weighting factor 2, of 14 known users and the contribution of 120 anonymous users who were observing the first column portion CP1 during frame time T4. In the FIG. 34 example, the priority of column portion 1 (PCP1) is determined to be 148, the priority of CP2 (PCP2) is determined to be 65, the priority of CP3 (PCP3) is determined to be 20 and the priority of CP4 (PCP4) is determined to be 7.

The ranked order of row portion priorities for frame time T4 in the FIG. 34 example is PRP3 (158), PRP2 (57), PRP1 (11), PRP4 (9) and PRP5 (5). The ranked order of column portion priorities for frame time T4 in the FIG. 34 example is PCP1 (148), PCP2 (65), PCP3 (20) and PCP4 (7).

In one embodiment to support a first data rate resolution reduction is performed on one row portion and resolution reduction is not performed on any column portions. For example, to support the first data rate, one row portion is downsampled for each time frame. In such a case for frame time T4 for the example of FIG. 34, the lowest priority row portion, RP5 will be subjected to downsampling.

In one embodiment, for a second data rate, which is lower than a first data rate, resolution reduction is performed on two row portions and resolution reduction is not performed on any column portions. For example to support a second data rate, two row portions are downsampled for each frame time. In such a case for frame time T4 for the example of FIG. 34 the two lowest priority row portions RP5 and RP4 will be subjected to downsampling.

In one embodiment, to support a third data rate, which is lower than the second data rate, resolution reduction is performed on two row portions and resolution reduction is performed on one column portion. For example to support a third data rate, two row portions are downsampled and one column portion is downsampled for each frame time. In such a case for frame time T4 for the example of FIG. 34, the two lowest priority row portions RP5 and RP4 will be subjected to downsampling and the lowest priority column portion CP4 will be subjected to downsampling.

In one embodiment, to support a fourth data rate, which is lower than the third data rate, resolution reduction is performed on two row portions and resolution reduction is performed on two column portions. For example to support a fourth data rate, two row portions are downsampled and two column portion is downsampled for each frame time. In such a case for frame time T4 for the example of FIG. 34, the two lowest priority row portions RP5 and RP4 will be subjected to downsampling and two lowest priority column portions CP4 and CP3 will be subjected to downsampling.

In one embodiment, to support a fifth data rate, which is lower than the fourth data rate, resolution reduction is performed on three row portions and resolution reduction is performed on two column portions. For example in one embodiment to support a fifth data rate, three row portions and two column portions are downsampled for each frame time. In such a case for frame time T4 for the example of FIG. 34, the three lowest priority row portions RP5, RP4 and RP1 will be subjected to downsampling and the two lowest priority column portions CP4 and CP3 will be subjected to downsampling.

In one embodiment, to support a sixth data rate, which is lower than the fifth data rate, resolution reduction is performed on three row portions and resolution reduction is performed on three column portions. For example, in one embodiment to support a sixth data rate which is lower than the fifth data rate 3 row portions and 3 column portions are subjected to downsampling. In such a case for the sixth data rate frame time T4 for the example of FIG. 34, the three lowest priority row portions RP5, RP4 and RP1 will be subjected to downsampling and the three lowest priority column portions CP4, CP3 and CP2 will be subjected to downsampling.

Consider FIG. 35 which corresponds to frame time T5. Column 3502 identifies five priorities (priority row portion 1 (PRP1), priority row portion 2 (PRP2), priority row portion 3 (PRP3), priority row portion 4 (PRP4), priority row portion 5 (PRP5)), corresponding to row portions ((RP1 (sky), RP2 (upper portion), RP3 (middle portion), RP4 (lower portion), RP5 (ground)), respectively, which are determined. Information 3503 shows calculations used to determine values for each of the five priorities (PRP1, PRP2, PRP3, PRP4, PRP5). FIG. 35 shows the priority row portion 1 (PRP1) is determined by weighting the total number (2) of known users who have viewed RP1 by a weighting factor of 2 and adding the weighted number (4) to the total number (7) of anonymous users reported to be viewing RP1 during frame time T5. The other row portion priorities (PRP2, PRP3, PRP4, PRP5) are calculated in a similar manner with the priority of RP1 (PRP1) being determined to be 11, with the priority of RP2 (PRP2) being determined to be 59, with the priority of RP3 (PRP3) corresponding to the middle portion being determined to be 156, with the priority of RP4 (PRP4) being determined to be 9 and with the priority of RP5 (PRP5) being determined to be 5. As might be expected, the row portion (row portion 3 (RP3) corresponding to the middle portion), corresponding to the majority of viewers, has been determined to have the highest priority (PRP3=156), and the ground (RP5) which is being viewed by few viewers is being assigned the lowest priority (PRP5=5). By ranking the row portions according to priority, it is easy to identify the higher priority row portions with the resolution reduction being performed, to the extent necessary for a given data rate on the lower priority row portions.

Row 3504 identifies four priorities (PCP1, PCP2, PCP3, PCP4), corresponding to column portions ((CP1 (left), CP2 (front), CP3 (right), CP4 (back)), respectively, which are determined. Information 3505 shows calculations used to determine values for each of the four priorities (PCP1, PCP2, PCP3, PCP4). Column portion priorities are calculated in a similar manner, as previously described with respect to row portion priorities. In the example of FIG. 35, the priority for CP1 (PCP1) is determined to be 22 based on the weighted contribution, with weighting factor 2, of 2 known users and the contribution of 18 anonymous users who were observing the first column portion CP1 during frame time T5. In the FIG. 35 example, the priority of column portion 1 (PCP1) is determined to be 22, the priority of CP2 (PCP2) is determined to be 143, the priority of CP3 (PCP3) is determined to be 68 and the priority of CP4 (PCP4) is determined to be 7.

The ranked order of row portion priorities for frame time T5 in the FIG. 35 example is PRP3 (156), PRP2 (59), PRP1 (11), PRP4 (9) and PRP5 (5). The ranked order of column portion priorities for frame time T5 in the FIG. 35 example is PCP2 (143), PCP3 (68), PCP1 (22) and PCP4 (7).

In one embodiment to support a first data rate resolution reduction is performed on one row portion and resolution reduction is not performed on any column portions. For example, to support the first data rate, one row portion is downsampled for each time frame. In such a case for frame time T5 for the example of FIG. 35, the lowest priority row portion, RP5 will be subjected to downsampling.

In one embodiment, for a second data rate, which is lower than a first data rate, resolution reduction is performed on two row portions and resolution reduction is not performed on any column portions. For example to support a second data rate, two row portions are downsampled for each frame time. In such a case for frame time T5 for the example of FIG. 35 the two lowest priority row portions RP5 and RP4 will be subjected to down sampling.

In one embodiment, for to support a third data rate, which is lower than the second data rate, resolution reduction is performed on two row portions and resolution reduction is performed on one column portion. For example to support a third data rate, two row portions are downsampled and one column portion is downsampled for each frame time. In such a case for frame time T5 for the example of FIG. 35, the two lowest priority row portions RP5 and RP4 will be subjected to downsampling and the lowest priority column portion CP4 will be subjected to downsampling.

In one embodiment, to support a fourth data rate, which is lower than the third data rate, resolution reduction is performed on two row portions and resolution reduction is performed on two column portions. For example to support a fourth data rate, two row portions are downsampled and two column portions are downsampled for each frame time. In such a case for frame time T5 for the example of FIG. 35, the two lowest priority row portions RP5 and RP4 will be subjected to downsampling and two lowest priority column portions CP4 and CP1 will be subjected to downsampling.

In one embodiment, to support a fifth data rate, which is lower than the fourth data rate, resolution reduction is performed on three row portions and resolution reduction is performed on two column portions. For example in one embodiment to support a fifth data rate, three row portions and two column portions are downsampled for each frame time. In such a case for frame time T5 for the example of FIG. 35, the three lowest priority row portions RP5, RP4 and RP1 will be subjected to downsampling and the two lowest priority column portions CP4 and CP1 will be subjected to downsampling.

In one embodiment, to support a sixth data rate, which is lower than the fifth data rate, resolution reduction is performed on three row portions and resolution reduction is performed on three column portions. For example, in one embodiment to support a sixth data rate which is lower than the fifth data rate 3 row portions and 3 column portions are subjected to downsampling. In such a case for the sixth data rate frame time T5 for the example of FIG. 35, the three lowest priority row portions RP5, RP4 and RP1 will be subjected to downsampling and the three lowest priority column portions CP4, CP1 and CP3 will be subjected to downsampling.

Consider FIG. 36 which corresponds to frame time TX. Column 3602 identifies five priorities (priority row portion 1 (PRP1), priority row portion 2 (PRP2), priority row portion 3 (PRP3), priority row portion 4 (PRP4), priority row portion 5 (PRP5)), corresponding to row portions ((RP1 (sky), RP2 (upper portion), RP3 (middle portion), RP4 (lower portion), RP5 (ground)), respectively, which are determined. Information 3603 shows calculations used to determine values for each of the five priorities (PRP1, PRP2, PRP3, PRP4, PRP5). FIG. 36 shows the priority row portion 1 (PRP1) is determined by weighting the total number (2) of known users who have viewed RP1 by a weighting factor of 2 and adding the weighted number (4) to the total number (35) of anonymous users reported to be viewing RP1 during frame time TX. The other row portion priorities (PRP2, PRP3, PRP4, PRP5) are calculated in a similar manner with the priority of RP1 (PRP1) being determined to be 39, with the priority of RP2 (PRP2) being determined to be 182, with the priority of RP3 (PRP3) corresponding to the middle portion being determined to be 7, with the priority of RP4 (PRP4) being determined to be 7 and with the priority of RP5 (PRP5) being determined to be 5. As might be expected, the row portion (row portion 2 (RP2) corresponding to the upper portion), corresponding to the majority of viewers, has been determined to have the highest priority (PRP2=182), and the ground (RP5) which is being viewed by few viewers is being assigned the lowest priority (PRP5=5). By ranking the row portions according to priority, it is easy to identify the higher priority row portions with the resolution reduction being performed, to the extent necessary for a given data rate on the lower priority row portions.

Row 3604 identifies four priorities (PCP1, PCP2, PCP3, PCP4), corresponding to column portions ((CP1 (left), CP2 (front), CP3 (right), CP4 (back)), respectively, which are determined. Information 3605 shows calculations used to determine values for each of the four priorities (PCP1, PCP2, PCP3, PCP4). Column portion priorities are calculated in a similar manner, as previously described with respect to row portion priorities. In the example of FIG. 36, the priority for CP1 (PCP1) is determined to be 6 based on the weighted contribution, with weighting factor 2, of 0 known users and the contribution of 6 anonymous users who were observing the first column portion CP1 during frame time TX. In the FIG. 36 example, the priority of column portion 1 (PCP1) is determined to be 6, the priority of CP2 (PCP2) is determined to be 51, the priority of CP3 (PCP3) is determined to be 159 and the priority of CP4 (PCP4) is determined to be 21.

The ranked order of row portion priorities for frame time TX in the FIG. 36 example is PRP2 (182), PRP1 (39), PRP3 (7), PRP4 (7) and PRP5 (5). The ranked order of column portion priorities for frame time TX in the FIG. 36 example is PCP3 (159), PCP2 (51), PCP4 (21) and PCP1 (6).

In one embodiment to support a first data rate resolution reduction is performed on one row portion and resolution reduction is not performed on any column portions. For example, to support the first data rate, one row portion is downsampled for each time frame. In such a case for frame time TX for the example of FIG. 36, the lowest priority row portion, RP5 will be subjected to downsampling.

In one embodiment, for a second data rate, which is lower than a first data rate, resolution reduction is performed on two row portions and resolution reduction is not performed on any column portions. For example to support a second data rate, two row portions are downsampled for each frame time. In such a case for frame time TX for the example of FIG. 36 the two lowest priority row portions RP5 and RP4 will be subjected to downsampling.

In one embodiment, for to support a third data rate, which is lower than the second data rate, resolution reduction is performed on two row portions and resolution reduction is performed on one column portion. For example to support a third data rate, two row portions are downsampled and one column portion is downsampled for each frame time. In such a case for frame time TX for the example of FIG. 36, the two lowest priority row portions RP5 and RP4 will be subjected to downsampling and the lowest priority column portion CP1 will be subjected to downsampling.

In one embodiment, to support a fourth data rate, which is lower than the third data rate, resolution reduction is performed on two row portions and resolution reduction is performed on two column portions. For example to support a fourth data rate, two row portions are down sampled and two column portions are downsampled for each frame time. In such a case for frame time TX for the example of FIG. 36, the two lowest priority row portions RP5 and RP4 will be subjected to downsampling and two lowest priority column portions CP1 and CP4 will be subjected to downsampling.

In one embodiment, to support a fifth data rate, which is lower than the fourth data rate, resolution reduction is performed on three row portions and resolution reduction is performed on two column portions. For example in one embodiment to support a fifth data rate, three row portions and two column portions are downsampled for each frame time. In such a case for frame time TX for the example of FIG. 36, the three lowest priority row portions RP5, RP4 and RP3 will be subjected to downsampling and the two lowest priority column portions CP1 and CP4 will be subjected to downsampling.

In one embodiment, to support a sixth data rate, which is lower than the fifth data rate, resolution reduction is performed on three row portions and resolution reduction is performed on three column portions. For example, in one embodiment to support a sixth data rate which is lower than the fifth data rate 3 row portions and 3 column portions are subjected to downsampling. In such a case for the sixth data rate frame time TX for the example of FIG. 36, the three lowest priority row portions RP5, RP4 and RP3 will be subjected to down sampling and the three lowest priority column portions CP1, CP4 and CP2 will be subjected to downsampling.

The resource allocation based on the priorities shown in FIGS. 31-36, for the exemplary fifth data rate will now be described. For fifth data rate resolution reduction is performed on three row portions and resolution reduction is performed on two column portions of a frame which may be used as a texture to map onto one or more surfaces during playback based on a texture map corresponding to the resolution allocation being used.

Figure 37:
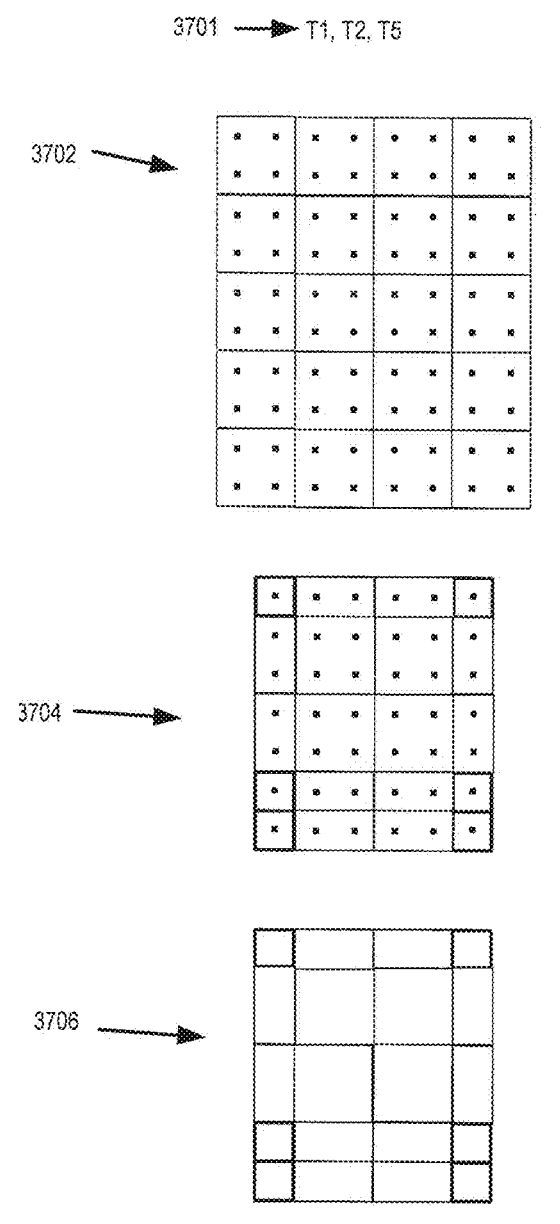

In FIG. 37, reference number 3701 is used to indicate the frame times to which the resolution allocation shown in FIG. 37 will be used, e.g., based on the priority determinations shown in FIGS. 31, 32 and 35 corresponding to frame times T1, T2, and T5 respectively. The input frame 3702 includes rows and columns of pixels with pixels being represented by dots. Reference number 3704 represents a frame resulting from application of downsampling to frame 3702 in accordance with the resolution allocation selected for the fifth data rate given the priorities determined for frame times T1, T2, T5. The resolution allocation shown in FIG. 37, referred to as a first resolution allocation, results in the first and last column portions being downsampled and the first, fourth and fifth row portions being downsampled. Note that the frame 3704 to be transmitted will include fewer pixels than the input frame 3702. The texture map 3706 shows how the pixels of frame 3704 should be divided for use as textures with each segment of the texture map 3706 corresponding to a known segment of a surface of an environment onto which the corresponding portion of the transmitted frame is to be applied as a texture. Thus, texture map 3706 provides the information for determining how to apply the pixel values of the transmitted frame 3704 to the simulated environment during playback.

The first resolution allocation shown in FIG. 37 will be used for frame times T1, T2, T5 preserving the quality of the front and right upper and middle portions of the environment while representing other portions of the environment at lower resolution.

Figure 38:
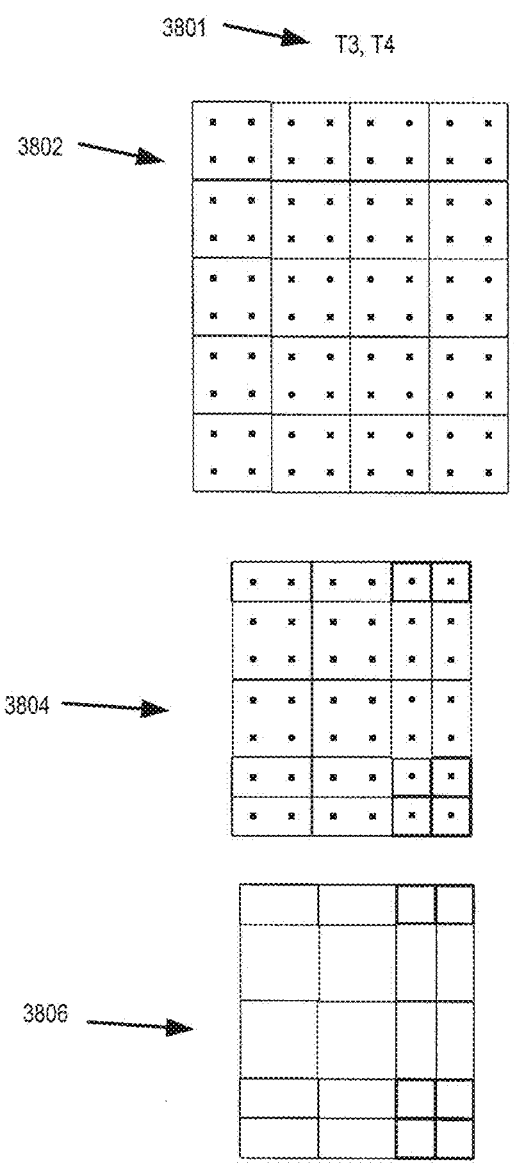
FIG. 38 illustrates another exemplary resolution allocation, e.g., a second resolution allocation, used in some embodiments which results in downsampling of certain portions of an image frame.

In FIG. 38, reference number 3801 is used to indicate the frame times to which the resolution allocation shown in FIG. 38 will be used, e.g., based on the priority determinations shown in FIGS. 33 and 34 corresponding to frame times T3 and T4 respectively. During these frame times input frame 3802 includes rows and columns of pixels with pixels being represented by dots. Reference number 3804 represents a frame resulting from application of downsampling to input frame 3802 in accordance with the resolution allocation selected for the fifth data rate given the priorities determined for frame times T3, T4. The resolution allocation shown in FIG. 38, referred to as a second resolution allocation, results in the last two column portions, e.g., the right and back column portions, being downsampled and the first, fourth and fifth row portions being downsampled. Note that the frame 3804 to be transmitted to the playback device will include fewer pixels than the input frame 3802, and frame 3804 will have the same number of pixels and be of the same shape as the frame 3704 resulting from the first resolution allocation. The texture map 3806 shows how the pixels of frame 3804 should be divided for use as textures with each segment of the texture map 3806 corresponding to a known segment of a surface of an environment onto which the corresponding portion of the transmitted frame is to be applied as a texture. Thus, texture map 3806 provides the information for determining how to apply the pixel values of the transmitted frame 3704 to the simulated environment during playback.

The second resolution allocation shown in FIG. 38 will be used for frame times T3 and T4 preserving the quality of the left and front upper and middle portions of the environment while representing other portions of the environment at lower resolution. Note that while the second resolution allocation for the fifth data rate is different from the first resolution allocation for the fifth data rate shown in FIG. 37, the size and shape of the image, e.g., frame, encoded and transmitted for time periods T3 and T4 will be the same as for time periods T1, T2 and T5 allowing of the fifth data rate to be supported even though different resolution allocations are selected and used for different frames.

Figure 39:
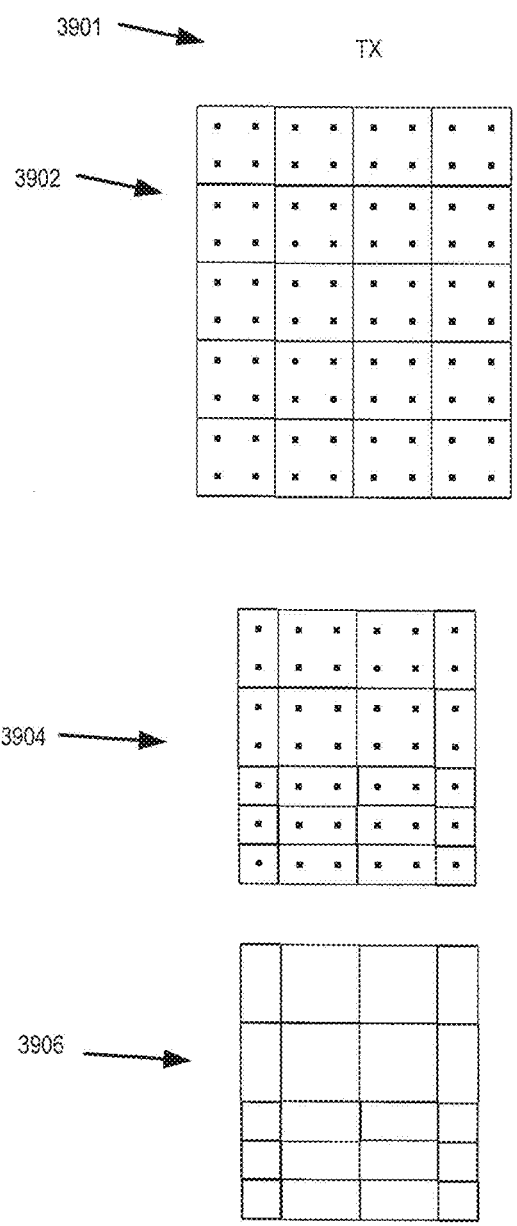
FIG. 39 illustrates yet another exemplary resolution allocation, e.g., a third resolution allocation, used in some embodiments which results in downsampling of certain portions of an image frame.

In FIG. 39, reference number 3901 is used to indicate the frame time to which the resolution allocation shown in FIG. 39 will be used. In the example, based on the priority determination shown in FIG. 36, the third resolution allocation shown in FIG. 39 will be used for frame time TX. During frame time TX input frame 3902 includes rows and columns of pixels with pixels being represented by dots. Reference number 3904 represents a frame resulting from application of downsampling to input frame 3902 in accordance with the resolution allocation selected for the fifth data rate given the priorities determined for frame time TX. The resolution allocation shown in FIG. 39, referred to as a third resolution allocation, results in the first and last column portions, e.g., the left and back column portions, being downsampled and the third, fourth and fifth row portions, e.g., the middle, lower, and ground row portions, being downsampled. Note that the frame 3904 to be transmitted to the playback device will include fewer pixels than the input frame 3902, and frame 3904 will have the same number of pixels and be of the same shape as the frame 3704 and 3804 resulting from the first and second resolution allocations for the fifth data rate. The texture map 3906 shows how the pixels of frame 3904 should be divided for use as textures with each segment of the texture map 3906 corresponding to a known segment of a surface of an environment onto which the corresponding portion of the transmitted frame is to be applied as a texture. Thus, texture map 3906 provides the information for determining how to apply the pixel values of the transmitted frame 3904 to the simulated environment during playback.

While three different resolutions have been shown for the fifth data rate, it should be appreciated that the number of different resolution allocations that can be supported can be relatively large, e.g., in the tens or hundreds. Since the texture maps can be sent and stored in a playback device the need to send texture maps multiple times can an is avoided in some embodiments with the texture map to be used with a given set of frames being indicated in the encoded content stream but without the texture map needing to be retransmitted before each use.

It should be appreciated that while the resolution allocations and use of the resolution allocations for a fifth data rate have been described, similar processing is applied for each of a plurality of data rates. Thus for each data rate the resolution allocations are selected, the downsampling is applied and the frames are encoded to be used as textures with the texture map to be used for various frames being stored with the encoded image data and transmitted therewith to one or more playback devices, e.g., in response to content requests.

By receiving environmental portion viewing information, e.g., on a per frame bases, prioritizing portions of the environment on a per frame basis, performing resolution allocations on a per frame or per group of frames basis, applying the resolution allocations and associated downsampling and then encoding the downsampled image data, content corresponding to an event can be efficiently encoded for a variety of data rates with the resolution of the high priority portions of the environment being preserved to the extent possible for a given data rate.

As should be appreciated the above described methods are particularly well suited where an event is initially streamed live or in near real time and viewing information can be collected for purposes of optimizing re-encoding for later transmission. One particular case where this is very useful is where an event is transmitted live in the United States and then re-encoded for later transmission, e.g., at one or more lower data rates, to another country such as China with lower bandwidth capabilities.

Figure 40A:
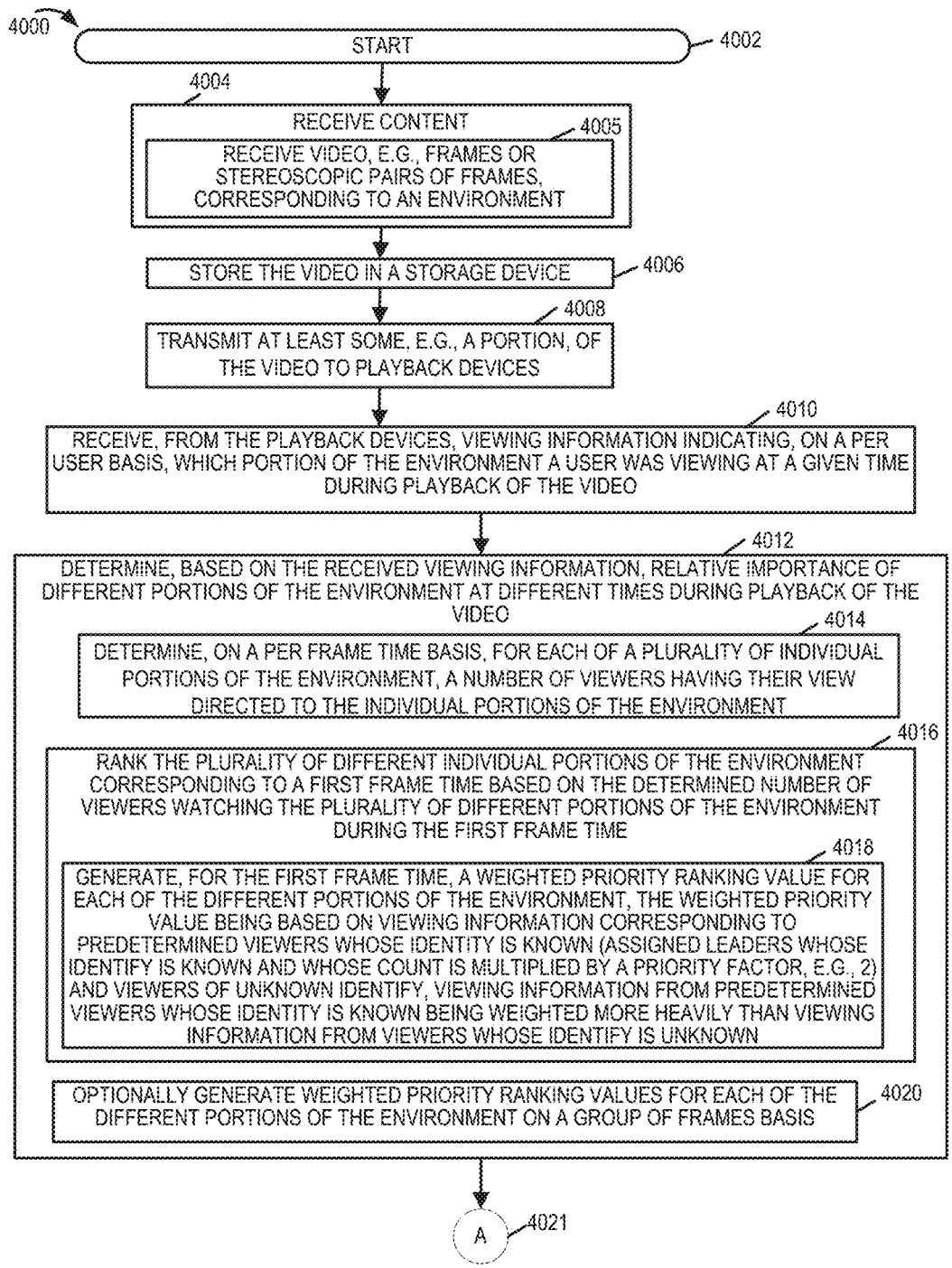
FIG. 40A illustrates a first part of an exemplary method of processing and/or delivering content, e.g., image content, in accordance with an exemplary embodiment.

FIG. 40 which comprises FIGS. 40A through 40G illustrates an exemplary method 4000 of operating a content processing and delivery system, such as the image processing content delivery system 4106 shown in FIG. 41, in accordance with an exemplary embodiment. FIG. 40A shows the first part of method 4000 with the method continuing through FIGS. 40B, 40C, 40D, 40E, 40F and 40G. The exemplary method 4000 shown in FIG. 40 starts in step 4002 with the content processing and delivery system 4106 being initialized to process and deliver content, e.g., image content and/or information used to render images. In some embodiments the method of flowchart 4000 is performed using the content delivery system 4106 shown in FIG. 41. In other embodiments the processing system 700 of FIG. 7 is used.

From start step 4002 operation proceeds to step 4004. In step 4004 image content, e.g., video content, is received by the processing system, e.g., content delivery system 4106 shown in FIG. 41. The image content received in step 4004 may be from an image capturing device such as the ones discussed in this application, e.g., such as the one shown in FIG. 13. The images from multiple left and right cameras may be combined so that a single frame includes a full 360 degree view of the environment or alternatively the input may correspond to a smaller portion of the environment. In some embodiments the step 4004 of receiving content includes step 4006 where frames or stereoscopic pairs of frames of images corresponding to an environment, e.g., environment of interest where images are captured, are received. Operation proceeds from step 4004 to step 4006 where the received content is stored in a storage device such as storage device 4120. The storage device 4120 may be implemented as system memory or an external storage device. Operation proceeds from step 4006 to step 4008 where at least some, e.g., a portion, of the video content is transmitted to one or more playback devices. The transmitted video content may be content which was subjected to real time or other encoding prior to transmission. The video content may be subjected to encoding and/or other processing prior to being transmitted, e.g., it may be and sometimes is encoded by real time encoder 4210 prior to transmission.

Operation proceeds from step 4008 to step 4010. In step 4010 the processing system receives, from one or more playback devices, e.g., playback devices 4108, 4110 viewing information indicating on a per user basis, which portion of the environment a user was viewing at a given time during playback of the video, e.g., the real time content transmitted to playback devices 4108, 4110. Operation proceeds from step 4010 to step 4012. In step 4012 based on the viewing feedback, e.g., received viewing information from devices 4108, 4110 and others; the relative importance of different portions of the environment at different times during playback of the video is determined. In some embodiments determining relative importance of different portions of the environment includes performing one or more of steps 4014,

4016, 4018 and 4020. In step 4014 based on the received viewing information for each of a plurality of individual portions of the environment and on a per frame basis a number of viewers having their view directed to the individual portions of the environment is determined, e.g., the system determines, for each of the portions of the environment in a given image frame, how many users are viewing a given portion of the environment. For example a 360 degree scene environment may be divided into left, front, right and back portions horizontally and sky, upper, middle, lower and ground portions vertically as illustrated and discussed with regard to FIG. 30. The system in some embodiments determines the relative importance of different portions of the environment at least partially based on how many users are viewing different portions corresponding to a frame time. the priority of the portion may be determined based on simply the number of users or as a weighted average where some users, e.g., known users, are weighted more heavily than anonymous users. In step 4016 the plurality of different individual portions of the environment corresponding to a first frame time are ranked based on the determined number of viewers watching the plurality of different portions of the environment during the first frame time. The ranking in one exemplary embodiment of different portions has been discussed in detail with regard to FIGS. 30-35 and accordingly the discussion will not be repeated. In some embodiments step 4018 is performed as part of implementing step 4016 of ranking the different portions. In step 4018 a weighted priority ranking value for each of the different portions of the environment is generated for the first frame time, the weighted priority value being based on viewing information corresponding to predetermined viewers whose identity is known and viewers of unknown identify. In some embodiment the viewing information from predetermined viewers whose identity is known is weighted more heavily than viewing information from viewers whose identify is unknown. For example the count of assigned leaders whose identify is known is multiplied by a priority factor, e.g., 2, to weigh them more heavily than other unknown viewers. The prioritization and ranking may be and in some embodiments is performed by prioritizer 4204 which supplies the priority and/or ranking information 4102 to the resolution allocation selectors 4220, 4230 of the various video processing chains 4206, 4208.

In step 4020, which is optional and performed in some but not all embodiments, weighted priority ranking values for each of the different portions of the environment is generated on a group of frames basis. In such a case the priority of individual portions of the environment is averaged for multiple frames of the group of frames to determine the priority of the environmental portion to be used for the frame times in the group of frames. The group of frames may be the frames from one key frame to the last frame before the next key frame in some embodiments with the key frame pattern being known from the encoding being used for a given data rate.

Operation proceeds from step 4012 to step 4022 via connecting node A 4021. In some embodiments operation also proceeds to steps 4024 through 4026, via connecting nodes B through Z, which may be performed in parallel with step 4022 or sequentially after step 4022 but independently. The various processing paths correspond to resource resolution allocations and encoding for different supported data rates.

Connecting nodes 4022, 4024, ... , 4026 correspond to different data rates and thus different resolution allocation pattern selections.

Figure 40B:
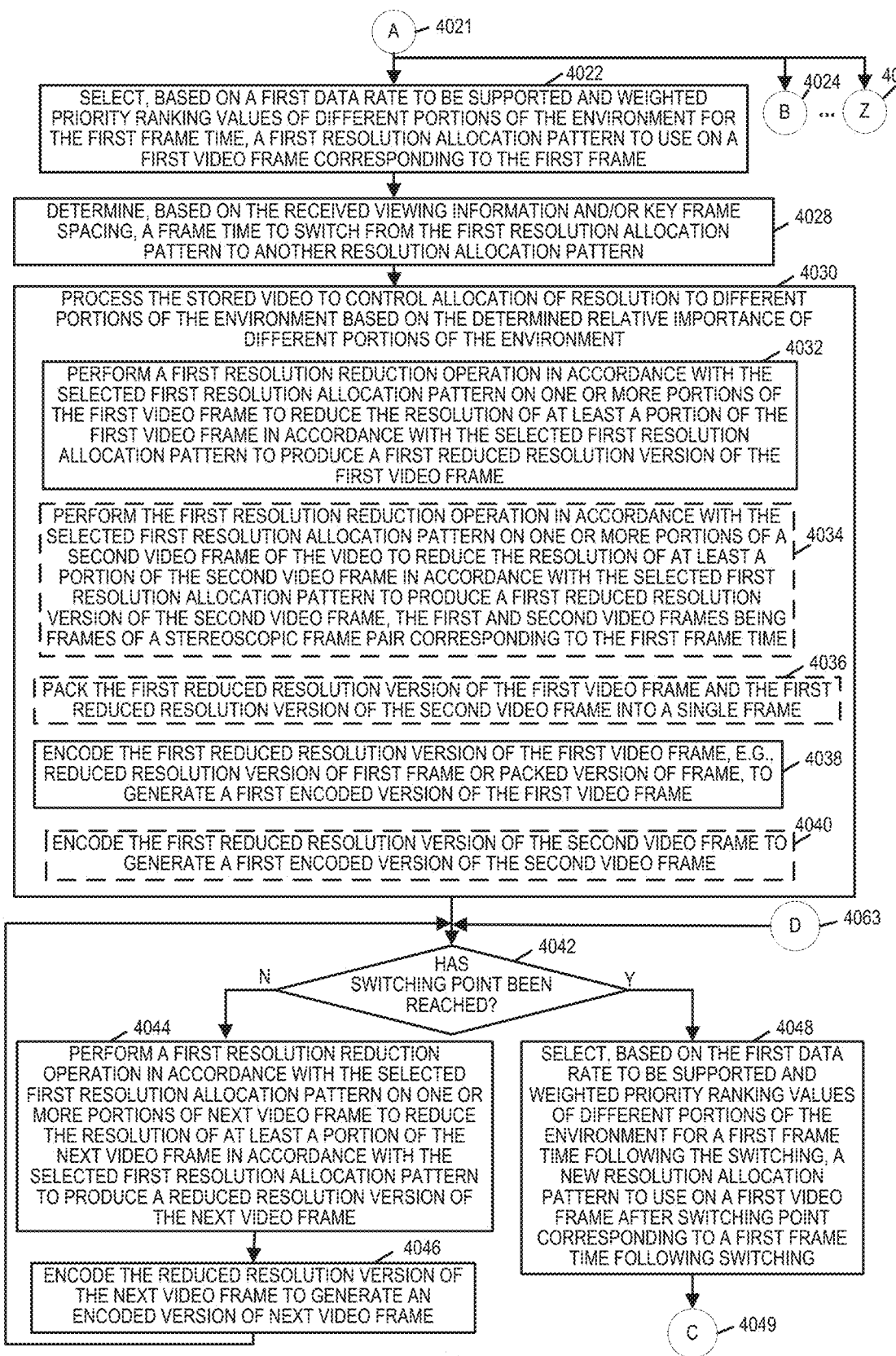
FIG. 40B illustrates a second part of the exemplary method of processing and/or delivering content, in accordance with an exemplary embodiment.
Figure 40C:
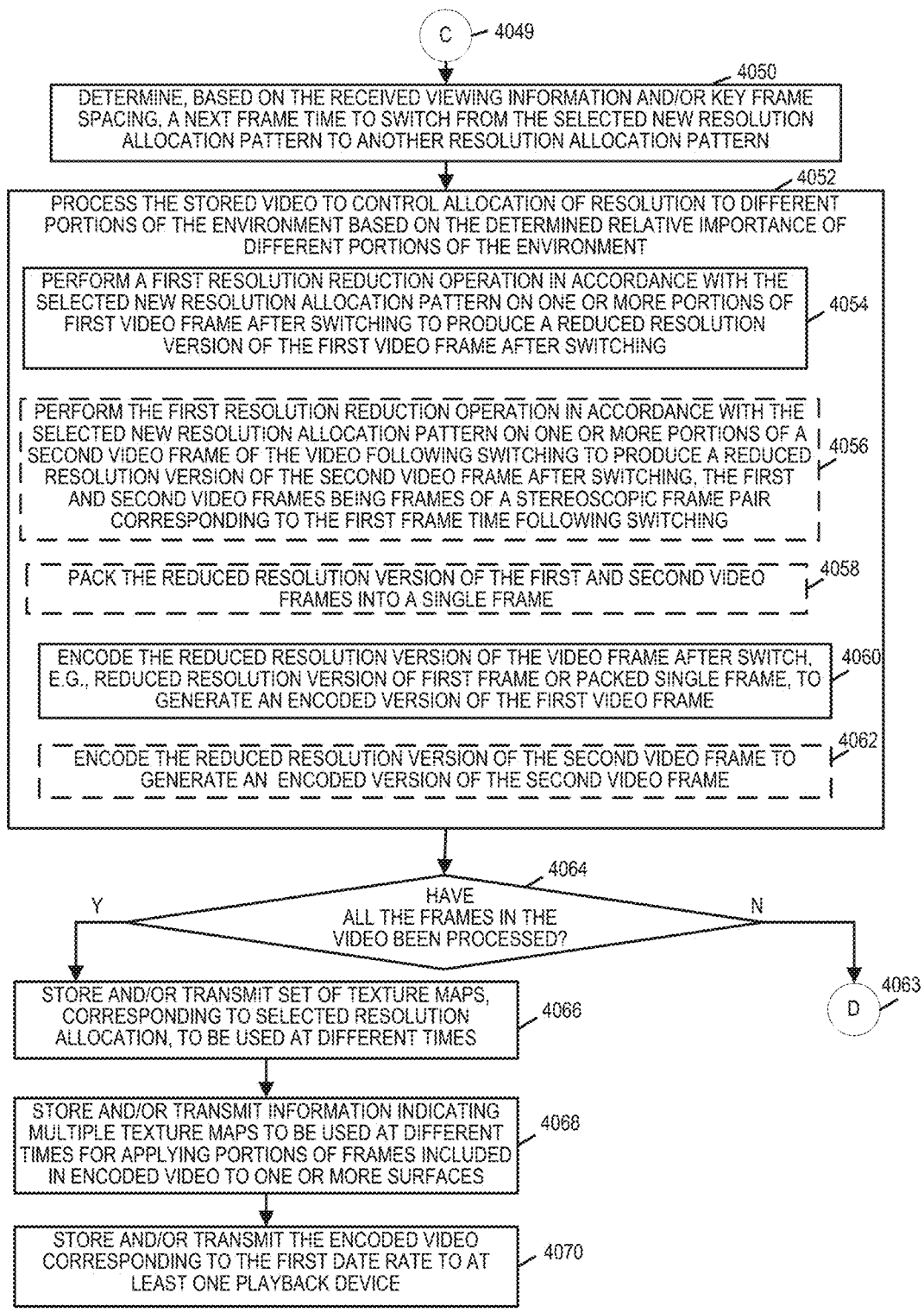
FIG. 40C illustrates a third part of the exemplary method of processing and/or delivering content, in accordance with an exemplary embodiment.

The general processing for a given data rate will be explained with reference to the steps of FIG. 40B with the processing for other data rates being the same or similar.

The steps along the path shown in FIG. 40B will now be discussed. In step 4022 a first resolution allocation pattern to use on a first video image, e.g., input frame, corresponding to a first frame is selected based on a first data rate to be supported and the priority ranking of different portions of the environment for the first frame time. For example, a resolution allocation which down samples a predetermined number of row portions and/or column portions is selected with the downsampling to be applied as needed to the lowest priority row and/or column portions of the input image for frame time T1. The resolution is from a plurality of possible resolution allocations corresponding to the first data rate, e.g., each involving downsampling of the predetermined number of row and column portions of the input image so that regardless of the selected one of the resolution allocations an image having the same number of row and column portions for the first data rate will result from the application of the resolution allocation pattern to the input image.

Operation proceeds from step 4022 to step 4028 where a frame time to switch from the first resolution allocation pattern to another resolution allocation pattern is determined based on the received viewing information and/or key frame spacing information. Thus the system determines a frame time at which a resolution allocation pattern different from a currently selected resolution allocation pattern should be applied, e.g., because the viewing information indicates a change in environmental portion priorities.

The system selects the frame time at which to switch, in some embodiments, in order to change resolution allocation pattern at key frame boundaries rather than changing the allocation pattern simply based on change in viewing information.

Operation proceeds from step 4028 to step 4030. In step 4030 the stored video is processed, e.g., by the resolution reduction device 4232 which may be a down sampler, to control allocation of resolution to different portions of the environment based on the determined relative importance of different portions of the environment at different times, with the processed image then being subject to possible packing by packer 4224 and encoding by encoder 4226. In some embodiments one or more of the steps 4032, 4034, 4036, 4038 and 4040 are performed as part of implementing step 4030. In step 4032 a first resolution reduction operation, e.g., downsampling, is performed on the first video frame in accordance with the selected first resolution allocation pattern on one or more portions of the first video frame to reduce the resolution of at least a portion of the first video frame in accordance with the selected first resolution allocation pattern to produce a first reduced resolution version of the first video frame. Step 4034 is performed in some embodiments where first video frame is a left frame of a stereoscopic frame pair corresponding to the first frame time which also includes a second video frame of the video. In step 4034 the first resolution reduction operation is performed in accordance with the selected first resolution allocation pattern on one or more portions of the second video frame of the video to reduce the resolution of at least a portion of the second video frame in accordance with the selected first resolution allocation pattern to produce a first reduced resolution version of the second video frame. In step 4036, which is optional, the first reduced resolution version of the first video frame and the first reduced resolution version of the second video frame is packed into a single frame prior to encoding the reduced resolution versions of the first and second video frames. In some other embodiments step 4036 is skipped and the reduced resolution versions of the first and second video frames are not packed. In step 4038 the first reduced resolution version of the first video frame is encoded to generate a first encoded version of the first video frame, e.g., encoded reduced resolution first video frame. In embodiments where step 4036 is implemented and the first and second video frames are packed into a single frame, step 4038 includes encoding the single, e.g., packed, version of the frame to generate a first encoded version of the packed single frame first stereoscopic frame including the first video frame. Step 4040 is performed in embodiments where the first and second video frames are part of a stereoscopic frame pair corresponding to the first frame time and where the first and second video frames are to be encoded individually. In step 4040 the first reduced resolution version of the second video frame is encoded to generate a first encoded version of the second video frame. Thus in processing step 4030 a frame in a non-steroscopic embodiment can be downsampled in accordance with a selected resolution allocation and then encoded or an image pair of a stereoscopic frame pair can be downsampled, optionally packed together, and encoded.

Operation proceeds from step 4030 to step 4042. In step 4042 the system checks if the switching point, e.g., in terms of frame time, has been reached for a different resolution allocation pattern to be applied. If it is determined that a switching point has not been reached the operation proceeds from step 4042 to step 4044 and the system decides to continue to use the same selected resolution allocation pattern. Processing performed in step 4044 is the same or similar to that performed in step 4032 and with the processing in step 4044 applying to the next video frame rather than to the first video frame. Thus in step 4044 a first resolution reduction operation is performed on the next video frame in accordance with the first resolution allocation pattern on one or more portions of the next video frame, e.g., next subsequent video frame after the first video frame, to reduce the resolution of at least a portion of the next video frame in accordance with the first resolution allocation pattern to produce a reduced resolution version of the next video frame. Operation proceeds from step 4044 to step 4046 where the reduced resolution version of the next video frame is encoded to generate an encoded version of the reduced resolution next video frame or frames in the case of stereoscopic frame pairs corresponding to a frame time. While not shown in the figure, one or more steps which are the same or similar to steps 4034, 4036 and 4040 may be performed to process, e.g., perform resolution reduction operation, pack and encode, the next frames in some embodiments, e.g., where the next video frame is part of a subsequent stereoscopic video frame including a left and right video frames. As indicated by the loop back the operation proceeds from step 4046 back to determination step 4042 to check again if the next switching point has been achieved and proceeds from thereon in accordance with the result of the determination and with additional frames, if remaining, being processed.

If in step 4042 it is determined that the switching point has been the operation proceeds from step 4042 to step 4048. In step 4048 the system selects a new resolution allocation pattern, to use on a first video frame following reaching of the switching point (e.g., a first frame after the last frame of the previous frame time at which switching occurred) corresponding to a first frame time following switching, based on the first data rate to be supported and priority ranking of different portions of the environment for the first frame time after switching. Operation proceeds from step 4048 to step 4050 via connecting node C 4049. Having selected a new resolution allocation pattern to be used on the next frames or group of frames, the system in step 4050 determines a frame time to switch from the currently selected resolution allocation pattern to another resolution allocation pattern based on the received viewing information and/or key frame spacing information.

Operation proceeds from step 4050 to step 4052. In step 4052 the stored video frames are processed, e.g., by the video processor, to control allocation of resolution to different portions of the environment based on the determined relative importance of different portions of the environment at different times. As was the case with step 4030, step 4052 may also include one or more steps which may be performed as part of implementing step 4052. Thus in some embodiments step 4052 includes one or more of steps 4054, 4056, 4058, 4060 and 4062. In step 4054 a first resolution reduction operation is performed on one or more portions of the first video frame after switching in accordance with the selected new resolution allocation pattern to reduce the resolution of at least a portion of the first video frame after switching to produce a reduced resolution version of the first video frame after switching. Step 4056 is performed in some embodiments where first video frame after switching is a frame of a stereoscopic frame pair, corresponding to the first frame time after switching, which also includes a second video frame of the video. In step 4056 the first resolution reduction operation is performed in accordance with the selected new resolution allocation pattern on one or more portions of the second video frame of the video after switching to reduce the resolution of at least a portion of the second video frame after switching in accordance with the selected new resolution allocation pattern to produce a reduced resolution version of the second video frame. In step 4058, which is optional, the first reduced resolution version of the first video frame after switching and the first reduced resolution version of the second video frame after switching is packed into a single frame, e.g., prior to encoding. In step 4060 the reduced resolution version of the first video frame after switching is encoded. In embodiments where step 4058 is implemented and the first and second video frames after switching are packed into a single frame, step 4060 includes encoding the single, e.g., packed, version of the frames to generate a first encoded version of the packed single frame. Step 4062 is performed in embodiments where the first and second video frames are part of a stereoscopic frame pair corresponding to the first frame time after switching to the new reduced resolution allocation pattern and where the first and second video frames are to be encoded individually. In step 4062 the reduced resolution version of the second video frame is encoded to generate an encoded version of the second video frame.

Operation proceeds from step 4052 to step 4064 wherein it is determined if all the frames in the stored video have been processed. If it is determined in step 4064 that additional frames remain to be processed the operation proceeds to step 4042 via connecting node D 4063 and the system repeats the processing, for the remaining additional frames, as discussed with regard to steps 4042, 4032', 4038' and/or steps 4048, 4050 and 4052. If in step 4064 it is determined that all the frames have been processed, the operation proceeds from step 4064 to step 4066. In step 4066 the system stores and/or transmits set of texture maps corresponding to selected resolution allocation(s) to be used at different. Operation proceeds from step 4066 to step 4068 where the system stores and/or transmits information indicating multiple texture maps to be used at different times for applying portions of frames included in encoded video to one or more surfaces, e.g., surfaces of 3D environmental model. Operation proceeds from step 4068 to step 4070. In step 4070 the system stores and/or transmits the encoded video corresponding to the first data rate to at least one playback device.

Figure 40D:
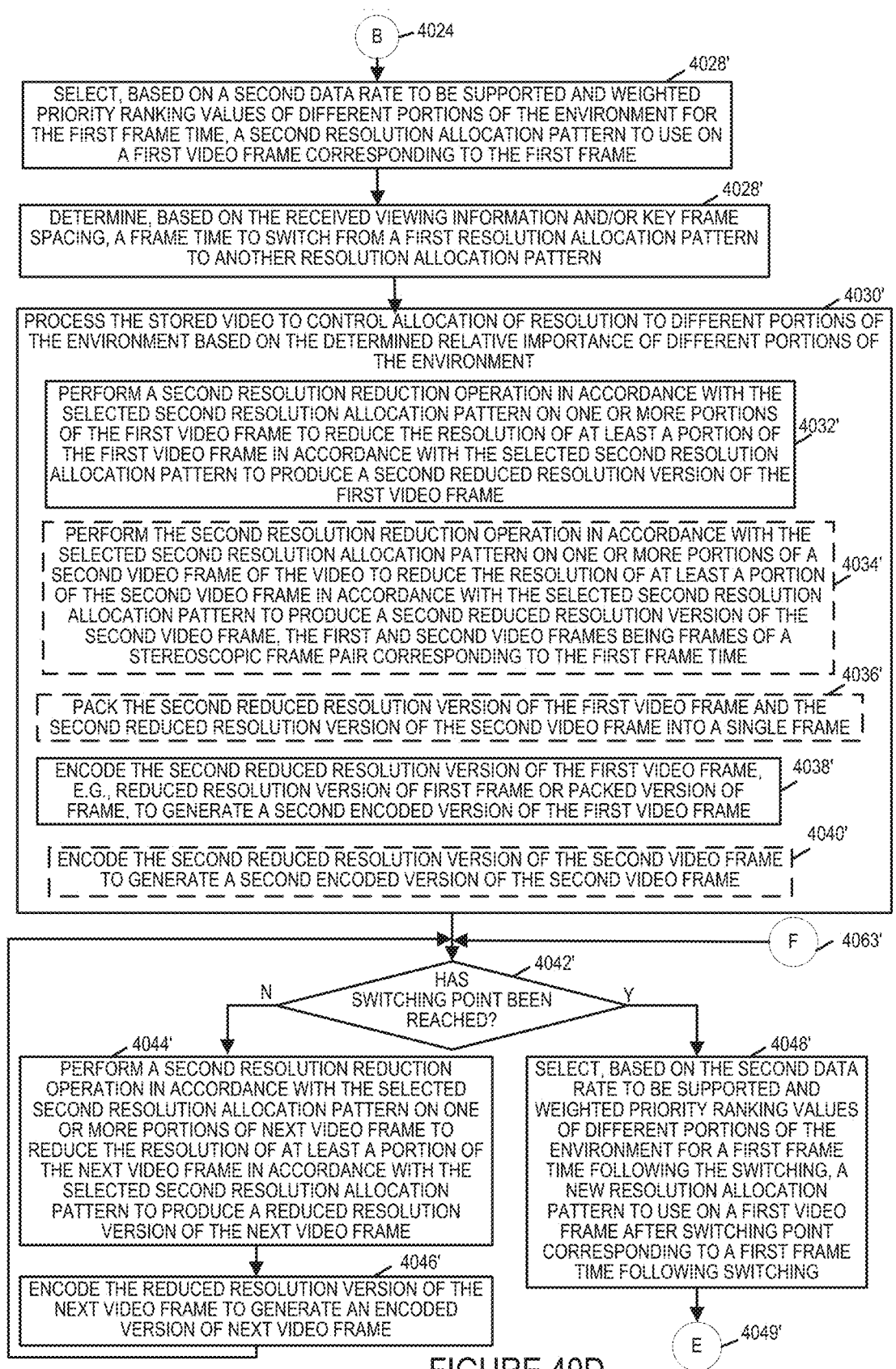
FIG. 40D illustrates a fourth part of the exemplary method of processing and/or delivering content, in accordance with an exemplary embodiment.
Figure 40E:
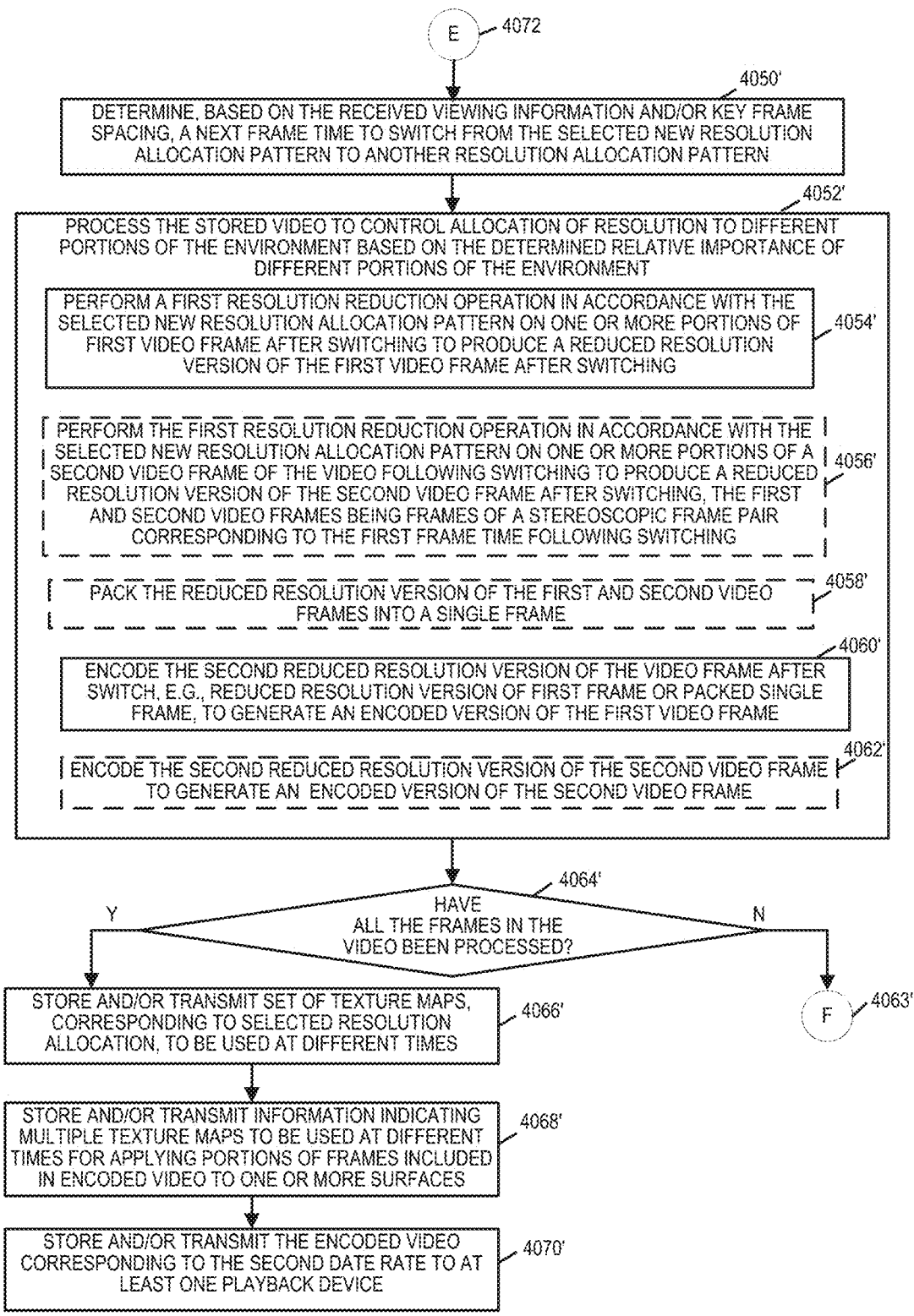
FIG. 40E illustrates a fifth part of the exemplary method of processing and/or delivering content, in accordance with an exemplary embodiment.
Figure 40F:
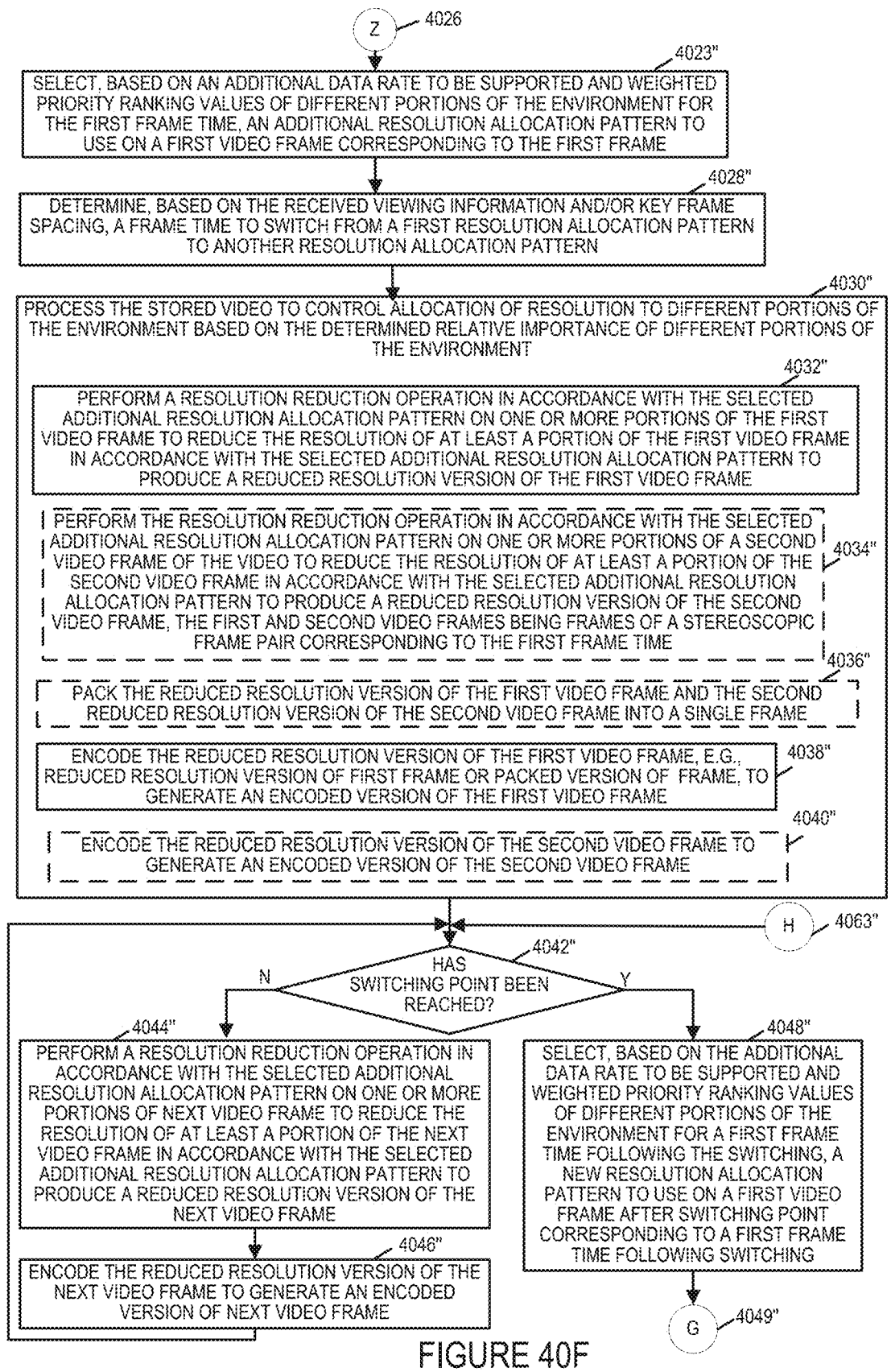
FIG. 40F illustrates a sixth part of the exemplary method of processing and/or delivering content, in accordance with an exemplary embodiment.
Figure 40G:
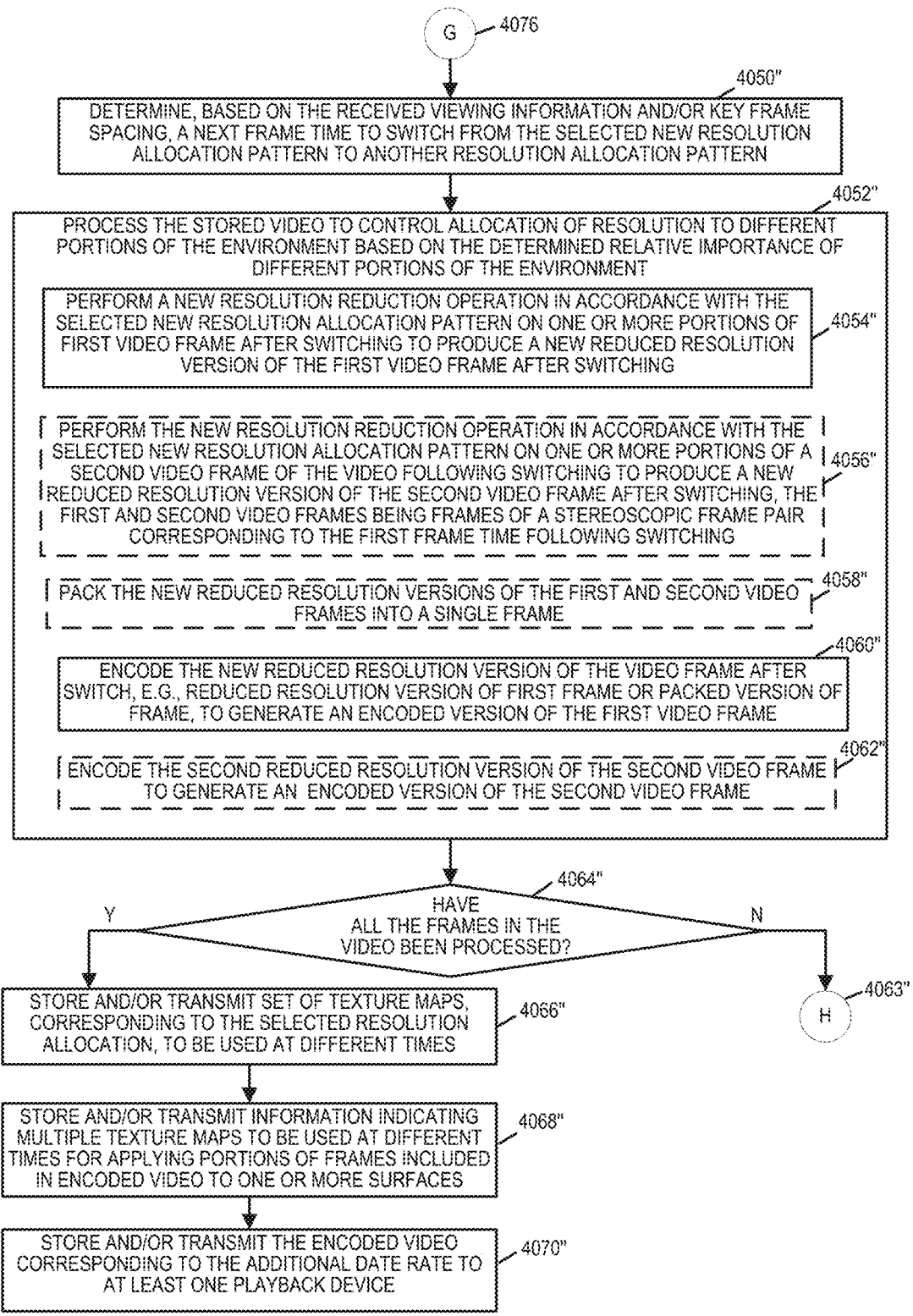
FIG. 40G illustrates a seventh part of the exemplary method of processing and/or delivering content, in accordance with an exemplary embodiment.

Referring now to the steps of the method shown in FIG. 40D which correspond to the processing path followed via connecting node B 4024. Steps shown in FIGS. 40D through 40G which are identified using the same number as the steps of FIGS. 40B and 40C but with a prime (') or double prime (") include performing the same or similar processing as discussed above with regard to the steps of 40B and 40C but with the processing being performed for data rates different than the first data rate. Since such processing can be understood based on the description of the figures which have already been described they will not be discussed further. Numerous variations are possible on the above described methods and apparatus. An exemplary method in accordance with some embodiments comprises: receiving video corresponding to an environment; storing the video in a storage device; transmitting at least some of the video to playback devices; receiving, from the playback devices, viewing information indicating, on a per user basis, which portion of the environment a user was viewing at a given time during playback of the video; determining, based on the received viewing information, relative importance of different portions of the environment at different times during playback of the video; processing the stored video to control allocation of resolution to different portions of said environment based on the determined relative importance of different portions of the environment at different times, said processing producing encoded video; and storing the encoded video or transmitting the encoded video to at least one playback device.

In some embodiments the method further comprises: performing at least one of i) storing texture map information indicating multiple texture maps to be used at different times for applying portions of frames included in said encoded video to one or more surfaces or ii) transmitting said texture map information indicating multiple texture maps to be used at different times for applying portions of frames included in said encoded video to said one or more surfaces. In some embodiments the texture map information identifies for different frame times different texture maps, a texture map identified for use for an individual frame time corresponding to a resolution allocation selected for use in producing one or more encoded frames included in the encoded video corresponding to the individual frame time.

In some embodiments determining, based on the received viewing information, relative importance of different portions of the environment at different times during playback of the video includes: determining, on a per frame time basis, for each of a plurality of different individual portions of the environment, a number of viewers having their view directed to the individual portion of the environment. In some embodiments determining, based on the received viewing information, relative importance of different portions of the environment at different times during the video further includes: ranking the plurality of different individual portions of the environment corresponding to a first frame time based on the determined number of viewers watching the plurality of different portions of the environment during the first frame time.

In some embodiments ranking the different portions of the environment based on the determined numbers of viewers, includes generating, for the first frame time, a weighted priority ranking value for each of the different portions of the environment, said weighted priority value being based on viewing information corresponding to predetermined viewers whose identity is known and viewers of unknown identify, viewing information from predetermined viewers whose identity is known being weighted more heavily than viewing information from viewers whose identify is unknown.

In some embodiments the method further comprises: selecting, based on a first data rate to be supported and weighted priority ranking values of different portions of the environment for the first frame time, a first resolution allocation pattern to use on a first video frame corresponding to the first frame. In some embodiments processing the stored video includes performing a first resolution reduction operation on the first video frame in accordance with the selected first resolution allocation pattern on one or more portions of the first video frame to reduce the resolution of at least a portion of said first video frame in accordance with the selected first resolution allocation pattern to produce a first reduced resolution version of said first video frame; and encoding the first reduced resolution version of the first video frame to generate a first encoded version of said first video frame.

In some embodiments the first video frame is a left frame of a stereoscopic frame pair, and processing the stored video includes: performing the first resolution reduction operation in accordance with the selected first resolution allocation pattern on one or more portions of a second video frame of said video to reduce the resolution of at least a portion of said second video frame in accordance with the selected first resolution allocation pattern to produce a first reduced resolution version of the second video frame, said first and second video frames being frames of a stereoscopic frame pair corresponding to the first frame time; and encoding the first reduced resolution version of the second video frame.

In some embodiments the method further comprises: prior to encoding the first reduced resolution version of the first video frame and the first reduced resolution version of the second video frame, packing the first reduced resolution version of the first video frame and the first reduced resolution version of the second video frame into a single frame.

In some embodiments the method further comprises: selecting, based on a second data rate to be supported and weighted priority ranking values of different portions of the environment for the first frame time, a second resolution allocation pattern to use on the first video frame corresponding to the first frame time. In some embodiments processing the stored video further includes: performing a second resolution reduction operation on the first video frame in accordance with the selected second resolution allocation pattern on one or more portions of the first video frame of said video to reduce the resolution of at least a portion of said first video frame in accordance with the second selected resolution allocation pattern to produce a second reduced resolution version of said first video frame; and encoding the second reduced resolution version of the first video frame to generate a second encoded version of said first video frame.

In some embodiments the first video frame is a left frame of a stereoscopic frame pair; and processing the stored video includes: performing the second resolution reduction operation in accordance with the selected second resolution allocation pattern on one or more portions of the second video frame of said video to reduce the resolution of at least a portion of said second video frame in accordance with the selected second resolution allocation pattern to produce a second reduced resolution version of the second video frame; and encoding the second reduced resolution version of the second video frame.

In some embodiments the method further comprises: determining, based on the received viewing information, a frame time to switch from a first resolution allocation pattern to another resolution allocation pattern. In some embodiments determining the frame time to switch from said first resolution allocation pattern to another resolution allocation pattern is based on a change in the determined relative importance of different portions of the environment from one time period to another time period. In some embodiments the frame time to switch from said first resolution allocation pattern to another resolution allocation pattern corresponds to a key frame, with said another resolution allocation pattern to be used with said key frame. In some embodiments the key frame is an Intra-coded frame.

Another exemplary apparatus for playing back content will now be described. The apparatus includes a receiver for receiving signals, a mesh model of an environment, one or more image maps, e.g., UV map(s), indicating a mapping between an image and the mesh model of an environment, and one or more encoded images. In some embodiments, the receiver of the apparatus is configured to receive a mesh model of an environment, a first image map, a second image map, and an encoded image. The apparatus also includes or is coupled to a storage device such as a memory for storing received signals, mesh models, image maps, and images such as encoded, decoded and produced images. The apparatus further includes a decoder for decoding received encoded images and a processor configured to map a decoded image to a mesh model of an environment in accordance with a first image map to produce a first rendered image. The first image map mapping different numbers of pixels of the decoded image to different segments of said mesh model of the environment. In some embodiments, the apparatus is configured so that the different numbers of pixels are mapped to environmental regions of the same size but located at different locations in the environment. In some embodiments, the segments in the environment corresponding to action are allocated more pixels than segments in which less or no action is detected. In some embodiments, the apparatus is configured so that at least some segments corresponding to a front viewing area are allocated more pixels per segment than segments corresponding to a rear viewing area. In some embodiments, the apparatus includes or is coupled to a display device on which images produced by the apparatus are displayed. The processor of the apparatus may be, and typically is, configured to operate the apparatus to store received signals, mesh models, image maps, and images such as encoded, decoded and produced images in a storage device included in or coupled to the apparatus.

In some embodiments, the receiver of the apparatus is configured to receive a signal indicating that a second image map should be used to map portions of received frames to said environmental mesh model. The processor of the apparatus is further configured to operate the apparatus in response to the received signal indicating that a second image map should be used to map portions of received frames to the environmental mesh model to use a second image map, typically the second received image map, to map portions of received frames to the environmental mesh model to produce a second rendered image. In some of such apparatus, the decoded image is a frame and the first image map allocates a first number of pixels of the frame to a first segment of the environmental mesh model and the second image map allocates a second number of pixels of the frame to the first segment of the environmental mesh model, the first and second number of pixels being different. The processor of the apparatus is typically configured to display the second rendered image to a display which may be either included as part of the apparatus or coupled to the apparatus.

An exemplary apparatus for communicating information to be used to represent an environment will now be discussed. The exemplary apparatus includes a processor configured to operate said apparatus to: (i) communicate a first image map to be used to map portions of a frame to segments of an environmental model, the first image map allocating different size portions of the frame to different segments of the environmental model thereby allocating different numbers of pixels to different segments of the model, and (ii) communicate a first frame including at least a portion of a first image to be mapped to said environmental model using said first image map.

In some embodiments, the processor of the apparatus is further configured to operate the apparatus to: (i) communicate a second image map to be used to map portions of a frame to segments of the environmental model, said second image map allocating different size portions of the frame to different segments of the environmental model thereby allocating different numbers of pixels to different segments of said model, the second image map allocating a different number of pixels to a first segment of said model than are allocated by said first image map, e.g., UV map, and (ii) communicate a second frame including at least a portion of a second image to be mapped to said environmental model using the second image map. In some embodiments of the apparatus, the first and second image maps map different numbers of pixels to an area corresponding to the same portion of an environment thereby providing different resolution allocations for said same portion of the environment based on which of the first and second image maps are used.

In some embodiments, the apparatus is a server providing a real time content stream. In some embodiments, the apparatus is a real time content delivery system including an environmental mesh generation module, a map generation module, e.g., UV map generation module, and an I/O interface and/or an network interface for communicating information including signals, models, maps and images. In some embodiments, the modules include software instructions which when executed cause the processor to perform various routines. In some embodiments, the modules are hardware modules, e.g., circuitry. In some embodiments, the modules are a combination of hardware and software modules.

An exemplary content processing and delivery system, e.g., system 700, implemented in accordance with one exemplary embodiment comprises: a processor (e.g., processor 708) configured to: i) select a first resolution allocation to be used for at least one image corresponding to a first portion of an environment; and ii) perform a resolution reduction operation on a first image of the first portion of the environment in accordance with the selected first resolution allocation to generate a first reduced resolution image; and a transmitter (e.g., a transmitter 713 of interface 710) configured to communicate the first reduced resolution image to a playback device.

In some embodiments selection of a resolution allocation is performed based on a region of importance in the first portion of the environment. In some embodiments the region of importance corresponds to an area of motion in the first portion of the environment. In some embodiments the region of importance is a region indicated by a system operator. In some embodiments the region of importance is a region determined by detecting which portion of the environment included in the first image one or more individuals is looking at prior to or at the time the first image is captured.

In some embodiments the transmitter is further configured to: communicate to the playback device a first texture map (UV map) to be used to map portions of the images generated in accordance with the first resolution allocation to a surface of a model of the environment. In some embodiments the size of a first segment in the first texture map is a function of the amount of resolution reduction applied to a corresponding first area of the first image to generate a first segment of the first reduced resolution image. In some embodiments the first texture map includes a second segment corresponding to a portion of the first image which was not subject to a resolution reduction operation, the size of the second segment in the second texture map being the same as the size of the segment in the first image.

In some embodiments the size of the first segment in the texture map is reduced from the size of the source of the corresponding area in the first image by an amount which is based on the amount of resolution reduction applied to the corresponding first area of the first image. In some embodiments the transmitter is further configured to communicate to the playback device an environmental model. In some embodiments the first texture map corresponds to a portion of the environmental model, the first texture map providing information indicating how to map portions of images subject to the first resolution allocation to a portion of the environmental model. In some embodiments the first image is one image of an image pair the first image and a second image, the first image being one of a left and right eye image pair, the second image being a second one of a left and right eye image pair. In some embodiments the processor is further configured to perform a resolution reduction operation on the second image in accordance with the selected first resolution allocation to generate a second reduced resolution image, and the transmitter is further configured to communicate the second reduced resolution image to the playback device as part of a first stereoscopic image pair.

In some embodiments the processor is further configured to: select a second resolution allocation to be used for another image corresponding to a first portion of the environment, the another image being a third image; and perform a resolution reduction operation on the third image in accordance with the selected second resolution allocation to generate a third reduced resolution image. In some embodiments the transmitter is further configured to communicate the third reduced resolution image to a playback device.

In some embodiments the transmitter is further configured to communicate to the playback device a second texture map (UV map) to be used to map portions of images generated in accordance with the second resolution allocation to the surface of the model of the environment. In some embodiments the size of a first segment in the second texture map is a function of the amount of resolution reduction applied to a corresponding first area of the third image to generate a first segment of the third reduced resolution image. In some embodiments the second texture map includes a third segment corresponding to a portion of the third image which was not subject to a resolution reduction operation, the size of the third segment in the second texture map being the same as the size of the segment in the third image.

In some embodiments the size of the first segment in the second texture map is reduced from the size of the source of the corresponding area in the third image by an amount which is based on the amount of resolution reduction applied to the corresponding first area of the third image. In some embodiments the second texture map corresponds to the same portion of the environmental model as the first texture map, the second texture map providing information indicating how to map portions of images subject to the second resolution allocation to a corresponding portion of the environmental model.

The methods and apparatus can be used for rendering stereoscopic images, e.g., pairs of images to be displayed to a users left and right eyes, or mono-scopic images. Thus while the methods are well suited for use in simulating 3D environments they are also well suited for use in communicating panoramic images which may correspond to an area less than a full 360 degree environment and which may not be stereoscopic in nature.

Numerous additional methods and embodiments are described in the detailed description which follows.

While steps are shown in an exemplary order it should be appreciated that in many cases the order of the steps may be altered without adversely affecting operation. Accordingly, unless the exemplary order of steps is required for proper operation, the order of steps is to be considered exemplary and not limiting.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a image data processing system. Various embodiments are also directed to methods, e.g., a method of processing image data. In some embodiments, one or more of the method steps is implemented using a processor. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed:

1. A method of transmitting encoded video captured in an environment based on the relative importance of each portion of the environment, the method comprising:
    obtaining a first encoded video frame encoded at a first resolution allocation based on a first video frame captured in the environment;
    transmitting the first encoded video frame to at least one of a plurality of head-mounted displays, each head-mounted display configured to determine a head position of the viewer and display a portion of the environment that corresponds to the head position of the viewer;
    receiving, from each of the plurality of head-mounted displays, information indicative of the portion of the environment corresponding to the head position of the viewer;
    determining a relative importance of each portion of the environment based on the portions of the environment corresponding to the head positions of the plurality of viewers;
    obtaining a second encoded video frame encoded at a second resolution allocation based on a second video frame captured in the environment, the second resolution allocation differing from the first resolution allocation based on the determined relative importance of each portion of the environment; and
    transmitting the second encoded video frame to at least one of the plurality of head-mounted displays.

2. The method of claim 1, wherein determining the relative importance of each portion of the environment comprises determining, for each of a plurality of portions of the environment, a number of viewers having their head position corresponding to each portion of the environment.

3. The method of claim 2, wherein the number of viewers having their head position corresponding to each portion of the environment is determined on a per frame basis.

4. The method of claim 2, wherein determining the relative importance of each portion of the environment comprises ranking each of the plurality of portions of the environment based on the number of viewers having their head position corresponding to each portion of the environment.

5. The method of claim 2, wherein determining the relative importance of each portion of the environment comprises generating a weighted priority ranking value for each of the portions of the environment based on the viewers having their head position corresponding to each portion of the environment.

6. The method of claim 1, wherein the first encoded video frame and the second encoded video frame are transmitted in real time or near real time.

7. The method of claim 1, wherein encoding the second video frame in accordance with the second resolution allocation comprises downsampling the second video frame such that the second encoded video frame includes fewer pixels than the second video frame.

8. The method of claim 7, wherein the second encoded video frame is downsampled in accordance with a texture map, the texture map corresponding to a segment of a model of the environment.

9. The method of claim 8, further comprising:
    transmitting the texture map and the model of the environment to each of a plurality of playback devices, each playback device including one of the plurality of head-mounted displays.

10. The method of claim 1, wherein the first video frame and the second video frame are stereoscopic image pairs.

11. A system comprising:
    a receiver that obtains a first encoded video frame encoded at a first resolution allocation based on a first video frame captured in the environment;
    a transmitter that transmits the first encoded video frame to at least one of a plurality of head-mounted displays, each head-mounted display configured to determine a head position of the viewer and display a portion of the environment that corresponds to the head position of the viewer;
    wherein the receiver receives information indicative of the portion of the environment corresponding to the head position of the viewer from each of the plurality of head-mounted displays;
    a prioritizer configured to determine a relative importance of each portion of the environment based on the portions of the environment corresponding to the head positions of the plurality of viewers;
    wherein the receiver obtains a second encoded video frame encoded at a second resolution allocation based on a second video frame captured in the environment, the second resolution allocation differing from the first resolution allocation based on the determined relative importance of each portion of the environment;
    wherein the transmitter transmits the second encoded video frame to at least one of the plurality of head-mounted displays.

12. The system of claim 11, wherein the prioritizer determines the relative importance of each portion of the environment by determining, for each of a plurality of portions of the environment, a number of viewers having their head position corresponding to each portion of the environment.

13. The system of claim 12, wherein prioritizer determines the number of viewers having their head position corresponding to each portion of the environment on a per frame basis.

14. The system of claim 12, wherein the prioritizer determines the relative importance of each portion of the environment by ranking each of the plurality of portions of the environment based on the number of viewers having their head position corresponding to each portion of the environment.

15. The system of claim 12, wherein the prioritizer determines the relative importance of each portion of the environment by generating a weighted priority ranking value for each of the portions of the environment based on the viewers having their head position corresponding to each portion of the environment.

16. The system of claim 11, wherein the first encoded video frame and the second encoded video frame are transmitted in real time or near real time.

17. The system of claim 16, wherein the second video frame is encoded in accordance with the second resolution allocation by downsampling the received second video frame such that the second encoded video frame includes fewer pixels than the received second video frame.

18. The system of claim 17, wherein the second video frame is downsampled in accordance with a texture map corresponding to a segment of a model of the environment.

19. The system of claim 18, wherein the transmitter transmits the texture map and the model of the environment to each of a plurality of playback devices, each playback device including one of the plurality of head-mounted displays.

20. The system of claim 11, wherein the first video frame and the second video frame are stereoscopic image pairs.

* * * * *